US008132024B2

(12) United States Patent
Nakano et al.

(10) Patent No.: US 8,132,024 B2
(45) Date of Patent: Mar. 6, 2012

(54) DIGITAL WORK PROTECTION SYSTEM, RECORDING APPARATUS, REPRODUCTION APPARATUS, AND RECORDING MEDIUM

(75) Inventors: Toshihisa Nakano, Neyagawa (JP); Masato Yamamichi, Ota (JP); Masami Yamamichi, legal representative, Ota (JP); Satomi Yamamichi, legal representative, Ota (JP); Keiko Yamamichi, legal representative, Maebashi (JP); Yuichi Futa, Osaka (JP); Motoji Ohmori, Hirakata (JP); Makoto Tatebayashi, Takarazuka (JP); Shunji Harada, Osaka (JP); Kaoru Murase, Nara (JP)

(73) Assignee: Panasonic Corporation, Osaka (JP)

( * ) Notice: Subject to any disclaimer, the term of this patent is extended or adjusted under 35 U.S.C. 154(b) by 1297 days.

(21) Appl. No.: 10/796,214

(22) Filed: Mar. 10, 2004

(65) Prior Publication Data

US 2004/0243814 A1 Dec. 2, 2004

(51) Int. Cl.
*G06F 21/00* (2006.01)
(52) U.S. Cl. .......... 713/193; 713/163; 713/189; 726/26; 726/29; 380/201; 380/277; 380/278; 380/281
(58) Field of Classification Search .................. 713/189, 713/193, 163; 726/26, 29; 380/278, 201, 380/277, 281
See application file for complete search history.

(56) References Cited

U.S. PATENT DOCUMENTS

| | | | |
|---|---|---|---|
| 5,886,979 A * | 3/1999 | Moribe et al. | 369/47.12 |
| 5,923,640 A | 7/1999 | Takemura et al. | |
| 6,298,016 B1 * | 10/2001 | Otsuka | 369/14 |
| 6,367,019 B1 * | 4/2002 | Ansell et al. | 726/26 |
| 6,609,116 B1 * | 8/2003 | Lotspiech | 705/57 |
| 7,088,822 B2 * | 8/2006 | Asano | 380/45 |
| 7,162,646 B2 * | 1/2007 | Wu et al. | 713/193 |
| 7,260,219 B2 * | 8/2007 | Linnartz et al. | 380/202 |
| 7,283,633 B2 | 10/2007 | Asano et al. | |
| 7,434,266 B2 * | 10/2008 | Ogura | 726/30 |
| 2002/0076204 A1 | 6/2002 | Nakano et al. | |

(Continued)

FOREIGN PATENT DOCUMENTS

CN 1228185 9/1999

(Continued)

OTHER PUBLICATIONS

Supplementary European Search Report issued Jul. 20, 2011 in corresponding European Application No. 04 71 9578.

*Primary Examiner* — Edan Orgad
*Assistant Examiner* — Kari Schmidt
(74) *Attorney, Agent, or Firm* — Wenderoth, Lind & Ponack L.L.P.

(57) ABSTRACT

A recording and reproduction apparatus for preventing illegitimate use of contents. A recording medium stores an inherent number in an unrewritable area. The recording apparatus writes media key data and an encrypted content onto the recording medium. The media key data includes encrypted media keys generated by (i) for each of unrevoked reproduction apparatuses, encrypting a media key using a device key of the unrevoked reproduction apparatus respectively, and (ii) for each of revoked reproduction apparatuses, encrypting detection information using a device key of the revoked reproduction apparatus. The reproduction apparatus decrypts the encrypted media key using a device key to generate a decryption media key, judges whether the decryption media key is the detection information, and prohibits the encrypted content recorded on the recording medium from being decrypted when judged in the affirmative.

7 Claims, 20 Drawing Sheets

U.S. PATENT DOCUMENTS

| | | | |
|---|---|---|---|
| 2002/0094088 A1* | 7/2002 | Okaue | 380/278 |
| 2002/0126842 A1* | 9/2002 | Hollar | 380/201 |
| 2002/0150251 A1* | 10/2002 | Asano et al. | 380/277 |
| 2004/0030898 A1* | 2/2004 | Tsuria et al. | 713/171 |
| 2004/0156503 A1* | 8/2004 | Bell et al. | 380/44 |

FOREIGN PATENT DOCUMENTS

| | | |
|---|---|---|
| EP | 1 253 739 A1 | 10/2002 |
| JP | 03-073590 | 3/1991 |
| JP | 09-160492 | 6/1997 |
| JP | 11-340968 | 12/1999 |
| JP | 2000-357127 | 12/2000 |
| JP | 2001-136161 | 5/2001 |
| JP | 2002-009753 | 1/2002 |
| JP | 2002-009754 | 1/2002 |
| JP | 2002-281013 | 9/2002 |
| JP | 2002-372910 | 12/2002 |
| JP | 2003-8567 | 1/2003 |
| WO | WO 01/86654 | 11/2001 |

* cited by examiner

DIGITAL WORK PROTECTION SYSTEM, RECORDING APPARATUS, REPRODUCTION APPARATUS, AND RECORDING MEDIUM

BACKGROUND OF THE INVENTION

1. Field of the Invention

The present invention relates to a technique to record and reproduce digital data on a large-capacity recording medium, particularly to a technique to prevent illegitimate recording and reproduction of contents using an illegitimate apparatus.

2. Description of the Related Art

In recent years, since multimedia-related technology has been developed and large-capacity recording media have become available, a system has been getting popular in which digital contents (hereafter, simply referred to as "contents") that are made of video, audio, and the like are generated and distributed by being stored in a large capacity recording medium such as an optical disc or distributed via a network.

Distributed contents are read with the use of a computer, a reproduction apparatus, or the like, so that they can be reproduced or duplicated.

Generally speaking, an encryption technique is used in order to protect copyrights of contents, in other words, in order to prevent illegitimate use of contents such as illegitimate reproduction and illegitimate duplication. More specifically, a recording apparatus encrypts contents with an encryption key before recording them onto a recording medium, such as an optical disc, and the recording medium is distributed. Only reproduction apparatuses that each have a decryption key corresponding to the encryption key are able to decrypt the encrypted contents read from the recording medium with the decryption key and perform operations including reproduction of the contents.

It should be noted that, when contents are encrypted and recorded onto a recording medium, different methods are used such as (i) contents are encrypted with an encryption key corresponding to a decryption key stored in a reproduction apparatus and then recorded and (ii) contents are encrypted with a key and recorded, and then a decryption key that corresponds to the key is encrypted with an encryption key that corresponds to the decryption key stored in a reproduction apparatus and recorded.

In such cases, it is necessary to strictly manage the decryption key stored in the reproduction key so that it is not disclosed to the outside. There is a risk that such a decryption key may be disclosed to the outside when an illegitimate user illegitimately analyzes the inside of the reproduction apparatus. Once an illegitimate user has discovered the decryption key, there are chances that the illegitimate user may manufacture a recording apparatus or a reproduction apparatus for illegitimately utilizing the contents and illegally sell such apparatuses, or create a computer program for illegitimately utilizing the contents and distribute such a program via the Internet and the like.

In such situations, the copyright holder would want to make sure that the once-disclosed decryption key becomes unable to handle the contents to be provided in the future. A technique to realize this is called a key revocation technique. Patent Document 1 discloses a system that realizes key revocation.

In a conventional key revocation technique, a piece of key revocation information indicating that the key stored in the apparatus is revoked is prestored in an unrewritable area of the recording medium. The apparatus judges whether the key stored in the apparatus is revoked or not using the piece of key revocation information recorded on the recording medium. When the apparatus has a revoked key, it is arranged so that the apparatus is not able to use the recording medium. Also, when a key is newly revoked, the piece of key revocation information is updated, and the updated piece of key revocation information is recorded onto each of recording media that are manufactured after the new revocation of the key. This way, a mechanism is provided in which it is not possible to utilize a new recording medium with a revoked key.

On the other hand, generally speaking, a kind of personal computer peripheral equipment called an optical disk drive is used to read and write contents from and to a recording medium such as an optical disk. In order to achieve compatibility of devices, the method for inputting and outputting content data are standardized as public information and are not made secret normally. Thus, it is possible to easily read the contents recorded on a recording medium with the use of a personal computer and the like, and also possible to easily write the read data onto another recording medium. Accordingly, in order to have a system that protects the copyrights of the contents, it is necessary that the system includes an effective function to prevent the user from reading the data recorded on the recording medium so as to write the data onto another recording medium, which is one of the normal actions that any user is able to perform. A technique used to prevent the data read from a recording medium from being written onto another recording medium is called the media bind technique. The Patent Document 2 discloses a mechanism that realizes a form of the media bind.

In order to achieve copyright protection with the use of the conventional media bind technique, a medium identifier that identifies a recording medium is prestored in the unrewritable area of the recording medium, and the encrypted content recorded on the recording medium is encrypted based on the medium identifier. Accordingly, when only the encrypted content is duplicated onto a second recording medium, as the second recording medium has another medium identifier recorded thereon, it is not possible to correctly decrypt the encrypted content based on this other medium identifier.

In order to prevent illegitimate use of contents from being spread, however, there is a demand that various kinds of techniques for preventing illegitimate use should be achieved.

As referenced above, patent document 1 is identified as Japanese Unexamined Patent Application Publication No. 2002-281013, patent document 2 is identified as Japanese Patent Publication No. 3073590, and patent document 3 is identified as Japanese Unexamined Patent Application Publication No. 09-160492.

SUMMARY OF THE INVENTION

An object of the present invention is to provide a digital work protection system, a recording apparatus, a recording method, a reproduction apparatus, a reproduction method, a computer program, and a recording medium that are each able to prevent illegitimate use of contents in order to meet the aforementioned demand.

In order to achieve the object, the present invention provides a digital work protection system including a recording apparatus and a plurality of reproduction apparatuses, the recording apparatus being operable to encrypt a content and write the encrypted content onto a recording medium, and the plurality of reproduction apparatuses each being operable to attempt to decrypt the encrypted content recorded on the recording medium.

In the system, one or more of the plurality of reproduction apparatuses are revoked.

The recording medium has (i) a read-only unrewritable area in which a medium inherent number inherent to the recording medium is prestored and (ii) a rewritable area to and from which data can be written and read.

The recording apparatus includes: a storing unit that stores therein a piece of media key data including a plurality of encrypted media keys generated by (i) for each of unrevoked reproduction apparatuses, encrypting a media key using a device key of the unrevoked reproduction apparatus respectively, and (ii) for each of the revoked reproduction apparatuses, encrypting predetermined detection information using a device key of the revoked reproduction apparatus respectively; a reading unit operable to read the medium inherent number from the unrewritable area of the recording medium; a generating unit operable to generate an encryption key based on the read medium inherent number and the media key; an encrypting unit operable to encrypt the content being a piece of digital data, based on the generated encryption key, so as to generate the encrypted content; a reading unit operable to read the piece of media key data from the storing unit; and a writing unit operable to write the read piece of media key data and the generated encrypted content into the rewritable area of the recording medium.

Each of the reproduction apparatuses includes: a reading unit operable to read one encrypted media key that corresponds to the reproduction apparatus, from the piece of media key data recorded in the rewritable area of the recording medium; a decrypting unit operable to decrypt the read encrypted media key using the device key of the reproduction apparatus, so as to generate a decryption media key; a controlling unit operable to judge whether the generated decryption media key is the detection information or not, to prohibit the encrypted content from being decrypted when having judged in the affirmative, and to permit the encrypted content to be decrypted when having judged in the negative; and a decrypting unit operable to, when the encrypted content is permitted to be decrypted, read the encrypted content from the recording medium and decrypt the read encrypted content based on the generated decryption media key, so as to generate a decrypted content.

According to an arrangement of the present invention, the recording apparatus (i) writes, onto a recording medium, a piece of media key data including a plurality of encrypted media keys generated by (a) for each of unrevoked reproduction apparatuses, encrypting a media key using a device key of the unrevoked reproduction apparatus respectively, and (b) for each of the revoked reproduction apparatuses, encrypting predetermined detection information of using a device key of the revoked reproduction apparatus respectively, (ii) generates an encryption key based on the read medium inherent number and the media key, and (iii) writes the encrypted content generated based on the generated encryption key onto the recording medium. The reproduction apparatus decrypts the encrypted media key using the device key so as to generate a decryption media key, and prohibits the encrypted content recorded on the recording medium from being decrypted when the generated decryption media key is the detection information.

With this arrangement, it is possible to eliminate the one or more revoked reproduction apparatuses.

Here, it is acceptable to have an arrangement wherein a second recording medium stores therein a second piece of media key data including another set of encrypted media keys generated by (i) for each of unrevoked reproduction apparatuses, encrypting the media key using a device key of the unrevoked reproduction apparatus respectively, and (ii) for each of revoked reproduction apparatuses, encrypting predetermined detection information using a device key of the revoked reproduction apparatus respectively, and the recording apparatus further includes: a comparing unit operable to compare the second piece of media key data recorded on the second recording medium with the first piece of media key data stored in the storing unit so as to judge which is newer; and an updating unit operable to, when the second piece of media key data has been judged newer, read the second piece of media key data from the second recording medium and overwrite the first piece of media key data stored in the storing unit with the second piece of media key data, and the second reading unit reads the second piece of media key data from the storing unit, instead of the first piece of media key data, and the writing unit writes the second piece of media key data, instead of the first piece of media key data, into the rewritable area.

With this arrangement, the recording medium is able to update the piece of media key data stored therein with another encrypted media key obtained from the second recording medium.

Here, it is acceptable to have an arrangement wherein the storing unit further stores therein a piece of revocation data indicating one or more of public keys assigned to the recording apparatus and the plurality of reproduction apparatuses are revoked, the recording apparatus further includes a signature generating unit operable to use a digital signature function on the piece of revocation data, so as to generate a piece of verification information, and the writing unit further writes the generated piece of verification information into the rewritable area of the first recording medium. Additionally, it is acceptable to have an arrangement wherein the recording apparatus further stores therein a piece of revocation data indicating one or more of public keys assigned to the recording apparatus and the plurality of reproduction apparatuses are revoked, uses a digital signature function on the piece of revocation data to generate a piece of verification information, and writes the generated piece of verification information into the rewritable area of the first recording medium, the reading unit further reads the piece of verification information recorded in the rewritable area, the reproduction apparatus further includes a verifying unit operable to implement signature verification based on the read piece of verification information and output a verification result indicating either a verification success or a verification failure, and the controlling unit further prohibits the encrypted content from being decrypted when the verification result indicates a verification failure, and permits the encrypted content to be decrypted when the verification result indicates a verification success.

With this arrangement, the recording apparatus further writes the piece of verification information generated with a digital signature function onto the recording medium; therefore, it is possible to eliminate illegitimate reproduction apparatuses by verifying the piece of verification information at the reproduction apparatus.

Here, it is acceptable to have an arrangement wherein the storing unit further stores therein a public key certificate of the recording apparatus, the second reading unit reads the public key certificate from the storing unit, and the writing unit writes the read public key certificate into the rewritable area of the first recording medium. Further, it is acceptable to have an arrangement wherein the recording apparatus further stores therein a public key certificate of the recording apparatus, reads the public key certificate, and writes the read public key certificate into the rewritable area of the first recording medium, the reproduction apparatus further includes: a storing unit that stores therein a first piece of revocation data indicating one or more of public keys assigned to the recording apparatus and the plurality of reproduction apparatuses are revoked; a certificate reading unit operable to read the public key certificate from the first recording medium; and a public key verifying unit operable to check whether a public key included in the read public key certificate is revoked according to the first piece of verification data, and the controlling unit further prohibits the encrypted content from being decrypted when the public key is revoked, and permits the encrypted content to be decrypted when the public key is not revoked.

With this arrangement, the recording apparatus writes the public key certificate onto the recording medium, and the reproduction apparatus reads the public key certificate from the recording medium. Thus, when the public key is revoked, it is possible to prohibit the encrypted content from being decrypted.

Here, it is acceptable to have an arrangement wherein a second recording medium stores therein a second piece of revocation data indicating one or more of public keys assigned to the recording apparatus and the plurality of reproduction apparatuses are revoked, the reproduction apparatus further includes: a comparing unit operable to compare the second piece of revocation data recorded on the second recording medium with the first piece of revocation data stored in the storing unit so as to judge which is newer; and an updating unit operable to, when the second piece of revocation data has been judged newer, read the second piece of revocation data from the second recording medium and overwrite the first piece of revocation data in the storing unit with the read second piece of revocation data.

With this arrangement, the reproduction apparatus is able to update the revocation data so that it is in the most updated state.

Here, it is acceptable to have an arrangement wherein the storing unit further stores therein an apparatus identifier that identifies the recording apparatus, the recording apparatus further includes an embedding unit operable to read the apparatus identifier and embed the read apparatus identifier into the content as an electronic watermark, and the encrypting unit encrypts the content into which the apparatus identifier is embedded. In addition, the reproduction apparatus may further comprise a storing unit that stores therein an apparatus identifier that identifies the reproduction apparatus; and an embedding unit operable to, when the encrypted content is permitted to be decrypted, read the apparatus identifier from the storing unit and embed the read apparatus identifier into the encrypted content as an electronic watermark, and a writing unit operable to write the encrypted content in which the apparatus identifier is embedded onto the first recording medium.

With this arrangement, the recording apparatus and the reproduction apparatus are each able to write a content in which an apparatus identifier is embedded onto a recording medium; therefore, in a case where the content is distributed in an illegitimate manner, it is possible to identify the recording apparatus and the reproduction apparatus that are used to record the content by extracting the embedded apparatus identifier from the content.

Here, it is acceptable to have an arrangement wherein the first piece of media key data stored in the storing unit further includes a first data identifier that identifies the first piece of media key data, the writing unit (i) writes the first data identifier and the encrypted content into the rewritable area of the first recording medium in such a manner that the first data identifier and the encrypted content are in correspondence with each other, and (ii) writes the first piece of media key data including the first data identifier into the rewritable area.

Further, it is acceptable to have an arrangement wherein the piece of media key data stored in the recording apparatus further includes a data identifier that identifies the piece of media key data, the recording apparatus writes the data identifier and the encrypted content into the rewritable area in such a manner that the data identifier and the encrypted content are in correspondence with each other, and writes the piece of media key data including the data identifier into the rewritable area, and the reproduction apparatus further includes: a receiving unit operable to receive a specification of the encrypted content recorded on the first recording medium; a first reading unit operable to read, from the first recording medium, the data identifier that is in correspondence with the encrypted content in the received specification; and a second reading unit operable to read the piece of media key data including the data identifier from the first recording medium, and the controlling unit judges whether the encrypted content is prohibited from being decrypted or permitted to be decrypted based on the read piece of media key data.

With this arrangement, the recording apparatus writes the data identifier and the encrypted content onto the recording medium in such a manner that they are in correspondence with each other, and writes the media key data including the data identifier onto the recording medium; therefore, the reproduction apparatus is able to obtain a piece of media key data that corresponds to the encrypted content via the data identifier, and judge whether the encrypted content is permitted to be decrypted based on the obtained piece of media key data.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 14 is a data structure diagram that shows the structure of the data recorded on the recording medium 1300a;

DETAILED DESCRIPTION OF THE INVENTION

1. First Embodiment

The following describes the content supply system 10 as an embodiment of the present invention.

1.1 The Structure of the Content Supply System 10

Figure 1:
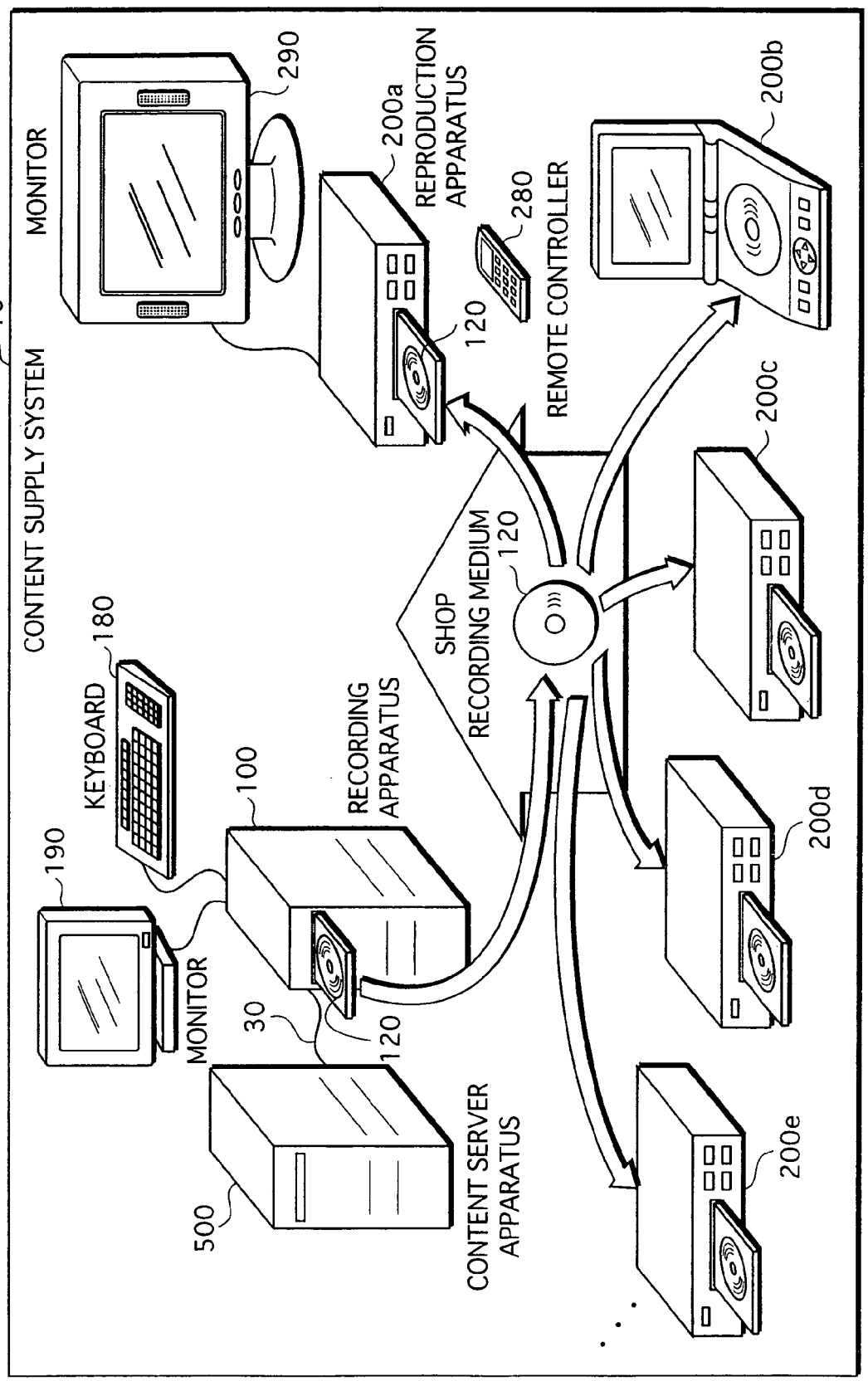
FIG. 1 is a structure diagram that shows the structure of the content supply system 10.

As shown in FIG. 1, the content supply system 10 comprises a content server apparatus 500, a recording apparatus 100, and reproduction apparatuses 200a, 200b, 200c, 200d, 200e, and so on. The total number of the recording apparatus 100 and the reproduction apparatuses 200a, 200b, 200c, 200d, 200e, ... is n. The apparatus number "1" is assigned to the recording apparatus 100. The apparatus numbers "2", "3", "4", ..., "n" are assigned to the reproduction apparatuses 200a, 200b, 200c, 200d, 200e, ..., respectively. Each of the apparatuses is identified with the apparatus number assigned thereto.

Among these n apparatuses, the reproduction apparatus 200b and the reproduction apparatus 200c have been revoked since they had been illegitimately attacked by an illegitimate third party and the keys which should have been secretly kept were disclosed.

A company that supplies contents of music and movies owns the content server apparatus 500 and the recording apparatus 100, which are connected with each other via a dedicated line 30. The content server apparatus 500 has contents and content keys to be used for encryption of the contents. The content server apparatus 500 transmits a content and a corresponding content key to the recording apparatus 100 via the dedicated line 30, in response to a request from the recording apparatus 100.

The recording apparatus 100 receives the content and the corresponding content key from the content server apparatus 500 via the dedicated line 30, encrypts the received content and content key, and writes the encrypted content, the encrypted content key, and other related information onto the recording medium 120.

The recording medium 120 on which the encrypted content, the encrypted content key, and the related information have been recorded is sold at a shop, and a user purchases the recording medium 120.

When the recording medium 120 is mounted, the reproduction apparatus 200a owned by the user reads the encrypted content, the encrypted content key, and the related information from the recording medium 120. The reproduction apparatus 200a judges whether it is acceptable to decrypt the content from the read related information. When it is judged that decryption is acceptable, the reproduction apparatus 200a generates a decrypted content key from the encrypted content key, generates decrypted content using the decrypted content key, and outputs movies or music generated from the generated decrypted content.

1.2 The Content Server Apparatus 500

The content server apparatus 500 comprises an information storing unit 501, a controlling unit 502, an inputting unit 503, a displaying unit 504, and a transmitting and receiving unit 505 (not shown in the drawing).

More specifically, the content server apparatus 500 is a computer system that comprises a microprocessor, a ROM, a RAM, a hard disk unit, a communication unit, a display unit, a keyboard, a mouse, and the like. The RAM and the hard disk unit each store therein a computer program. The constituents of the content server apparatus 500 achieve their functions when the microprocessor operates according to the computer programs.

The transmitting and receiving unit 505 is connected to the recording apparatus 100 via the dedicated line 30 and performs transmission and reception of information between the recoding apparatus 100 and the controlling unit 502.

The information storing unit 501 prestores therein a plurality of sets of a content and a content key, the content having been generated by efficiently compression-coding video information and audio information, and the content key being a key used in encryption of the content.

The controlling unit 502 receives a request for obtaining one of the contents from the recording apparatus 100 via the dedicated line 30 and the transmitting and receiving unit 505. When receiving the request, the controlling unit 502 reads the content and the corresponding content key indicated in the request from the information storing unit 501, and transmits the read content and the content key to the recording apparatus 100 via the transmitting and receiving unit 505 and the dedicated line 30.

The inputting unit 503 receives an instruction from a user of the content server apparatus 500 and outputs the received instruction to the controlling unit 502.

The displaying unit 504 displays various kinds of information under the control of the controlling unit 502.

1.3 The Recording Apparatus 100

Figure 2:
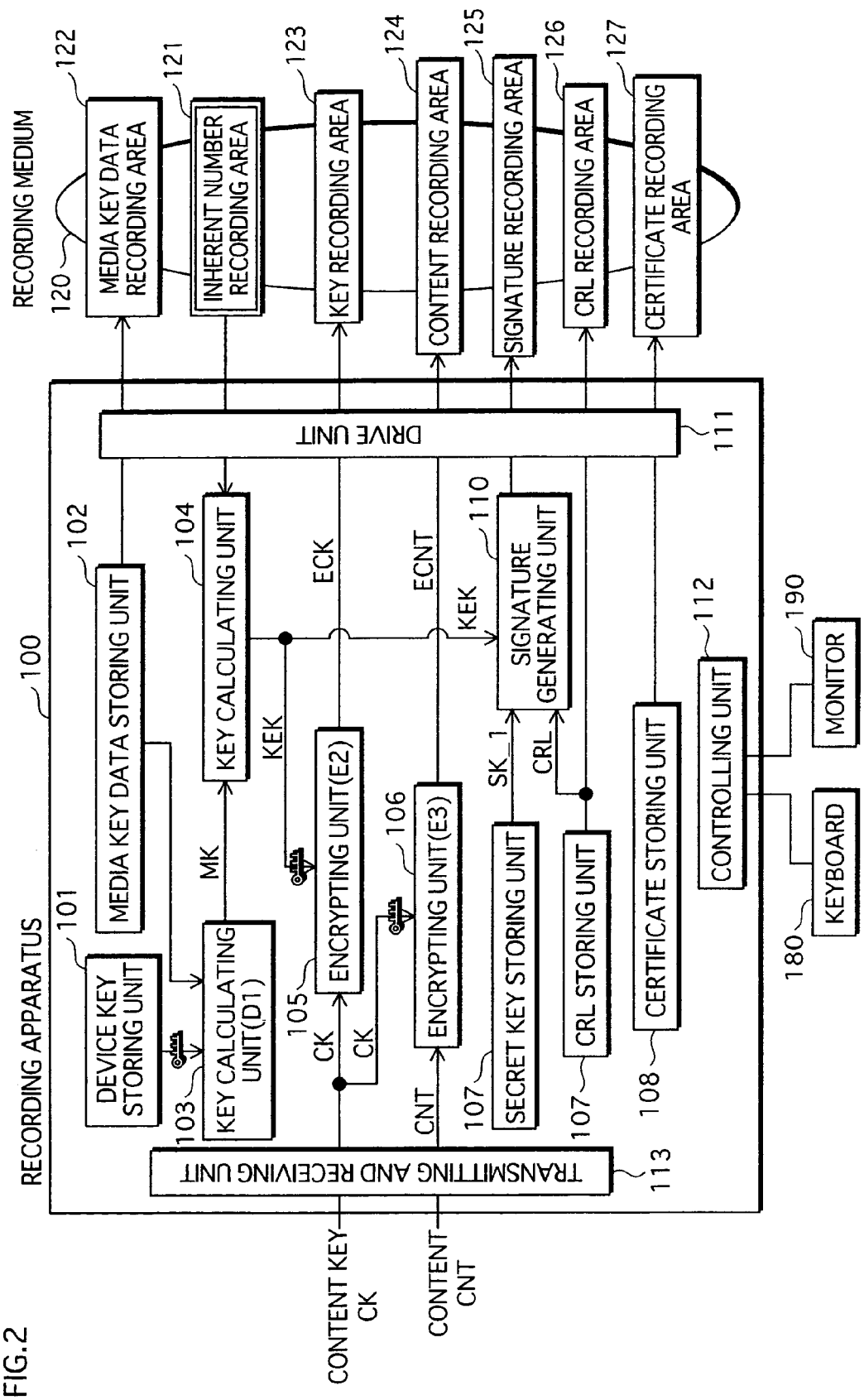
FIG. 2 is a block diagram showing the structure of the recording apparatus 100.

As shown in FIG. 2, the recording apparatus 100 comprises a device key storing unit 101, a media key data storing unit 102, a key calculating unit 103, a key calculating unit 104, an encrypting unit 105, an encrypting unit 106, a secret key storing unit 107, a certificate storing unit 108, a CRL storing unit 109, a signature generating unit 110, a drive unit 111, a controlling unit 112, and a transmitting and receiving unit 113.

More specifically, like the content server apparatus 500, the recording apparatus 100 is a computer system that comprises a microprocessor, a ROM, a RAM, a hard disk unit, and the like. The RAM and the hard disk unit each store therein a computer program. The recording apparatus 100 achieves its functions when the microprocessor operates according to the computer programs.

(1) The Device Key Storing Unit 101

The device key storing unit 101 secretly stores therein a device key DK_1 in such a manner that the device key DK_1 is not accessible from an external apparatus. The device key DK_1 is a key unique to the recording apparatus 100. It should be noted that in this description of the invention a device key stored in an apparatus m is expressed as DK_m.

(2) The Media Key Data Storing Unit 102

The media key data storing unit 102 stores therein media key data MDATA. The media key data MDATA includes n sets of an encrypted media key and an apparatus number. In each set, the encrypted media key and the apparatus number are in correspondence with each other. As mentioned earlier, n is the total number of the recording apparatus 100 and the reproduction apparatuses 200a, 200b, ... and so on.

Among these n sets, the first set is made up of a first encrypted media key and the apparatus number "1". The apparatus number "1" is identifying information that identifies the recording apparatus 100. The first encrypted media key is generated by implementing an encryption algorithm E1 on the media key MK using the device key DK_1 assigned to the apparatus identified with the apparatus number "1", i.e. the recording apparatus 100.

The first encrypted media key=E1(DK_1, MK)

Here, the encryption algorithm E1 is according to, for example, DES (Data Encryption Standard). E(A, B) denotes an encrypted text obtained by implementing an encryption algorithm E on a plain text B using a key A.

As additional information, the media key MK is a key unique to the recording medium 120.

Among the n sets, the second set is made up of a second encrypted media key and the apparatus number "2". The apparatus number "2" identifies the reproduction apparatus 200a. The second encrypted media key is generated by implementing the encryption algorithm E1 on the media key MK using the device key DK_2 assigned to the apparatus identified with the apparatus number "2", i.e. the reproduction apparatus 200a.

The second encrypted media key=E1(DK_2, MK)

Among the n sets, the third set and the fourth set are made up of a third encrypted media key and the apparatus number "3", and a fourth encrypted media key and the apparatus number "4", respectively. The apparatus numbers "3" and "4" identify the reproduction apparatuses 200b and 200c, respectively. The third and fourth encrypted media keys are generated by implementing the encryption algorithm E1 on the value "0" instead of the media key MK, using the device keys DK_3 and DK_4 assigned to the apparatus identified with the apparatus numbers "3" and "4", i.e. the reproduction apparatuses 200b and 200c, respectively.

The third encrypted media key=E1(DK_3, 0)

The fourth encrypted media key=E1(DK_4, 0)

Here, the value "0" is a piece of data that is completely irrelevant to the media key MK. The reason why the value "0" is used instead of the media key MK is that the reproduction apparatuses 200b and 200c which correspond to the third and fourth encrypted media keys respectively are revoked. The value "0" is used as detection information for detecting that the reproduction apparatuses 200b and 200c have been revoked.

When an encrypted media key is generated for a revoked apparatus by encrypting the value "0", which is completely irrelevant to the media key MK, using a device key of the revoked apparatus, it is possible to allow the media key MK to be shared among all the apparatuses except for the revoked apparatus. Also, it is possible to eliminate the revoked apparatus from this system.

Although the value "0" is used here, it is also acceptable to use another kind of data that is completely irrelevant to the media key MK. For example, it is possible to use another fixed value "0xFFFF", or information that indicates a date or a time at which the encrypted media key is generated, or a device key of the revoked apparatus.

It should be noted that it is acceptable to use other methods of revocation to revoke the apparatuses. For example, Patent Document 1 discloses a method of revocation with the use of a tree structure.

Among the n sets, the fifth to nth sets are made up of a fifth encrypted media key and the apparatus number "5", ... , and an nth encrypted media key and the apparatus number "n", respectively. The apparatus numbers "5" to "n" identify the reproduction apparatuses 200d, 200e, ... , respectively. The fifth to nth encrypted media keys are generated by implementing the encryption algorithm E1 on the media key MK using the device keys DK_5 to DK_n assigned to the apparatuses identified with the apparatus numbers "5" to "n", i.e. the reproduction apparatuses 200d, 200e ... , respectively.

The fifth encrypted media key=E1(DK_5, MK) ... .

The nth encrypted media key=E1(DK_n, MK)

(3) The Key Calculating Unit 103

The key calculating unit 103 prestores therein the apparatus number "1" assigned to the recording apparatus 100.

The key calculating unit 103 looks for and reads a set that includes the prestored apparatus number "1" out of n sets that are included in the media key data MDATA stored in the media key data storing unit 102. The key calculating unit 103 then extracts the encrypted media key E1(DK_1, MK) that corresponds to the apparatus number "1" from the read set.

Next, the key calculating unit 103 reads the device key DK_1 from the device key storing unit 101 and implements the decryption algorithm D1 on the extracted encrypted media key E1 (DK_1, MK) using the read device key DK_1, so as to generate the media key MK.

The media key MK=D1(DK_1, (E1(DK_1, MK))

Here, the decryption algorithm D1 is an algorithm for decrypting an encrypted text generated by implementing the encryption algorithm E1 and is according to, for example, DES. D(A, B) denotes a decrypted text obtained by implementing a decryption algorithm on an encrypted text B using a key A.

Next, the key calculating unit 103 outputs the generated media key MK to the key calculating unit 104.

It should be noted that in FIG. 2 the blocks representing the constituents of the recording apparatus 100 are connected with other blocks via connection lines; however, some of connection lines are omitted from the drawing. Here, the connection lines indicate paths through which signals and information are transmitted. Also, among the connection lines that are connected to the block representing the key calculating unit 103, the connection line marked with a symbol of a key is a path on which information as a key is transmitted to the calculating unit 103. The same is true with other blocks representing other constituents. The same is true with other drawings.

(4) The Key Calculating Unit 104

The key calculating unit 104 receives the media key MK from the key calculating unit 103 and reads the medium inherent number MID from the inherent number recording area 121 of the recording medium 120 via the drive unit 111.

Next, the key calculating unit 104 combines the received media key MK with the read medium inherent number MID in the stated order, so as to generate a combined value (MK| |MID). Here "A| |B" denotes a bit combination of the data A and the data B in the stated order. The key calculating unit 104 then implements a hash function SHA-1 on the generated combined value (MK| |MID), so as to obtain a hash value H=SHA-1(MK| |MID). The key calculating unit 104 takes the obtained hash value H as a key encryption key KEK and outputs the key encryption key KEK to the encrypting unit 105 and the signature generating unit 110.

Here, SHA-1(A) denotes a hash value obtained by implementing a hash function SHA-1 on information A.

It should be noted that the key calculating unit 104 takes the hash value obtained by implementing a hash function SHA-1 as the key encryption key KEK; however, the present invention is not limited to this. It is also acceptable if a part of the obtained hash value is taken as the key encryption key KEK.

It should be noted that since the hash function SHA-1 is publicly known, explanation for it is omitted. It is also acceptable to use other kinds of hash functions.

(5) The Encrypting Unit 105

The encrypting unit 105 receives the content key CK from the content server apparatus 500 via the transmitting and receiving unit 113 and receives the key encryption key KEK from the key calculating unit 104.

Next, the encrypting unit 105 implements an encryption algorithm E2 on the received content key CK using the received key encryption key KEK, so as to generate an encrypted content key ECK.

The encrypted content key ECK=E2(KEK, CK)

Here, the encryption algorithm E2 is according to, for example, DES.

The encrypting unit 105 then reserves a key recording area 123 on the recording medium 120 via the drive unit 111, and writes the generated encrypted content key ECK into the key recording area 123 of the recording medium 120 via the drive unit 111.

(6) The Encrypting Unit 106

The encrypting unit 106 receives the content key CK and a content CNT from the content server apparatus 500 via the transmitting and receiving unit 113 and implements an encryption algorithm E3 on the received content CNT using the received content key CK, so as to generate an encrypted content ECNT.

The encrypted content ECNT=E3(CK, CNT)

Here, the encryption algorithm E3 is according to, for example, DES.

Next, the encrypting unit 106 reserves a content recording area 124 on the recording medium 120 via the drive unit 111, and writes the generated encrypted content ECNT into the content recording area 124 of the recording medium 120 via the drive unit 111.

(7) The Secret Key Storing Unit 107

The secret key storing unit 107 stores therein a secret key SK_1 for the recording apparatus 100 in such a manner that the secret key SK_1 is not accessible from an external apparatus. The secret key SK_1 is in accordance with a public key encryption method. Here, the public key encryption method used is, for example, the RSA (Rivest Shamir Adleman) Encryption Method.

(8) The Certificate Storing Unit 108

The certificate storing unit 108 stores therein a public key certificate PKC. The public key certificate PKC is structured so as to include a certificate identifier ID_1, a public key PK_1, and signature data Sig_1.

The certificate identifier ID_1 is identification information that uniquely identifies the public key certificate PKC. The public key PK_1 is a public key that corresponds to the secret key SK_1 stored in the secret key storing unit 107. The signature data Sig_1 is generated by using a digital signature function Sig on a combined value (ID_1| |PK_1) of the certificate identifier ID_1 and the public key PK_1, using a secret key of a certificate authority CA, SK_CA.

The signature data Sig_1=Sig (SK_CA, ID_1 | |PK_1)

Here, Sig(A, B) denotes a piece of signature data obtained by using a digital signature function Sig on data B using a key A. An example of the digital signature function Sig is a digital signature for which RSA with the hash function SHA-1 is used.

(9) The CRL Storing Unit 109

The CRL storing unit 109 has a public key certificate revocation list (hereafter, it will be referred to as the revocation list "CRL") recorded thereon, which indicates one or more public key certificates that are revoked at a first point of time.

The revocation list CRL includes one or more certificate identifiers as well as signature data SigID and a version number.

Each of the certificate identifiers is identification information that identifies a revoked public key certificate.

The signature data SigID is generated by using the digital signature function Sig on a combined value of all the certificate identifiers included in the revocation list CRL (or in a case where one certificate identifier is included in the revocation list CRL, using the digital signature function Sig on this certificate identifier), using the secret key of the certificate authority SK_CA.

The signature data SigID=Sig (SK_CA, a combined value of all the certificate identifiers)

For example, when the public key certificates identified with the certificate identifiers ID_3 and ID_4 are revoked, the revocation list CRL includes the certificate identifiers ID_3, ID_4, the signature data SigID=Sig (SK_CA, (ID_3| |ID_4), and a version number.

The version number is information that indicates a generation of the revocation list CRL and shows that the revocation list CRL is based on the first point of time. The newer the generation of the public key certificate revocation list is, the bigger the value of the version number is.

(10) The Signature Generating Unit 110

The signature generating unit 110 reads the secret key SK_1 from the secret, key storing unit 107, reads the revocation list CRL from the CRL storing unit 109, and receives the key encryption key KEK from the key calculating unit 104.

The signature generating unit 110 then combines the received key encryption key KEK with the read revocation list CRL in the stated order, so as to generate a combined value (KEK| |CRL) The signature generating unit 110 further uses the digital signature function Sig on the generated combined value (KEK| |CRL) using the read secret key SK_1, so as to generate signature data SigCRL.

The signature data SigCRL=Sig (SK_1, (KEK| |CRL))

Next, the signature generating unit 110 reserves a signature recording area 125 on the recording medium 120 via the drive unit 111, and writes the generated signature data SigCRL into the signature recording area 125 of the recording medium 120 via the drive unit 111.

(11) The Controlling Unit 112

The controlling unit 112 transmits a request for obtaining a content to the content server apparatus 500 via the transmitting and receiving unit 113.

The controlling unit 112 also reads the public key certificate PKC from the certificate storing unit 108, reserves a certificate recording area 127 on the recording medium 120 via the drive unit 111, and then writes the read public key certificate PKC into the certificate recording area 127 of the recording medium 120 via the drive unit 111.

In addition, the controlling unit 112 reads the media key data MDATA from the media key data storing unit 102, reserves a media key data recording area 122 on the recording medium 120 via the drive unit 111, and then writes the read media key data MDATA into the media key data recording area 122 of the recording medium 120 via the drive unit 111.

Additionally, the controlling unit 112 reads the revocation list CRL from the CRL storing unit 109, reserves a CRL recording area 126 on the recording medium 120 via the drive unit 111, and then writes the read revocation list CRL into the CRL recording area 126 of the recording medium 120 via the drive unit 111.

The controlling unit 112 receives instruction information from the keyboard 180 in accordance with an operation instruction issued by an operator of the recording apparatus 100 and operates according to the instruction information. The controlling unit 112 also controls the operations of the other constituents of the recording apparatus 100.

(12) The Transmitting and Receiving Unit 113

The transmitting and receiving unit 113 is connected with the content server apparatus 500 via the dedicated line 30 and performs transmission and reception of information between the content server apparatus 500 and the controlling unit 112. Under the control of the controlling unit 112, the transmitting and receiving unit 113 also performs transmission and reception of information between the content server apparatus 500 and the encrypting unit 105 as well as between the content server apparatus 500 and the encrypting unit 106.

(13) The Drive Unit 111

Under the control of the controlling unit 112, the drive unit 111 reads the medium inherent number MID from the inherent number recording area 121 of the recording medium 120 and outputs the read medium inherent number MID to the key calculating unit 104.

Also, under the control of the controlling unit 112, the drive unit 111 receives pieces of information from the encrypting unit 105, the encrypting unit 106, and the signature generating unit 110, reserves areas on the recording medium 120 into which the pieces of information are to be written, and then writes the pieces of information into the areas.

In addition, the drive unit 111 receives information from the controlling unit 112, reserves an area on the recording medium 120 into which the information is to be written, and then writes the information into the area.

(14) The Keyboard 180 and the Monitor 180

The keyboard 180 receives an operation instruction issued by an operator of the recording apparatus 100 and outputs instruction information that corresponds to the received operation instruction to the controlling unit 112.

The monitor 190 displays various kinds of information under the control of the controlling unit 112.

1.4 The Recording Medium 120

Figure 3:
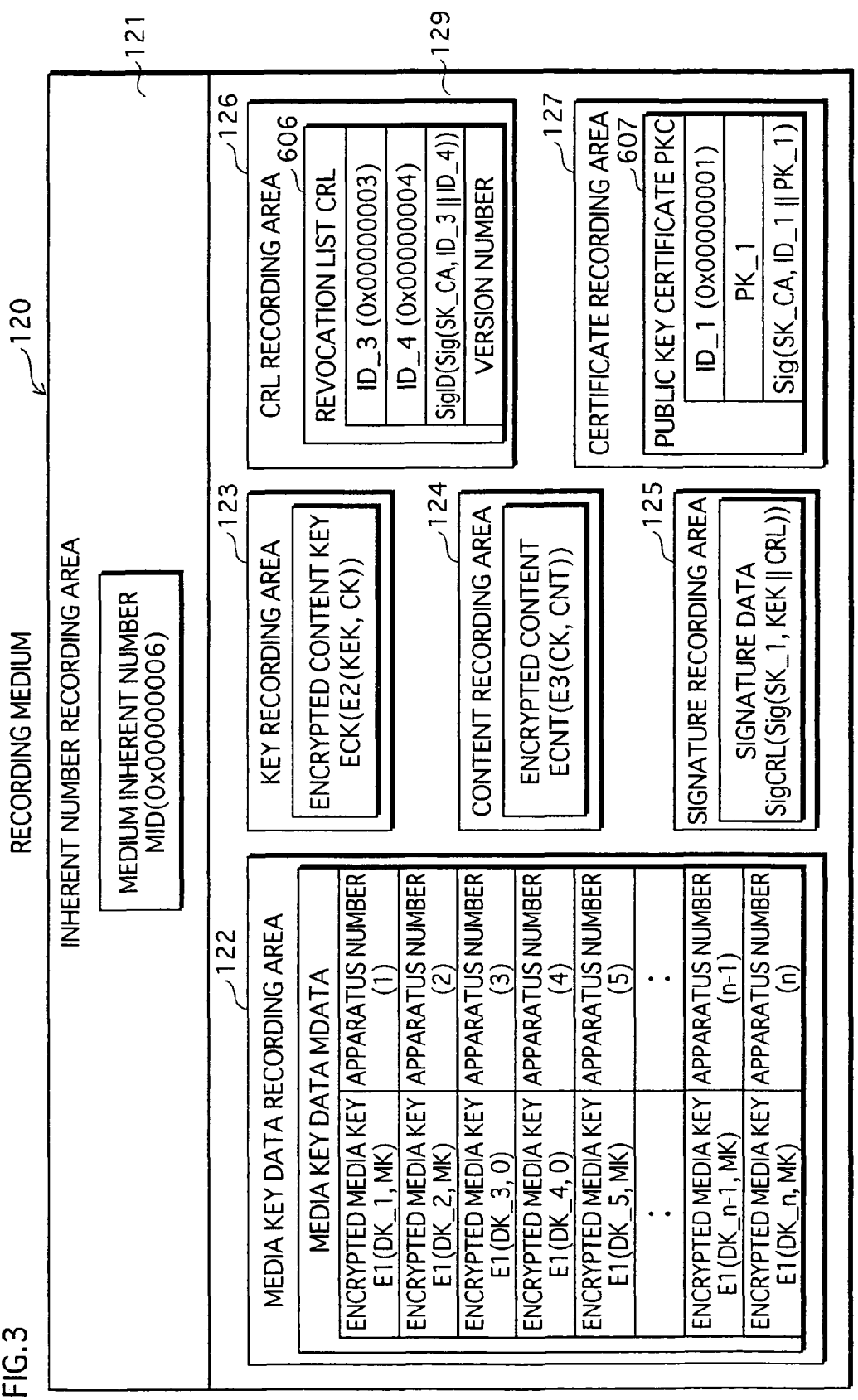
FIG. 3 is a data structure diagram that shows the structure of the data recording on the recording medium 120.

The recording medium 120 is an optical disc medium and includes, as shown in FIG. 3, an inherent number recording area 121 and a general area 129.

In the inherent number recording area 121, the medium inherent number MID which is an inherent number that identifies the recording medium 120 is prestored. The inherent number recording area 121 is an unrewritable area into which it is impossible to write other information and in which it is impossible to rewrite the medium inherent number MID. The medium inherent number MID is expressed as, for example, an eight character hexadecimal number and is "0x00000006". It should be noted that in the present description "0x" means that an expression that follows it is a hexadecimal number.

The general area 129 is an area into which it is possible to write other information. Originally, no information is written in the general area 129.

After the aforementioned operations are performed by the recording apparatus 100, the media key data recording area 122, the key recording area 123, the content recording area 124, the signature recording area 125, the CRL recording area 126, and the certificate recording area 127 are reserved in the general area 129, as shown in FIG. 3.

As explained earlier, in the first embodiment, the total number of the recording apparatus 100 and the reproduction apparatus 200a, 200b, 200c, 200d, 200e, ... is n. Among these apparatuses, the reproduction apparatus 200b and the reproduction apparatus 200c are revoked. It is assumed that each of these n apparatuses owns only one unique device key each. Based on this assumption, various kinds of data as specific examples are recorded within areas of the general area 129 of the recording medium 120.

The Media Key Data Recording Area 122

The media key data recording area 122 has the media key data MDATA recorded therein. The media key data MDATA includes n sets of an encrypted media key and an apparatus number.

Each apparatus number is identification information that identifies an apparatus.

Each encrypted media key is generated by implementing the encryption algorithm E1 on the media key MK or the value "0", using the device key DK_m assigned to the apparatus "m" identified with the corresponding apparatus number "m". Here, in a case where the apparatus m is revoked, the value "0" is used. Conversely, in a case where the apparatus m is not revoked, the media key MK is used.

The encrypted media key=E1(DK_m, MK)

or The encrypted media key=E1(DK_m, 0)

The Key Recording Area 123

The key recording area 123 has the encrypted content key ECK recorded therein. The encrypted content key ECK is generated by implementing the encryption algorithm E2 on the content key CK, using the key encryption key KEK.

The encrypted content key ECK=E2 (KEK, CK)

Here, the key encryption key KEK is a key calculated using an output value of a hash function when an input value is a combined value of the media key MK and the medium inherent number MID.

The key encryption key KEK=SHA-1(MK||MID)

The Content Recording Area 124

The content recording area 124 has the encrypted content ECNT recorded therein. The encrypted content ECNT is generated by implementing the encryption algorithm E3 on the content, using the content key CK.

The encrypted content ECNT=E3 (CK, CNT)

The Signature Recording Area 125

The signature recording area 125 has the signature data SigCRL recorded therein.

The signature data SigCRL is generated by using the digital signature function Sig on the combined value (KEK|

|CRL) of the key encryption key KEK and the revocation list CRL, using the secret key SK_1.

The signature data SigCRL=Sig (SK_1, (KEK| |CRL))

The CRL Recording Area 126

The CRL recording area 126 has the revocation list CRL recorded therein. The revocation list CRL shows the IDs of the certificates that are to be revoked. The revocation list CRL includes, for example, the certificate identifiers ID_3, ID_4, the signature data SigID, and a version number.

The certificate identifiers ID_3 and ID_4 are each a piece of identification information that identifies a revoked public key certificate. The signature data SigID is generated by using the digital signature function Sig on a combined value of all the certificate identifiers included in the revocation list CRL (or in a case where one certificate identifier is included in the revocation list CRL, using the digital signature function Sig on this certificate identifier), using the secret key of the certificate authority CA, SK_CA.

The signature data SigID=Sig (SK_CA, a combined value of all the certificate identifiers)

The signature data of the certificate authority CA is included so that authenticity of the revocation list CRL can be guaranteed.

The version number is information that indicates a generation of the revocation list CRL.

It is acceptable if the format of the CRL is one that is publicly known. Alternatively, it is acceptable if the format of the CRL is one that specializes in a system.

The Certificate Recording Area 127

The certificated recording area 127 has the public key certificate PKC recorded therein. The public key certificate PKC includes a certificate identifier ID_1, a public key PK_1, and signature data Sig_1.

The certificate identifier ID_1 is identification information that identifies the public key certificate PKC. The public key PK_1 is in accordance with a public key encryption method and corresponds to the secret key SK_1.

The signature data Sig_1 is generated by using the digital signature function Sig on the combined value (ID_1| |PK_1) of the certificate identifier ID_1 and the public key PK_1, using the secret key of the certificate authority CA, SK_CA.

The signature data Sig_1=Sig (SK_CA, ID_1| |PK_1)

The signature data of the certificate authority CA is included so that authenticity of the public key certificate can be guaranteed.

It is acceptable if the format of the public key certificate is one that is publicly known. Alternatively, it is acceptable if the format of the public key certificate is one that specializes in a system.

1.5 The Reproduction Apparatus 200

Since the reproduction apparatuses 200a, 200b, 200c, . . . have the same structure, explanation is provided here as to the reproduction apparatus 200.

Figure 4:
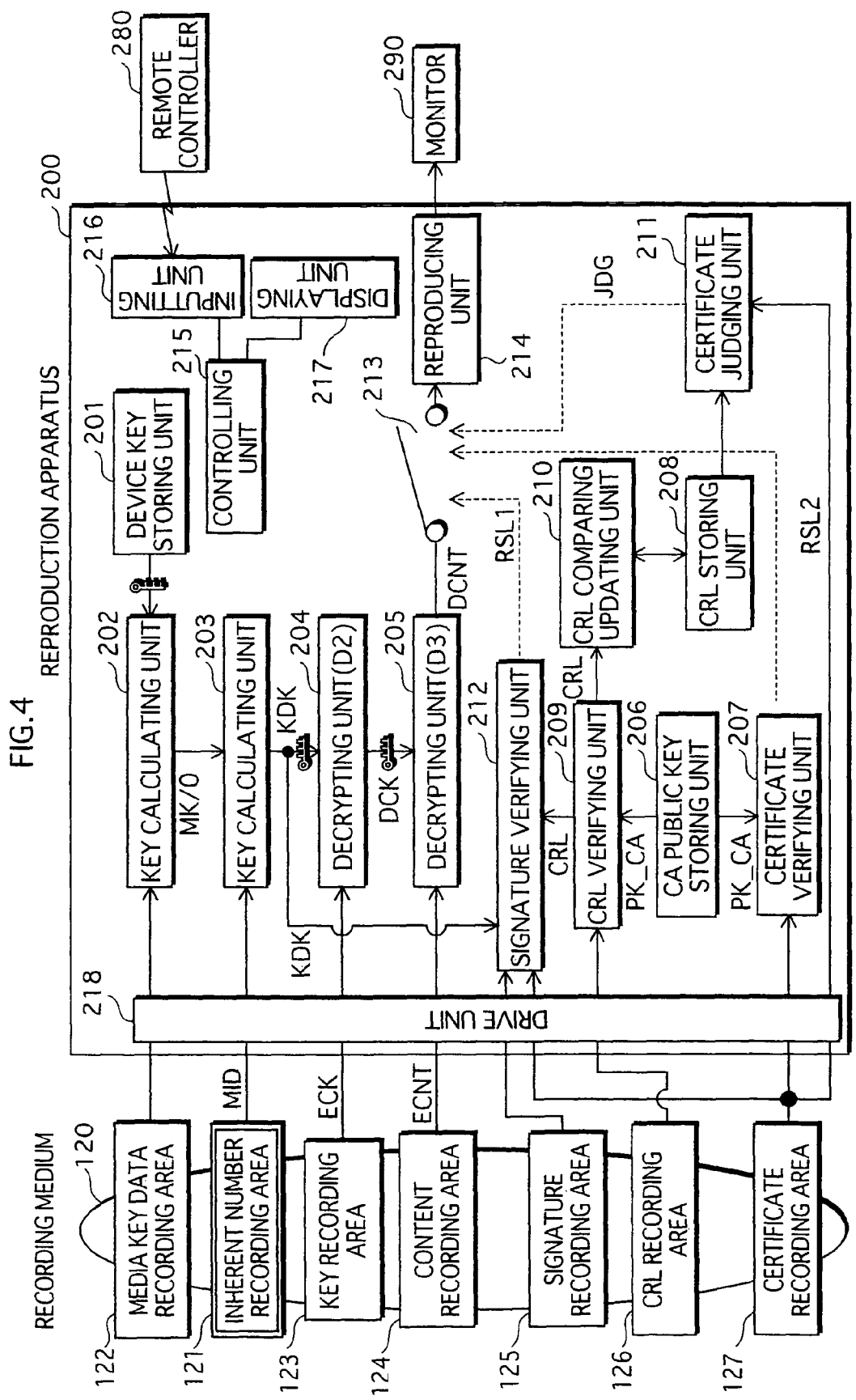
FIG. 4 is a block diagram that shows the structure of the reproduction apparatus 200.

As shown in FIG. 4, the reproduction apparatus 200 comprises a device key storing unit 201, a key calculating unit 202, a key calculating unit 203, a decrypting unit 204, a decrypting unit 205, a CA public key storing unit 206, a certificate verifying unit 207, a CRL storing unit 208, a CRL verifying unit 209, a CRL comparing updating unit 210, a certificate judging unit 211, a signature verifying unit 212, a switch 213, a reproducing unit 214, a controlling unit 215, an inputting unit 216, a displaying unit 217, and a drive unit 218.

More specifically, like the content server apparatus 500, the reproduction apparatus 200 is a computer system that comprises a microprocessor, a ROM, a RAM, a hard disk unit, and the like. The RAM and the hard disk unit each store therein a computer program. The reproduction apparatus 200 achieves its functions when the microprocessor operates according to the computer programs.

(1) The Device Key Storing Unit 201

The device key storing unit 201 secretly stores therein a device key DK_x in such a manner that the device key DK_x is not accessible from an external apparatus. The device key DK_x is a key unique to the reproduction apparatus 200.

The device key DK_x stored in the device key storing unit 201 is different for each of the reproduction apparatuses 200a, 200b, 200c, 200d, 200e, . . . . The device key storing units 201 of the reproduction apparatuses 200a, 200b, 200c, 200d, 200e, . . . store therein the device keys DK_2, DK_3, DK_4, DK_5, DK_6, . . . , respectively.

(2) The Key Calculating Unit 202

The key calculating unit 202 prestores therein an apparatus number "x" assigned to the reproduction apparatus 200. The apparatus number "x" stored in the key calculating unit 202 is different for each of the reproduction apparatuses 200a, 200b, 200c, 200d, 200e, . . . . The key calculating units 202 of the reproduction apparatuses 200a, 200b, 200c, 200d, 200e, . . . store therein the apparatus numbers "2", "3", "4", "5", "6", . . . , respectively.

The key calculating unit 202 sequentially reads n sets that are included in the media key data MDATA from the media key data recording area 122 of the recording medium 120 via the drive unit 218. The key calculating unit 202 then looks for a set that includes the stored apparatus number "x", out of the read sets. When a set that includes the apparatus number "x" is found, the key calculating unit 202 extracts an encrypted media key E1(DK_x, y) that corresponds to the apparatus number "x" from the found set. Here, when the reproduction apparatus 200 is either the reproduction apparatus 200b or the reproduction apparatus 200c, y is the value "0". When the reproduction apparatus 200 is a reproduction apparatus other than the reproduction apparatuses 200b and 200c, y is the media key MK.

Next, the key calculating unit 202 reads the device key DK_x from the device key storing unit 201 and implements a decryption algorithm D1 on the extracted encrypted media key E1 (DK_x, y), using the read device key DK_x, so as to generate a decryption media key y.

The decryption media key y=D1 (DK_x, (E1 (DK_x, y))

Here, the decryption media key y is either the media key Mk or the value "0".

Next, the key calculating unit 202 outputs the generated decryption media key y to the key calculating unit 203.

(3) The Key Calculating Unit 203

The key calculating unit 203 operates in the same manner as the key calculating unit 104.

The key calculating unit 203 receives the decryption media key y from the key calculating unit 202 and reads the medium inherent number MID from the inherent number recording area 121 of the recording medium 120 via the drive unit 218.

Next, the key calculating unit 203 combines the received decryption media key y with the read medium inherent number MID in the stated order, so as to generate a combined value (y| |MID) The key calculating unit 203 then implements the hash function SHA-1 on the generated combined value (y| |MID), so as to obtain a hash value H'=SHA-1(y| |MID). The key calculating unit 203 takes the obtained hash value H' as a key decryption key KDK and outputs the key decryption key KDK to the decrypting unit 204 and the signature verifying unit 212.

As mentioned above, when the key calculating unit 104 takes a part of the obtained hash value as a key encryption key KEK, the key calculating unit 203 also takes the same part of the obtained hash value as a key decryption key KDK.

(4) The Decrypting Unit 204

The decrypting unit 204 reads the encrypted content key ECK from the key recording area 123 of the recording medium 120 via the drive unit 218 and receives the key decryption key KDK from the key calculating unit 203.

Next the decrypting unit 204 implements a decryption algorithm D2 on the read encrypted content key ECK using the received key decryption key KDK, so as to generate a decrypted content key DCK.

The decrypted content key DCK=D2(KDK, ECK)

Here, the decryption algorithm D2 is an algorithm for decrypting an encrypted text generated by implementing the encryption algorithm E2 and is according to, for example, DES.

Next, the decrypting unit 204 outputs the generated decrypted content key DCK to the decrypting unit 205.

(5) The Decrypting Unit 205

The decrypting unit 205 reads the encrypted content ECNT from the content recording area 124 of the recording medium 120 via the drive unit 218 and receives the decrypted content key DCK from the decrypting unit 204.

Next, the decrypting unit 205 implements the decryption algorithm D3 on the read encrypted content ECNT using the received decrypted content key DCK, so as to generate a decrypted content DCNT.

The decrypted content DCNT=D3(DCK, ECNT)

Here, the decryption algorithm D3 is an algorithm for decrypting an encrypted text generated by implementing the encryption algorithm E3 and is according to, for example, DES.

Next, the decrypting unit 205 outputs the generated decrypted content DCNT to the switch 213.

(6) The CA Public Key Storing Unit 206

The CA public key storing unit 206 prestores therein a public key of the certificate authority CA, PK_CA.

(7) The Certificate Verifying Unit 207

The certificate verifying unit 207 reads the public key PK_CA from the CA public key storing unit 206 and reads the public key certificate PKC from the certificate recording area 127 of the recording medium 120 via the drive unit 218.

Next, the certificate verifying unit 207 extracts the certificate identifier ID_1, the public key PK_1, and the signature data Sig_1 from the read public key certificate PKC, and combines the extracted certificate identifier ID_1 and the public key PK_1 in the stated order, so as to generate a combined value (ID_1||PK_1).

The certificate verifying unit 207 then implements a signature verification algorithm Vrfy on the extracted signature data Sig_1 and the generated combined value (ID_1||PK_1) using the read public key PK_CA, so as to obtain a verification result RSL2. The verification result RSL2 is information that indicates either a verification success or a verification failure.

Here, the signature verification algorithm Vrfy is an algorithm for verifying a piece of signature data generated with the digital signature function Sig.

Next, the certificate verifying unit 207 outputs the verification result RSL2 to the switch 213.

(8) The CRL Storing Unit 208

The CRL storing unit 208 has a public key certificate revocation list (hereafter, it will be referred to as the stored revocation list "CRL_ST") recorded thereon, which indicates one or more public key certificates that are revoked at a second point of time.

Like the revocation list CRL which indicates public key certificates that are revoked at the first point of time, the stored revocation list CRL_ST includes one or more certificate identifiers as well as signature data SigID and a version number.

As for the certificate identifiers and the signature data SigID, they are the same as the ones mentioned earlier.

The version number is information that indicates a generation of the stored revocation list CRL_ST and shows that the stored revocation list CRL_ST is based on the second point of time. The newer the generation of the stored revocation list is, the bigger the value of the version number is.

(9) The CRL Verifying Unit 209

The CRL verifying unit 209 reads the public key PK_CA from the CA public key storing unit 206 and reads the revocation list CRL from the CRL recording area 126 of the recording medium 120 via the drive unit 218.

Next, the CRL verifying unit 209 extracts one or more certificate identifiers and the signature data SigID from the read revocation list CRL. Here, when a plurality of certificate identifiers are extracted, they are combined in the order in which they are arranged in the revocation list CRL so as to generate a combined value. When only one certificate identifier is extracted, this certificate identifier is taken as the combined value.

Next, the CRL verifying unit 209 implements the signature verification algorithm Vrfy on the extracted signature data SigID and the generated combined value, using the read public key PK_CA, so as to obtain a verification result RSL3. The verification result RSL3 indicates either a verification success or a verification failure.

When the verification result RSL3 shows a verification success, the CRL verifying unit 209 outputs the read revocation list CRL to the signature verifying unit 212 and the CRL comparing updating unit 210.

(10) The CRL Comparing Updating Unit 210

The CRL comparing updating unit 210 receives the revocation list CRL from the CRL verifying unit 209.

Having received the revocation list CRL, the CRL comparing updating unit 210 extracts the version number from the received revocation list CRL, reads the stored revocation list CRL_ST from the CRL storing unit 208, and extracts the version number from the read stored revocation list CRL_ST. Next, the CRL comparing updating unit 210 judges whether the version number extracted from the revocation list CRL is larger than the version number extracted from the stored revocation list CRL_ST.

Having judged that the version number extracted from the revocation list CRL is larger than the version number extracted from the stored revocation list CRL_ST, the CRL comparing updating unit 210 considers that the generation of the revocation list CRL is newer than the generation of the stored revocation list CRL_ST and overwrites the stored revocation list CRL_ST in the CRL storing unit 208 with the revocation list CRL, which is to function as the stored revocation list CRL_ST.

Having judged that the version number extracted from the revocation list CRL is smaller than or equal to the version number extracted from the stored revocation list CRL_ST, the CRL comparing updating unit 210 considers that the generation of the revocation list CRL is older than or equal to the generation of the stored revocation list CRL_ST and does not perform the overwriting described above.

(11) The Certificate Judging Unit 211

The certificate judging unit 211 reads the stored revocation list CRL_ST from the CRL storing unit 208. Here, the stored revocation list CRL_ST stored in the CRL storing unit 208 has been updated to a newest one by the CRL comparing updating unit 210. The certificate judging unit 211 reads the public key certificate PKC from the certificate recording area 127 of the recording medium 120 via the drive unit 218.

Next, the certificate judging unit 211 extracts the certificate identifier ID_1 from the read public key certificate PKC, and judges whether the extracted certificate identifier ID_1 is included in the stored revocation list CRL_ST. The certificate judging unit 211 then outputs the judgment result JDG to the switch 213. Here, the judgment result JDG is information indicating whether the certificate identifier ID_1 is included in the stored revocation list CRL_ST or not.

(12) The Signature Verifying Unit 212

The signature verifying unit 212 receives the key decryption key KDK from the key calculating unit 203. Also, the signature verifying unit 212 reads the signature data SigCRL from the signature recording area 125 of the recording medium 120 via the drive unit 218 and reads the public key certificate PKC from the certificate recording area 127 of the recording medium 120 via the drive unit 218. The signature verifying unit 212 further receives the revocation list CRL from the CRL verifying unit 209.

Next, the signature verifying unit 212 extracts the public key PK_1 from the read public key certificate PKC and combines the received key decryption key KDK and the received revocation list CRL so as to generate a combined value (KDK| |CRL). The signature verifying unit 212 further implements the signature verification algorithm Vrfy on the read signature data SigCRL and the generated combined value (KDK| |CRL), using the extracted public key PK_1, so as to obtain a verification result RSL1. The verification result RSL1 is information indicating either a verification success or a verification failure.

Next, the signature verifying unit 212 outputs the verification result RSL1 to the switch 213.

(13) The Switch 213

The switch 213 receives the decrypted content DCNT from the decrypting unit 205. The switch 213 also receives the judgment result JDG from the certificate judging unit 211, receives the verification result RSL2 from the certificate verifying unit 207, and receives the verification result RSL1 from the signature verifying unit 212.

When all of the following conditions are satisfied, the switch 213 outputs the received decrypted content DCNT to the reproducing unit 214: (i) the received verification result RSL1 indicates a verification success, (ii) the received verification result RSL2 indicates a verification success, and also (iii) the received judgment result JDG indicates that the certificate identifier ID_1 is not included in the stored revocation list CRL_ST. When at least one of the following conditions is satisfied, the switch 213 does not output the received decrypted content DCNT to the reproducing unit 214: (i) the received verification result RSL1 indicates a verification failure, (ii) the received verification result RSL2 indicates a verification failure, and (iii) the received judgment result JDG indicates that the certificate identifier ID_1 is included in the stored revocation list CRL_ST.

(14) The Reproducing Unit 214

The reproducing unit 214 receives the decrypted content DCNT from the switch 213, generates video information and audio information from the received decrypted content DCNT, and converts the generated video information and audio information into analog video signals and analog audio signals, so as to output the analog video and audio signals to the monitor 290.

(15) The Controlling Unit 215, The Inputting Unit 216, The Displaying Unit 217, The Drive Unit 218, The Monitor 290, and The Remote Controller 280

The controlling unit 215 controls the operations of the constituents of the reproduction apparatus 200.

The remote controller 280 includes various buttons and generates operation instruction information according to the operator's operations on the buttons, so as to output the generated operation instruction information on an infrared ray.

The inputting unit 216 receives the infrared ray that includes the operation instruction information from the remote controller 280, extracts the operation instruction information from the received infrared ray, and outputs the extracted operation instruction information to the controlling unit 215.

The displaying unit 217 displays various information under the control of the controlling unit 215.

The drive unit 218 reads information from the recording medium 120.

The monitor 290 includes a CRT and a speaker and receives analog video signals and analog audio signals from the reproducing unit 214, so as to display video based on the video signals and outputs audio based on the audio signals.

1.6 Operations of the Content Supply System 10

The following describes the operation of the content supply system 10, particularly the operation of writing data onto the recording medium 120 performed by the recording apparatus 100 and the operation of reproducing data recorded on the recording medium 120 performed by the reproduction apparatus 200.

(1) The Operation of Writing Data Performed by the Recording Apparatus 100

Figure 5:
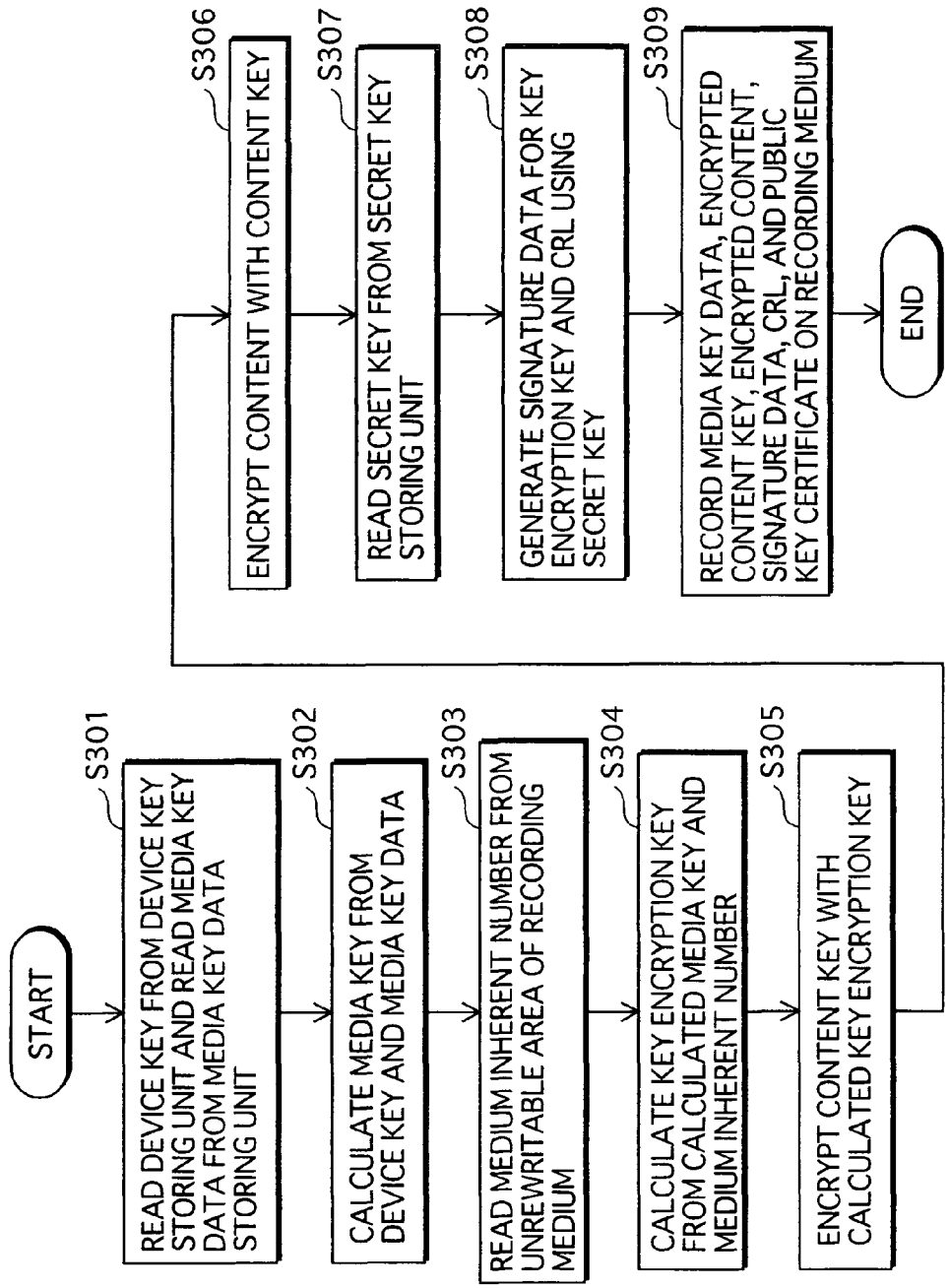
FIG. 5 is a flow chart that shows the operation of writing data onto the recording medium 120 performed by the recording apparatus 100.

The following describes the operation of writing data onto the recording medium 120 performed by the recording apparatus 100, with reference to the flow chart in FIG. 5.

The key calculating unit 103 reads the device key DK_1 and the media key data MDATA from the device key storing unit 101 and the media key data storing unit 102, respectively (Step S301). The key calculating unit 103 then generates a media key MK using the read device key DK_1 and the media key data MDATA (Step S302).

Next, the key calculating unit 104 reads the medium inherent number MID from the inherent number recording area 121 of the recording medium 120 (Step S303), and calculates a key encryption key KEK using the generated media key MK and the read medium inherent number MID (Step S304).

Then, the encrypting unit 105 encrypts the content key CK obtained from the content server apparatus 500 using the calculated key encryption key KEK so as to generate an encrypted content key ECK (Step S305).

Next, the encrypting unit 106 encrypts the content CNT obtained from the content server apparatus 500 using the content key CK obtained from the content server apparatus 500 so as to generate an encrypted content ECNT (Step S306).

The signature generating unit 110 then reads the secret key SK_1 from the secret key storing unit 107 (Step S307) and generates signature data SigCRL for the key encryption key KEK and the revocation list CRL, using the read secret key SK_1 (Step S308).

Next, the recording apparatus 100 records the media key data MDATA, the encrypted content key ECK, the encrypted content ECNT, the signature data SigCRL, the revocation list CRL, and the public key certificate PKC on the recording medium via the drive unit 111 (Step S309).

(2) The Operation of Reproducing Data Performed by the Reproduction Apparatus 200

Figure 6:
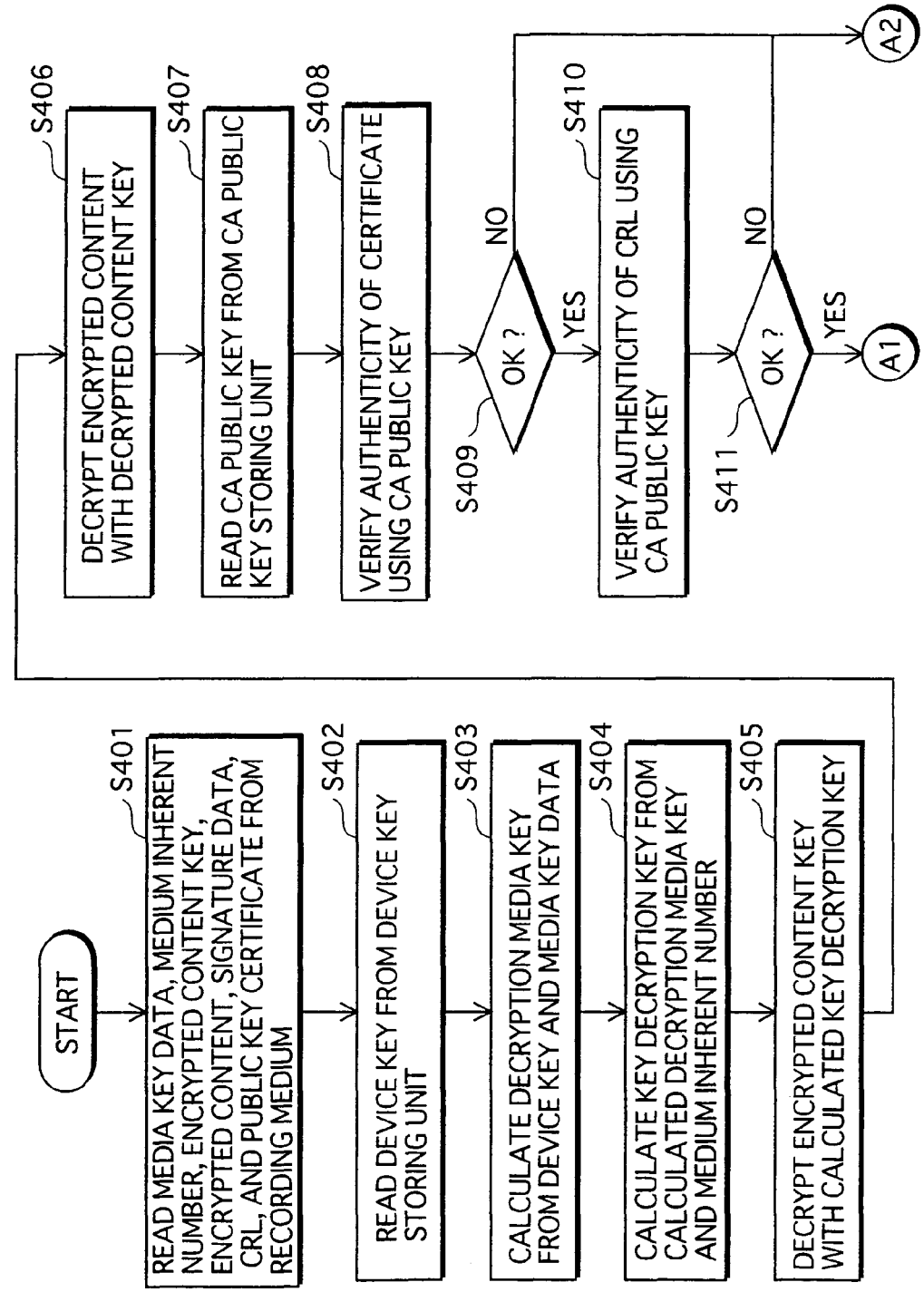
FIG. 6 is a flow chart that shows the operation of reproducing the data recorded on the recording medium 120 performed by the reproduction apparatus 200 (to be continued in FIG. 7)
Figure 7:
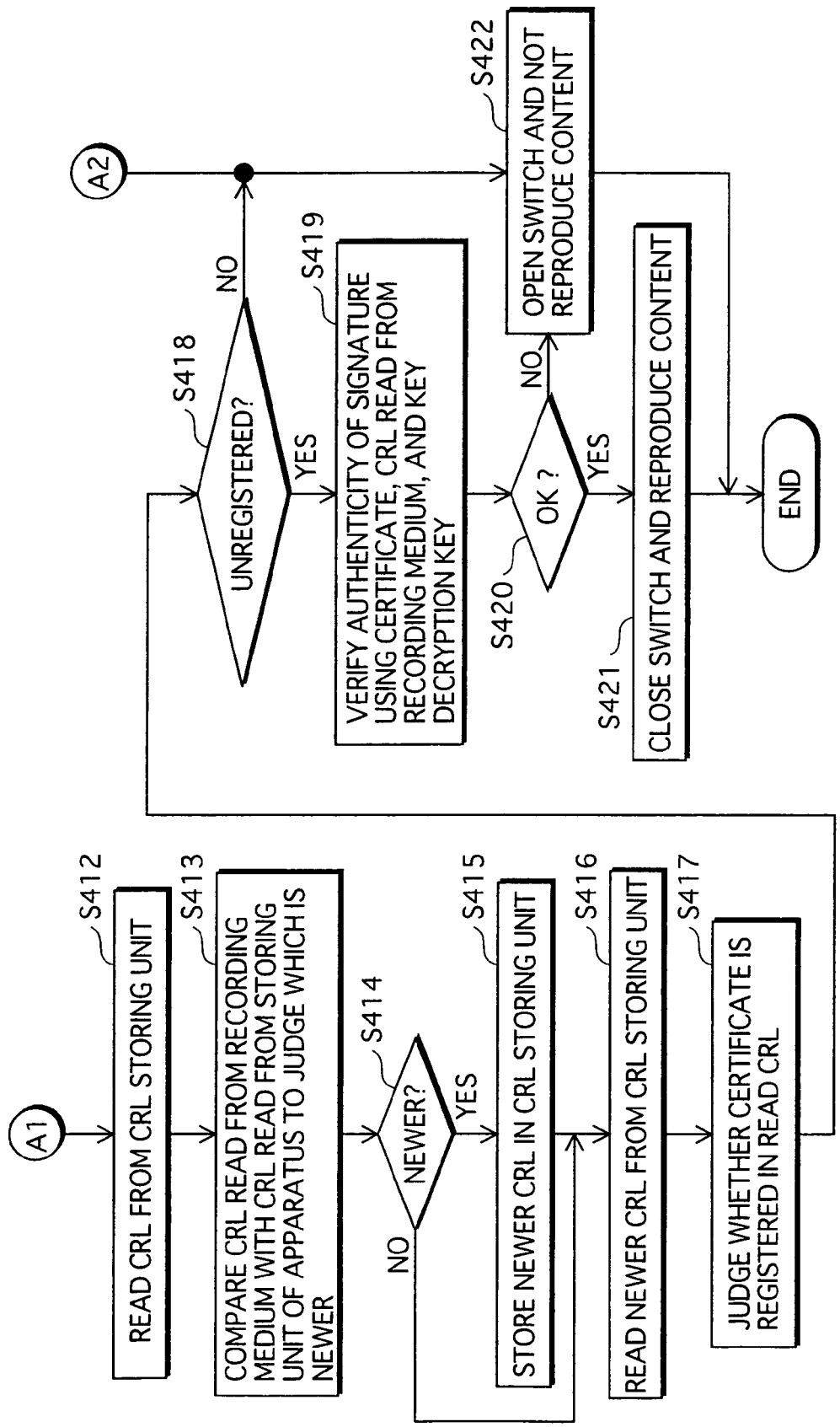
FIG. 7 is a flow chart that shows the operation of reproducing the data recorded on the recording medium 120 performed by the reproduction apparatus 20 (continued from FIG. 6)

The following describes the operation of reproducing data recorded on the recording medium 120 performed by the reproduction apparatus 200, with reference to the flow charts in FIGS. 6 and 7.

The reproduction apparatus 200 reads the media key data MDATA, the medium inherent number MID, the encrypted content key ECK, the encrypted content ECNT, the signature data SigCRL, the revocation list CRL and the public key certificate PKC from the recording medium 120 (Step S401).

Next, the key calculating unit 202 reads the device key DK_x from the device key storing unit 201 (Step S402) and obtains a decryption media key y, using the read media key data MDATA and the device key DK_x (Step S403).

The key calculating unit 203 then calculates a key decryption key KDK from the read medium inherent number MID and the obtained decryption media key y (Step S404).

The decrypting unit 204 then decrypts the read encrypted content key ECK using the calculated key decryption key KDK so as to obtain a decrypted content key DCK (Step S405).

Next, the decrypting unit 205 decrypts the read encrypted content ECNT using the obtained decrypted content key DCK so as to obtain a decrypted content DCNT (Step S406).

The certificate verifying unit 217 then reads the public key of the certificate authority CA, PK_CA from the CA public key storing unit 206 (Step S407), and verifies authenticity of the read public key certificate PKC using the read public key of the certificate authority CA, PK_CA (Step S408).

When the verification of authenticity of the public key certificate PKC has failed (Step S409), the control is shifted to Step S422. When the verification of authenticity of the public key certificate PKC has been successful (Step S409), the CRL verifying unit 209 verifies authenticity of the read revocation list CRL using the public key of the certificate authority CA, PK_CA (Step S410).

When the verification of authenticity of the revocation list CRL has failed (Step S411), the control is shifted to Step S422. When the verification of authenticity of the revocation list CRL has been successful (Step S411), the CRL comparing updating unit 210 reads the stored revocation list CRL_ST from the CRL storing unit 208 (Step S412), and compares the revocation list CRL read from the recording medium 120 with the stored revocation list CRL_ST read from the CRL storing unit 208 to judge which one is newer (Step S413).

When having judged that the revocation list CRL is newer than the stored revocation list CRL_ST, as a result of the comparison (Step S414), the CRL comparing updating unit 210 overwrites the stored revocation list CRL_ST in the CRL storing unit 208 with the revocation list CRL which has been judged newer and is to function as the stored revocation list CRL_ST (Step S415). When the revocation list CRL is judged to be older than the stored revocation list CRL_ST (Step S414), the control is shifted to Step S416.

Next, the certificate judging unit 211 reads the stored revocation list CRL_ST from the CRL storing unit 208 (Step S416) and judges whether the public key certificate PKC is registered in the read stored revocation list CRL_ST by judging whether the certificate identifier ID_1 extracted from the read public key certificate PKC is included in the stored revocation list CRL_ST or not (Step S417).

When the judgment result is that the public key certificate is registered (Step S418), the control is shifted to Step S422. When the judgment result is that the public key certificate is not registered (Step S418), the signature verifying unit 212 verifies authenticity of the signature data SigCRL using the key decryption key KDK, the public key certificate PKC and the revocation list CRL (Step S419).

When the verification of authenticity of the signature data SigCRL has failed (Step S420), the switch 213 is opened, and the content does not get reproduced (Step 422). Thus, the operation of reproduction performed by the reproduction apparatus 200 is completed.

Conversely, when the verification of authenticity of the signature data SigCRL has been successful (Step S420), the switch 213 is closed, and the decrypted content DCNT is outputted to the reproducing unit 214 so that the reproducing unit 214 reproduces the decrypted content DCNT (Step S421). Thus, the operation of reproduction performed by the reproduction apparatus 200 is completed.

1.7 Other Modification Examples (1) In the first embodiment, in order to realize the mechanism in which the revocation list CRL is transferred via a recording medium, the recording apparatus generates the signature data SigCRL for the revocation list CRL being a target of the signature, and writes the generated signature data SigCRL onto the recording medium; however, the present invention is not limited to this arrangement.

For example, it is acceptable to have an arrangement wherein the recording apparatus calculates a hash value for the revocation list CRL and generates a piece of signature data for the hash value.

The signature data=Sig (SK_1, HASH (CRL))

Here, HASH (A) is a hash value obtained by implementing a hash function HASH on the data A.

Alternatively, it is also acceptable to have an arrangement wherein the recording apparatus calculates a hash value for the revocation list CRL and implements an XOR (exclusive-OR) operation on the hash value and the media key, so as to generate a piece of signature data for the result of the operation.

The signature data=Sig (SK_1, (HASH(CRL)XOR(MK))

This way, the recording apparatus generates a piece of signature data for the revocation list CRL and the content, or generates a piece of signature data for the revocation list CRL and various kinds of key data. As a result, since the generated piece of signature data is written onto the recording medium, it is possible to prevent falsification and deletion of the revocation list recorded on the recording medium.

Additionally, in such cases, the reproduction apparatus performs signature verification using the corresponding data in each case.

(2) In the first embodiment, when the revocation list CRL obtained from an external source is compared with the revocation list CRL stored inside the apparatus in order to judge which one is newer, the version numbers are compared; however the present invention is not limited to this arrangement.

For example, on a premise that the revocation list CRL simply increases in size as the revocation list CRL is updated, it is acceptable to judge a CRL in a larger size to be newer.

In a similar way, on a premise that the number of revoked apparatuses simply increases as the revocation list CRL is updated, it is acceptable to judge a CRL having a larger number of revoked apparatuses to be newer, by comparing the number of revoked apparatuses included.

As explained above, it is acceptable to have any arrangement as long as the arrangement makes it possible to obtain information from the CRL in order to compare and judge which list is newer.

(3) It is acceptable to have an arrangement wherein a newest version of media key data is transferred to the recording apparatus via a second recording medium.

A newest version of media key data is recorded on the second recording medium.

The recording apparatus prestores therein a piece of media key data. When the second recording medium on which a piece of media key data is recorded is mounted on the recording apparatus, the recording apparatus compares the piece of media key data stored in the recording apparatus with the piece of media key data recorded on the second recording medium to judge which one is newer. When the piece of media key data recorded on the second recording medium is newer than the piece of media key data stored in the recording apparatus, the recording apparatus overwrites the piece of media key data stored in the recording apparatus with the piece of media key data recorded on the second recording medium.

Here, a version number indicating a generation is attached to each piece of media key data. The recording apparatus uses the version numbers to compare the pieces of media key data and judge which one is newer.

It is also acceptable to have an arrangement wherein a part of the media key calculated from the piece of media key data is a version number, and the remaining part of the media key is generated with the use of random numbers. The recording apparatus extracts a version number which is a part of the media key from each piece of media key data and uses the extracted version numbers to compare the pieces of media key data and judge which one is newer.

Further, on a premise that, as a piece of media key data is updated, the number of revoked apparatuses in the piece of media key data simply increases, in other words, the number of encrypted media keys in which the value "0" is encrypted instead of the media key MK simply increases, it is acceptable that the recording apparatus uses the number of revoked apparatuses included in each piece of media key data in order to compare pieces of media key data and judge which one is newer.

Furthermore, it is acceptable to have an arrangement wherein time information (year, month, day, hour, minute, second) showing when the piece of media key data is generated is attached to each piece of media key data, and the recording apparatus uses the time information in order to compare pieces of media key data and judge which one is newer.

As explained so far, it is acceptable to have any arrangement as long as the arrangement makes it possible to compare pieces of media key data to judge correctly which one is newer.

Additionally, it is acceptable to have an arrangement wherein a signature of the certificate authority CA is attached to each piece of media key data in order to prevent falsification. The recording apparatus verifies authenticity of each piece of media key data by verifying the signature.

(4) It is acceptable to have an arrangement wherein, when a second encrypted content is additionally written onto a recording medium on which a piece of media key data, an encrypted content, and the like have already been recorded, the recording apparatus generates the second encrypted content by encrypting a content obtained from an external source (for example a content server apparatus) based on the piece of media key data stored in the recording medium or based on the piece of media key data recorded on the recording medium and writes the generated second encrypted content onto the recording medium.

In such a case, there is a possibility that a plurality of pieces of media key data, a plurality of public key certificates, and a plurality of revocation lists CRL exist on the recording medium.

Further, it is acceptable to have an arrangement wherein the recording apparatus compares the piece of media key data recorded on the recording medium with the piece of media key data stored in the recording apparatus to judge which one is newer, and when the piece of media key data stored in the recording apparatus is newer, the recording apparatus generates a decrypted content by decrypting the encrypted content recorded on the recording medium as well as generates a re-encrypted content by encrypting the generated decrypted content based on the newer media key stored in the recording medium, so that the generated re-encrypted content is written onto the recording medium. At this time, it is also acceptable to delete the encrypted content recorded on the recording medium.

(5) In the first embodiment, a piece of signature data is generated by using a digital signature function on the key encryption key KEK; however, the present invention is not limited to this arrangement.

For example, it is acceptable to have an arrangement wherein a piece of signature data is generated by using a digital signature function on a hash value for the content CNT as a whole.

The signature data=Sig (SK_1, (HASH(CNT))

More specifically, the purpose of having the signature is to verify authenticity of the recording apparatus that has recorded the content; therefore, it is acceptable that the data being a target of the signature is any information as long as the data is information related to the content or related to the key used in the encryption.

(6) In the first embodiment, as shown in FIG. 2, the recording apparatus 100 is structured as one body comprising the device key storing unit 101, the media key data storing unit 102, the key calculating unit 103, the key calculating unit 104, the encrypting unit 105, the encrypting unit 106, the secret key storing unit 107, the certificate storing unit 108, the CRL storing unit 109, the signature generating unit 110, the drive unit 111, the controlling unit 112, and the transmitting and receiving unit 113; however, the present invention is not limited to this.

For example, it is acceptable if the recording apparatus is made up of a drive apparatus and a processing apparatus, the drive apparatus comprising the device key storing unit 101, the media key data storing unit 102, the key calculating unit 103, the key calculating unit 104, the encrypting unit 105, the encrypting unit 106, the secret key storing unit 107, the certificate storing unit 108, the CRL storing unit 109, the signature generating unit 110, the drive unit 111 and a part of the controlling unit 112 as one body; and the processing apparatus comprising the other part of the controlling unit 112 and the transmitting and receiving unit 113 as one body. In this arrangement, the recording apparatus is separated into (i) the drive apparatus that performs writing and reading of data to and from recording media as well as encryption and (ii) the processing apparatus that performs other processing.

It is acceptable to have an arrangement wherein the device key storing unit 101, the media key data storing unit 102, the secret key storing unit 107, the certificate storing unit 108, and the CRL storing unit 109 are in a recording area of an external recording apparatus. Here, an example of external recording apparatus is a portable secure memory card.

Further, in the first embodiment, as shown in FIG. 4, the reproduction apparatus 200 is structured as one body comprising the device key storing unit 201, the key calculating unit 202, the key calculating unit 203, the decrypting unit 204, the decrypting unit 205, the CA public key storing unit 206, the certificate verifying unit 207, the CRL storing unit 208, the CRL verifying unit 209, the CRL comparing updating unit 210, the certificate judging unit 211, the signature verifying unit 212, the switch 213, the reproducing unit 214, the controlling unit 215, the inputting unit 216, the displaying unit 217, and the drive unit 218; however, the present invention is not limited to this arrangement.

It is acceptable if the reproduction apparatus is made up of a drive apparatus and a processing apparatus, the drive apparatus comprising the device key storing unit 201, the key calculating unit 202, the key calculating unit 203, the decrypting unit 204, the decrypting unit 205, the CA public key storing unit 206, the certificate verifying unit 207, the CRL storing unit 208, the CRL verifying unit 209, the CRL comparing updating unit 210, the certificate judging unit 211, the signature verifying unit 212, the switch 213, and the drive unit 218 as one body; and the processing apparatus comprising the reproducing unit 214, the controlling unit 215, the inputting unit 216, and the displaying unit 217 as one body. In this arrangement, the reproduction apparatus is separated into (i) the drive apparatus that performs writing and reading of data to and from recording media as well as encryption and (ii) the processing apparatus that performs other processing.

It is acceptable to have an arrangement wherein the device key storing unit 201, the CA public key storing unit 206, and the CRL storing unit 208 are in a recording area of an external recording apparatus. Here, an example of external recording apparatus is a portable secure memory card.

As explained so far, it is acceptable that the recording apparatus and the reproduction apparatus are each structured with a data reading/writing apparatus and a processing apparatus, which are separated from each other, respectively, instead of being structured as one body. In such a case, it is acceptable if the data reading/writing apparatus performs encryption. Alternatively, it is also acceptable if the processing apparatus performs encryption.

(7) In the first embodiment, there is an arrangement wherein the media key data MDATA, the encrypted content key ECK, the encrypted content ECNT, the signature data SigCRL, the revocation list CRL, and the public key certificate PKC are all recorded on one recording medium; however, the present invention is not limited to this arrangement.

For example, it is acceptable to have an arrangement wherein the recording apparatus 100 records part of the data such as the signature data SigCRL, the revocation list CRL, and the public key certificate PKC on a recording medium other than the recording medium 120, and both of the recoding medium 120 and the other recording medium are distributed.

Further, it is acceptable to have an arrangement wherein the recording apparatus 100 is connected to a network represented by the Internet, and such a part of the data is distributed via the network. The reproduction apparatus 200 may also be connected to the network so as to obtain such a part of the data from the recording apparatus 100 via the network.

As explained so far, it is acceptable to have an arrangement wherein the media key data MDATA, the encrypted content key ECK, the encrypted content ECNT, the signature data SigCRL, the revocation list CRL, and the public key certificate PKC are recorded on one or more recording media and distributed, or recorded on one or more recording media and also distributed via a network.

(8) In the first embodiment, the content is encrypted and an encrypted content is decrypted based on a device key; however, the present invention is not limited to this arrangement.

For example, it is acceptable to have an arrangement wherein the recording apparatus and the reproduction apparatus each obtain a condition of use and control the recording and the reproduction according to the condition of use. Here, the condition of use is management information incidental to the content, for example, the date, the time, and the number of times of permitted recording and reproduction of the content.

(9) In the first embodiment, the reproduction apparatus reads the revocation list CRL from the CRL storing unit for making comparison to judge a newer list, stores a newer revocation list CRL into the CRL storing unit, and reads the revocation list CRL again when it is necessary to check if the public key certificate is registered or not; however, the present invention is not limited to this arrangement.

For example, it is acceptable to have an arrangement wherein the reproduction apparatus does not compare revocation lists CRL to judge which one is newer, and does not store the revocation list CRL judged to be newer into the CRL storing unit, but stores the revocation list CRL read from the recording medium 120 into the CRL storing unit after judging whether the public key certificate is registered in the revocation list CRL or not.

The order in which the signature verification, the CRL verification, and the public key certificate judgment are performed is not limited to the order described in the first embodiment. It is acceptable that the reproduction apparatus performs the signature verification, the CRL verification, and the public key certificate judgment in various orders so as to control reproduction of contents.

(10) It is acceptable if the recording apparatus and the reproduction apparatus each have an electronic watermark processing unit that is operable to generate and embed an electronic watermark.

For example, it is acceptable that the recording apparatus stores therein an apparatus ID that identifies the recording apparatus, and when the recording apparatus records a content onto a recording medium, the recording apparatus embeds the apparatus ID into the content as an electronic watermark.

In such a case, if a content into which an apparatus ID is embedded as an electronic watermark illegitimately gets in circulation, it is possible to identify the recording apparatus that has recorded the content by extracting the embedded apparatus ID from the content.

Further, in a similar way, it is acceptable if the reproduction apparatus embeds, during the reproduction process, the apparatus ID of the reproduction apparatus into the content recorded on the recording medium as an electronic watermark. In such a case, if a content into which an apparatus ID is embedded as an electronic watermark illegitimately gets in circulation, it is possible to identify the reproduction apparatus that has reproduced the content by extracting the embedded apparatus ID from the content.

(11) It is acceptable to have an arrangement wherein the content supply system includes a device key discovery apparatus that is operable to, when an illegitimate apparatus that includes a disclosed device key has been found, identify the device key stored therein. The illegitimate apparatus has the same structure as the reproduction apparatus 200.

Figure 8:
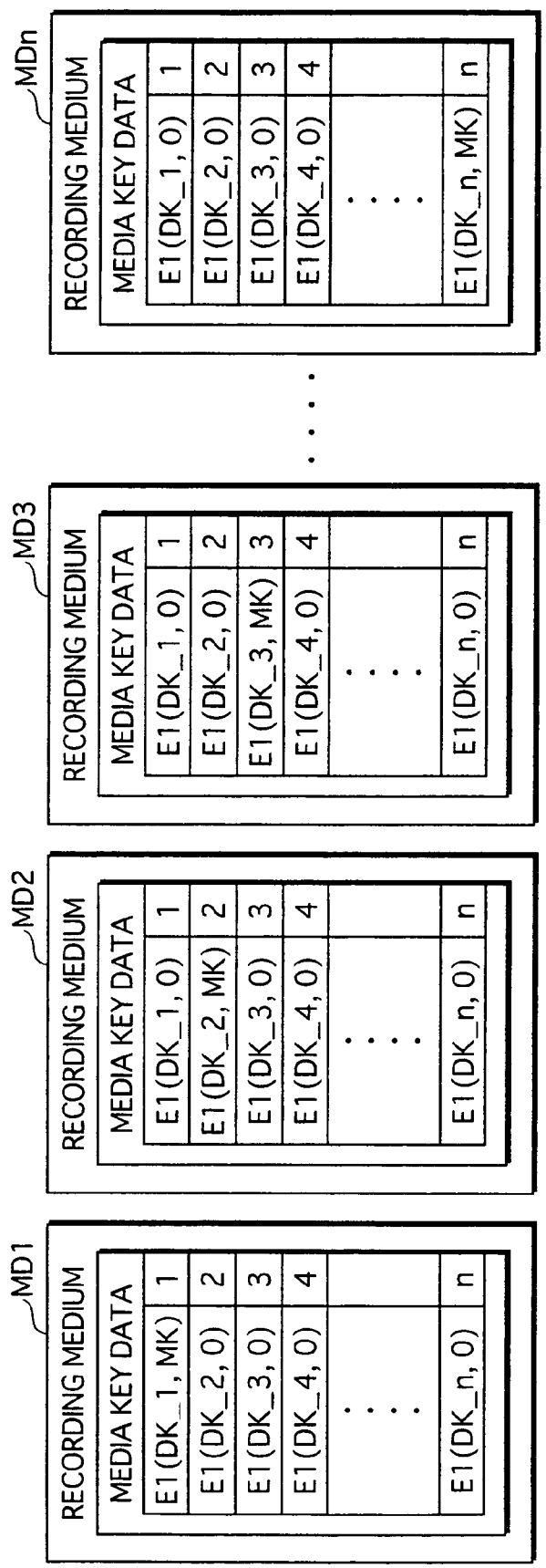
FIG. 8 is a data structure diagram that shows the structure of the data recorded on n pieces of recording media in a modification example of the first embodiment.

As shown in FIG. 8, the device key discovery apparatus generates n pieces of recording media such as MD1, MD2, MD3, . . . and MDn. It should be noted that, in FIG. 8, data other than the pieces of media key data are omitted from the drawing.

The recording media MD1, MD2, MD3, . . . MDn each have data recorded thereon that are the same as the one recorded the recording medium 120 shown in FIG. 3, except for the following:

(a) There is no revoked public key certificate registered in the revocation list that is recorded on each of the recording media MD1, MD2, MD3, . . . MDn. In other words, the revocation list CRL includes no identifiers of public key certificates.

(b) The pieces of media key data recorded on the recording media MD1, MD2, MD3, . . . MDn are different from the piece of media key data recorded on the recording medium 120. Examples of the pieces of media key data recorded on the recording media MD1, MD2, MD3, . . . MDn are shown in FIG. 8.

(b-1) The piece of media key data recorded on the recording medium MD1 includes n sets of an encrypted media key and an apparatus number. The apparatus numbers are the same as the ones described in the first embodiment.

The first encrypted media key is generated by implementing the encryption algorithm E1 on the media key MK using the device key DK_1.

The second, third, . . . the nth encrypted media keys are generated by implementing the encryption algorithm E1 on the value "0" using the device keys DK_2, DK_3, . . . , DK_n, respectively.

(b-2) The piece of media key data recorded on the recording medium MD2 includes n sets of an encrypted media key and an apparatus number. The apparatus numbers are the same as the ones described in the first embodiment.

The first encrypted media key is generated by implementing the encryption algorithm E1 on the value "0" using the device key DK_1.

The second encrypted media key is generated by implementing the encryption algorithm E1 on the media key MK using the device key DK_2.

The third, . . . the nth encrypted media keys are generated by implementing the encryption algorithm E1 on the value "0" using the device keys DK_3, . . . , DK_n, respectively.

(b-3) The same is true with the recording media MD3, . . . MDn.

The piece of media key data recorded on the recording medium MDi where i is an integer that satisfies $1 \leq i \leq n$ includes n sets of an encrypted media key and an apparatus number. The apparatus numbers are the same as the ones described in the first embodiment.

The $i^{th}$ encrypted media key is generated by implementing the encryption algorithm E1 on the value "0" using the device key DK_i.

Other encrypted media keys are each generated by implementing the encryption algorithm E1 on the media key MK using a corresponding device key.

Next, the operator mounts the recording media MD1, MD2, MD3, . . . MDn sequentially one by one on an illegitimate apparatus and instructs the illegitimate apparatus to reproduce the content.

This way, these n pieces of recording media are each tried on the illegitimate apparatus.

When the content is reproduced correctly by the illegitimate apparatus, it is possible to identify a device key that is expected to be stored in the illegitimate apparatus, judging from the mounted recording medium.

For example, if the illegitimate apparatus correctly reproduces the content when the recording medium MD1 is mounted, the device key stored in the illegitimate apparatus is DK_1.

Generally speaking, if the illegitimate apparatus correctly reproduces the content when the recording medium MDi is mounted, the device key stored in the illegitimate apparatus is DK_i.

The illegitimate apparatus has the same structure as the reproduction apparatus 200 and operates as shown in FIGS. 6 and 7. Thus, the illegitimate apparatus correctly reproduces the content when only one of the recording media MD1, MD2, MD3, . . . MDn is mounted.

(12) In the first embodiment, a signature with appendix is used as an algorithm for generating a signature. The signature with appendix means that a signature is appended to a piece of data being a signature target; however, the present invention is not limited to this arrangement.

For example, it is acceptable if a signature with message recovery is used instead of a signature with appendix. It should be noted that the signature with message recovery is disclosed in Patent Document 3.

When a signature with message recovery is used, the signer is able to embed secret information into the signature to be generated, and the verifier is able to obtain the secret information after the signature is verified. By making use of this technical feature, the recording apparatus implements an XOR (exclusive-OR) operation on the secret information and the key data (e.g. a content key) and generates a piece of signature data by using a signature with message recovery on the result of the operation. In such a case, the reproduction apparatus performs signature verification, and when the verification has been successful, the reproduction apparatus obtains the result of the operation, and implements an XOR (exclusive-OR) operation on the secret information stored in the reproduction apparatus and the result of the operation so as to obtain the key data (e.g. a content key).

It should be noted that the operation to be implemented on the secret information and the key data does not have to be limited to an XOR operation. It is acceptable to implement an addition operation or use the output value of a hash function by taking a piece of data in which the secret information and the key data are combined as an input value.

Additionally, the information on which the secret information acts does not have to be a content key. It is acceptable if the information is another kind of key such as a key encryption key.

As explained so far, it is acceptable to have any arrangement as long as the arrangement prevents the content from being reproduced unless the secret information that becomes available as a result of signature verification is obtained. When a signature with message recovery is used like this, it is essential to have signature verification in order to reproduce a content.

(13) In the first embodiment, the content key and the content are obtained from an external source outside of the recording apparatus; however, the present invention is not limited to this arrangement.

For example, it is acceptable to have an arrangement wherein the content key and the content are prestored in the content recording apparatus in such a manner that they are in correspondence with each other. Alternatively, it is also acceptable to have an arrangement wherein the content key is generated in the recording apparatus every time it needs to be used.

(14) In the first embodiment, the switch 213 that is controlled based on results of various verification and judgment is disposed between the decrypting unit 205 and the reproducing unit 214 and is operable to control the reproduction unit 214 so that a decrypted content is either outputted or not outputted; however the present invention is not limited to this arrangement.

For example, it is acceptable to have an arrangement wherein the switch 213 is disposed between the decrypting unit 204 and the decrypting unit 205 and is operable to control the decrypting unit 205 so that a decrypted content key is either outputted or not outputted.

Alternatively, it is also acceptable to have an arrangement wherein the switch is disposed between the key calculating unit 203 and the decrypting unit 204 and is operable to control the decrypting unit 204 so that a key decryption key KDK is either outputted or not outputted.

As explained above, it is acceptable to have any arrangement as long as the arrangement makes it possible to eventually control reproduction of contents based on results of the verifications. Further, it is not necessary that the switch 213 is a physical switch. It is acceptable if the switch 213 is structured by software as long as it is able to control reproduction.

Furthermore, it is acceptable to have an arrangement wherein the key calculating unit 202 judges whether or not the generated decryption media key y is the value "0", which is detection information and, when having judged that the decryption media key y is the value "0", the key calculating unit 202 instructs the switch 213 not to output the decrypted content DCNT to the reproducing unit 214.

It is also acceptable to have an arrangement wherein, when having judged that the decryption media key y is the value "0", the key calculating unit 202 instructs all or part of the key calculating unit 203, the decrypting unit 204, and the decrypting unit 205 not to generate a key decryption key, not to generate a decrypted content key, or not to generate a decrypted content.

Further, it is acceptable to have an arrangement wherein, having judged that the decryption media key y is the value "0", the key calculating unit 202 informs the controlling unit 215 that the decryption media key y is the value "0", so that the controlling unit 215 which have received the message instructs the other constituents of the reproduction apparatus 200 to discontinue decryption and reproduction of the encrypted content.

(15) In the first embodiment, the encryption system made up of three hierarchical layers such as a media key, a key encryption key, and a content key is used; however, the present invention is not limited to this arrangement.

For example, it is acceptable to have an arrangement wherein a content key is omitted, and a content is directly encrypted with a key encryption key. Alternatively, it is acceptable to have an arrangement wherein another key is introduced so as to increase the hierarchical layers by one.

(16) It is acceptable to have an arrangement wherein the recording apparatus or the reproduction apparatus obtains newest versions of media key data and revocation list CRL via a network represented by the Internet, so as to update the data stored in the recording apparatus or the reproduction apparatus.

(17) In the first embodiment, the recording apparatus records the revocation list CRL onto the recording medium; however the present invention is not limited to this arrangement.

For example, it is acceptable to have an arrangement wherein the reproduction apparatus obtains the revocation list CRL via a network, and the recording apparatus does not record the revocation list CRL onto the recording medium.

(18) In the first embodiment, the recording apparatus generates a piece of signature data for a content or information related to a content that is to be recorded onto the recording medium and then records the generated piece of signature data onto the recording medium; however, the present invention is not limited to this arrangement.

For example, it is acceptable that the recording apparatus does not generate a signature. In such a case, it is acceptable to have an arrangement wherein the recording apparatus encrypts a content based on the piece of media key data and the medium inherent number stored in the recording apparatus and then records the piece of media key data used in the encryption and the encrypted content onto the recording medium. In such a case, the reproduction apparatus reads the piece of media key data, the medium inherent number, and the encrypted content from the recording medium and then decrypts the content based on the piece of media key data and the medium inherent number.

(19) In the first embodiment, the recording apparatus realizes a media bind by generating the key encryption key from the media key and the medium inherent number; however, the present invention is not limited to this arrangement.

For example, it is acceptable to have an arrangement wherein the recording apparatus realizes a media bind by generating an authenticator based on the media key and the medium inherent number and recording the generated authenticator onto the recording medium. In such a case, the reproduction apparatus generates an authenticator from the media key and the medium inherent number in the same manner and judges whether the authenticator recorded on the recording medium matches the generated authenticator, so as to control reproduction of the content.

The method of generating the authenticator above is for example as follows:

A hash function is implemented on a combined value of the media key, the medium inherent number, and the encrypted content key, and the obtained hash value or a specific part of the hash value is taken as an authenticator.

(20) In the first embodiment, one recording medium is in correspondence with one content supply system; however, the present invention is not limited to this arrangement. The following arrangement is also possible:

A plurality of content supply systems exist—for example one of them is a system for supplying movie contents; another content supply system is one for supplying computer software; and another content supply system is one for supplying music. This way, each of different content supply systems is used depending on the kind of the contents to be supplied.

Alternatively, the following arrangement is also possible: One of the content supply systems is one for supplying movie contents from the movie supplying company A. Another content supply system is one for supplying movie contents from the movie supplying company B. Another content supply system is one for supplying movie contents from the movie supplying company C. This way, each of different content supply systems is used depending on the supplier of the contents.

The following describes the mechanism in which one recording medium is used in a plurality of content supply systems that are different from each other.

In the unrewritable area of a recording medium, a piece of key revocation data is prestored, in addition to the medium inherent number which is inherent to the recording medium. In such a case, a first content supply system realizes the mechanism for digital work protection by using the piece of key revocation data prestored in the unrewritable area. A second content supply system realizes the mechanism for digital work protection through the arrangement described as the first embodiment.

Figure 9:
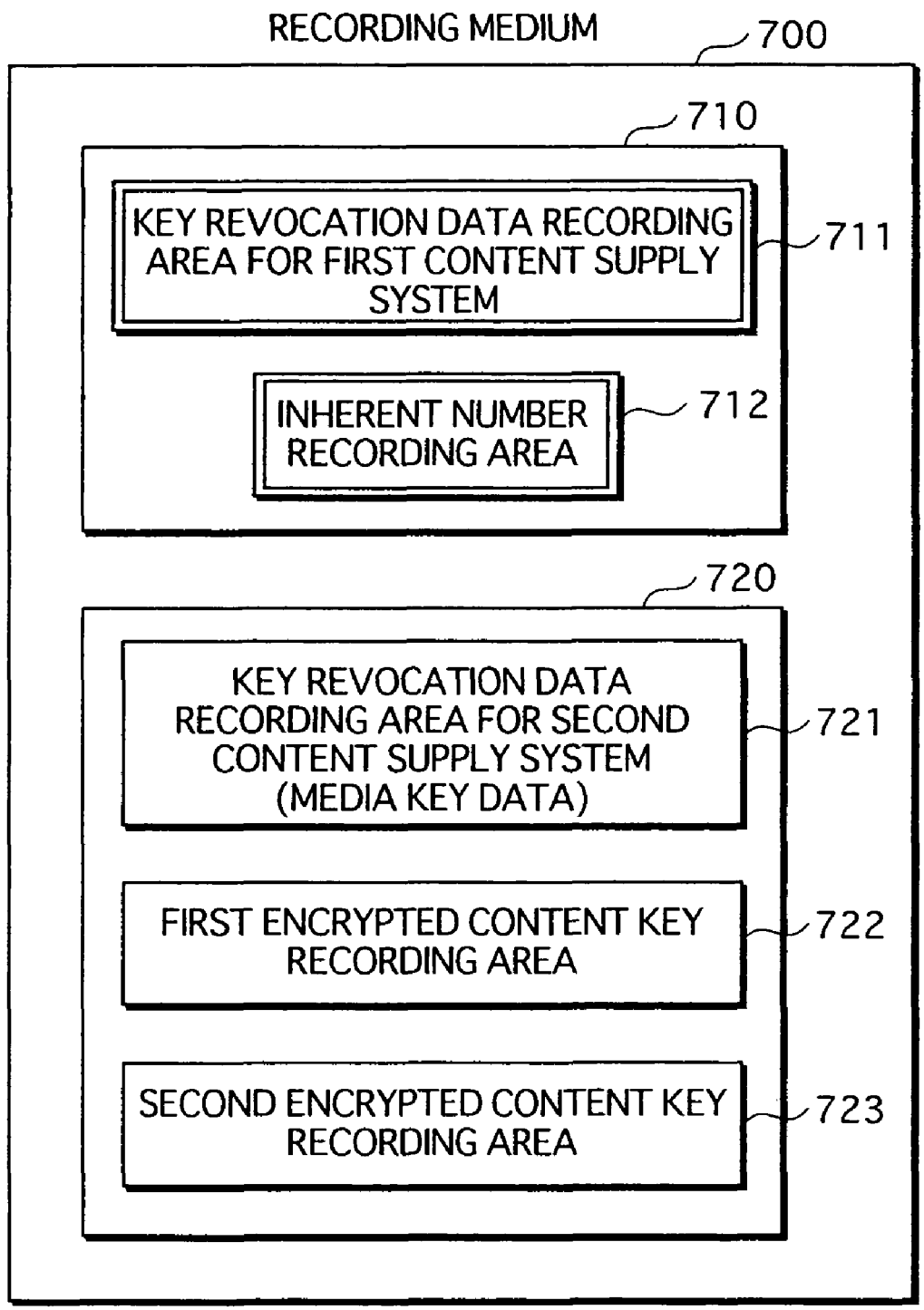
FIG. 9 is a data structure diagram that shows the structure of the data recorded on the recording medium in a modification example of the first embodiment.

FIG. 9 shows an example of such data recorded on the recording medium.

The recording medium 700 has an unrewritable area 710 and a rewritable area 720. The unrewritable area 710 includes a key revocation data recording area for the first content supply system 711 and an inherent number recording area 712. The rewritable area 720 includes a key revocation data recording area for the second content supply system 721; a first encrypted content key recording area 722; a second encrypted content key recording area 723; and other encrypted content key recording area (not shown in the drawing).

Here, the key revocation data recording area for the second content supply system 721 corresponds to the media key data recording area 122 in the first embodiment. Further, data encrypted based on the piece of key revocation data for the first content supply system is recorded in the first encrypted content key recording area 722. In the same manner, data encrypted based on the piece of key revocation data for the second content supply system is recorded in the second encrypted content key recording area 723.

As explained so far, in a case where one recording medium supports a plurality of content supply systems, there is no need to have a medium inherent number for each of the systems. One medium inherent number for one recording medium is enough. It is acceptable if the plurality of content supply systems use one medium inherent number or part of one medium inherent number in common.

Here, "to use part of one medium inherent number" means for example, in a case of a 128-bit medium inherent number, (i) to use the lower 96 bits as a medium inherent number without using the upper 32 bits, or (ii) to replace all of the upper 32 bits of the medium inherent number with zeros and use the result as a 128-bit medium inherent number.

As explained above, by using the medium inherent number prestored on the recording medium in a plurality of content supply systems in common, it is possible to realize a system that is able to protect the copyrights of digital works even with a recording medium that has already been on the market and used and on which only a medium inherent number is recorded. Additionally, since there is no need to record a medium inherent number for each system, it is possible to reduce the volume of the unrewritable area.

As explained so far, the present invention is a digital work protection system that provides the mechanism for protecting digital works for at least the first and the second content supply systems.

The recording medium includes a read-only unrewritable area and a rewritable area which allows the reading and writing of data. A medium inherent number which is inherent to the recording medium and a piece of key revocation data for the first content supply system are prestored in the unrewritable area.

The first content supply system is made up of a recording apparatus and a plurality of reproduction apparatuses, the recording apparatus being operable to encrypt a content and write the encrypted content onto the recording medium; and the reproduction apparatuses each being operable to attempt to decrypt the encrypted content recorded on the recording medium. One or more of the plurality of reproduction apparatuses are revoked. The piece of key revocation data recorded in the unrewritable area of the recording medium indicates a key of each of the one or more revoked reproduction apparatuses.

The recording apparatus includes: an encrypting unit operable to encrypt a content using the piece of revocation data recorded in the unrewritable area; and a writing unit operable to write the generated encrypted content into the rewritable area of the recording medium.

Each of the reproduction apparatus includes: a reading unit operable to read the piece of key revocation data recorded in the unrewritable area of the recording medium and the encrypted content recorded on the recording medium; a judging unit operable to judge whether decryption of the encrypted content is permitted, using the read piece of key revocation data; and a decrypting unit operable to prohibit the encrypted content from being decrypted when the decryption is not permitted and decrypts the encrypted content so as to generate a decrypted content when the decryption is permitted.

Further, the second content supply system is made up of a recording apparatus and a plurality of reproduction apparatuses, the recording apparatus being operable to encrypt a content and write the encrypted content onto the recording medium; and the reproduction apparatuses each being operable to attempt to decrypt the encrypted content recorded on the recording medium. One or more of the plurality of reproduction apparatuses are revoked.

The recording apparatus includes: a storing unit that stores therein a piece of media key data including a plurality of encrypted media keys generated by (i) for each of unrevoked reproduction apparatuses, encrypting a media key using a device key of the unrevoked reproduction apparatus respectively, and (ii) for each of the revoked reproduction apparatuses, encrypting predetermined detection information using a device key of the revoked reproduction apparatus respectively; a reading unit operable to read the medium inherent number from the unrewritable area of the recording medium; a generating unit operable to generate an encryption key based on the read medium inherent number and the media key; an encrypting unit operable to encrypt the content, being a piece of digital data, based on the generated encryption key, so as to generate the encrypted content; a reading unit operable to read the piece of media key data from the storing unit; and a writing unit operable to write the read piece of media key data and the generated encrypted content into the rewritable area of the recording medium.

Each of the reproduction apparatuses includes: a reading unit operable to read one encrypted media key that corresponds to the reproduction apparatus from the piece of media key data recorded in the rewritable area of the recording medium; a first decrypting unit operable to decrypt the read encrypted media key using the device key of the reproduction apparatus, so as to generate a decryption media key; a controlling unit operable to judge whether the generated decryption media key is the detection information or not, and prohibit the encrypted content recorded on the recording medium from being decrypted when the generated decryption media key is the detection information, and permit the encrypted content to be decrypted when the generated decryption media key is not the detection information; and a second decrypting unit operable to, when the encrypted content is permitted to be decrypted, read the encrypted content from the recording medium and decrypt the read encrypted content based on the generated decryption media key, so as to generate a decrypted content.

1.8 Summary

As explained so far, the present invention provides a digital work protection system comprising: a recording apparatus operable to encrypt a content and record the encrypted content; a recording medium on which the encrypted content is recorded; and a reproduction apparatus operable to read the encrypted content from the recording medium and decrypt the encrypted content.

The recoding apparatus stores therein a piece of revocation data used for revocation of a key stored in a specific apparatus, encrypts the content based on the piece of revocation data, records the piece of revocation data and the encrypted content onto the recording medium, and further generates a signature for either the content or data related to encryption of the content, and records the generated signature onto the recording medium.

The recording medium has an identification number for uniquely identifying the recording medium stored therein in an area that is unrewritable by the user, and further has the piece of revocation data, the encrypted content, and the generated signature recorded thereon.

It is acceptable to have an arrangement wherein the reproduction apparatus reads the piece of revocation data, the encrypted content, and the signature from the recording medium, decrypts the content based on the piece of revocation data, and controls reproduction of the decrypted content based on the result of verification of authenticity of the signature.

Here, in the digital work protection system, it is acceptable to have an arrangement wherein the recording medium has the piece of revocation data and the encrypted content recorded thereon, and the signature is distributed via another recording medium besides the recording medium or a communication medium.

Here, in the digital work protection system, it is acceptable that the recording apparatus performs such processing by a set of two or more apparatuses, and these apparatuses each share a part of the processing.

Also, in the digital work protection system, it is acceptable that the reproduction apparatus performs such processing by a set of two or more apparatuses, and these apparatuses each share a part of the processing.

Further, in the digital work protection system, it is acceptable that the recording apparatus records a content based on the conditions of use of the content.

Further, in the digital work protection system, it is acceptable that the reproduction apparatus reproduces a content based on the conditions of use of the content.

Furthermore, in the digital work protection system, it is acceptable if the recording apparatus stores therein an apparatus identification number that uniquely identifies the recording apparatus and embeds the apparatus identification number into the content as an electronic watermark at the time of recording the content.

Moreover, in the digital work protection system, it is acceptable if the reproduction apparatus stores therein an apparatus identification number that uniquely identifies the reproduction apparatus and embeds the apparatus identification number into the content as an electronic watermark at the time of reproduction of the content.

Here, it is also acceptable if the digital work protection system includes a key discovery apparatus that is operable to, when an illegitimate apparatus is found, judge what kind of key is stored in the illegitimate apparatus.

The present invention further provides a recording apparatus operable to encrypt a content and record the encrypted content, wherein the recording apparatus stores therein a piece of revocation data used for revocation of a key stored in a specific apparatus, encrypts the content based on the piece of revocation data, records the piece of revocation data and the encrypted content onto the recording medium, and further generates a signature for either the content or data related to encryption of the content, and records the generated signature onto the recording medium.

Here, it is acceptable if the recording apparatus encrypts the content based on, in addition to the piece of revocation data, an identification number that uniquely identifies the recording medium.

Here, it is also acceptable if the recording apparatus records a public key corresponding to a secret key used in generation of the signature onto the recording medium.

Further, it is acceptable if the recording apparatus generates a signature for a public key revocation list being a target of the signature.

Furthermore, it is acceptable if the recording apparatus is operable to, in a case where a piece of revocation data exists on the recording medium on which the content is recorded, compare the piece of revocation data stored in the recording apparatus with the piece of revocation data existing on the recording medium to determine which one is newer and store therein the newer piece of revocation data.

Furthermore, it is acceptable that the recording apparatus compares the pieces of revocation data to determine which one is newer by comparing the sizes of the pieces of revocation data and judge the piece of revocation data that is larger in size as newer.

Moreover, it is acceptable that the recording apparatus compares the pieces of revocation data to determine which one is newer by comparing the numbers of keys that have been revoked and judge the piece of revocation data that has a larger number of revoked keys as newer.

It is further acceptable if the recording apparatus compares the pieces of revocation data to determine which one is newer by comparing either the dates on which the pieces of revocation data are generated or the version numbers and that the dates of generation and the version numbers are protected against falsification.

Here, it is acceptable to have an arrangement wherein, in a case where (i) a piece of revocation data and an encrypted content both exist on the recording medium on which the content is recorded, and also (ii) another piece of revocation data stored in the recording apparatus is newer than the piece of revocation data recorded on the recording medium, the recording apparatus once decrypts the encrypted content recorded on the recording medium based on the piece of revocation data recorded on the recording medium in the same manner, and then re-encrypts the decrypted content based on the piece of revocation data stored in the recording apparatus.

Here, it is acceptable if the recording apparatus generates secret information within the recording apparatus, encrypts the content based on the secret information and the piece of revocation data, and generates a signature taking the secret information as information to be embedded into the signature.

Further, the present invention provides a reproduction apparatus operable to read an encrypted content from a recording medium and decrypt the encrypted content, wherein the reproduction apparatus reads a piece of revocation data, the encrypted content, and a signature from the recording medium, decrypts the content based on the piece of revocation data, and controls reproduction of the decrypted content according to the result of verification of authenticity of the signature.

Here, it is acceptable if the reproduction apparatus decrypts the encrypted content based on, in addition to the piece of revocation data, an identification number that uniquely identifies the recording medium.

Here, it is also acceptable if the reproduction apparatus stores therein a public key revocation list, judges whether the public key used in the verification of authenticity of the signature is registered in the public key revocation list, and controls reproduction of the decrypted content according to the result of the judgment.

Here, it is acceptable if the reproduction apparatus is operable to, in a case where a revocation list exists on the recording medium, compare the revocation list stored in the reproduction apparatus with the revocation list existing on the recording medium to determine which one is newer, and store therein the newer revocation list.

Furthermore, it is acceptable that the reproduction apparatus compares the revocation lists to determine which one is newer by comparing the sizes of the revocation lists and judge the revocation list that is larger in size as newer.

Moreover, it is acceptable that the reproduction apparatus compares the revocation lists to determine which one is newer by comparing the numbers of public keys that have been revoked and judge the revocation list that has a larger number of revoked public keys as newer.

It is further acceptable if the reproduction apparatus obtains secret information by verifying authenticity of the signature and decrypts the encrypted content based on the obtained secret information and a piece of revocation data.

The present invention further provides a recording medium operable to record an encrypted content thereon, wherein the recording medium has an identification number for uniquely identifying the recording medium stored therein in an area that is unrewritable by the user, and further has a piece of revocation data, an encrypted content, and a signature recorded thereon.

Here, it is acceptable that the recording medium records a content thereon, the content being encrypted based on the piece of revocation data and the identification number.

Here, it is also acceptable if the recording medium has a public key corresponding to a secret key used in generation of the signature recorded thereon.

It is further acceptable to have an arrangement wherein the recording medium has two or more pieces of revocation data and two or more public keys recorded thereon, in a case where two or more recording apparatuses write data onto the recording medium.

As explained so far, in the first embodiment, since the recoding apparatus encrypts a content based on a media key calculated from a piece of media key data and records the encrypted content along with a public key certificate of the recording apparatus and a generated signature, even if key revocation information is not recorded in the unrewritable area of the recording medium, it is possible to achieve key revocation and a media bind, as well as to achieve prevention of digital work infringement due to recording and reproduction of contents with the use of an illegitimate apparatus.

More specifically, in a case where there are a legitimate recording apparatus and an illegitimate reproduction apparatus, the legitimate recording apparatus encrypts a content based on a piece of media key data indicating that the illegitimate reproduction apparatus is revoked, and records the encrypted content on the recording medium. The illegitimate reproduction apparatus into which the recording medium is inserted is not able to decrypt the media key from the piece of media key data recorded on the recording medium. Thus, it is possible to prevent the illegitimate reproduction apparatus from reproducing the content.

Further, in a case where there are an illegitimate recording apparatus and a legitimate reproduction apparatus, the illegitimate recording apparatus encrypts a content based on an old piece of media key data according to which the recording apparatus is not revoked and records the encrypted content onto the recording medium. At this time, the recording medium also records a public key certificate of the recording apparatus and a generated piece of signature data as well. The legitimate reproduction apparatus into which the recording medium is inserted is able to decrypt the media key from the recorded piece of media key data; however, since the reproduction apparatus judges whether the public key certificate of the recording apparatus is registered in the revocation list CRL before the content is reproduced, the reproduction apparatus is able to prevent the content from being reproduced if the content has been recorded by the illegitimate recording apparatus which is registered in the revocation list CRL.

2. The Second Embodiment

The following describes a content supply system 20 which is another embodiment of the present invention.

2.1 The Structure of the Content Supply System 20

Figure 10:
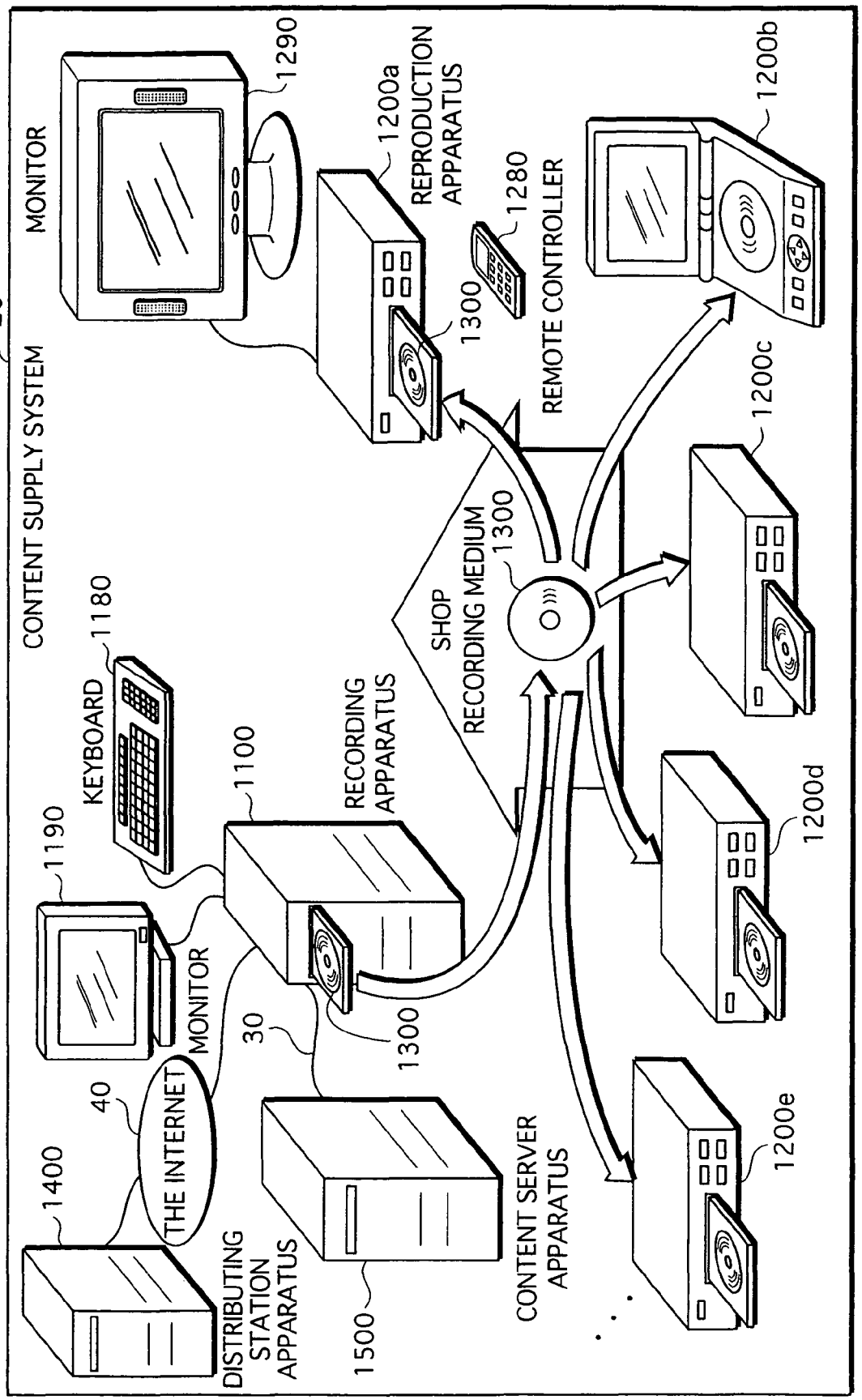
FIG. 10 is a structure diagram that shows the structure of the content supply system 20.

The content supply system 20 has a structure similar to the structure of the content supply system 10 and comprises, as shown in FIG. 10, a distributing station apparatus 1400, a content server apparatus 1500, a recording apparatus 1100, and reproduction apparatuses 1200a, 1200b, 1200c, 1200d, 1200e, . . . .

Like in the first embodiment, one or more of the reproduction apparatuses have been revoked.

2.2 The Distributing Station Apparatus 1400

The distributing station apparatus 1400 comprises an information storing unit 1401, a controlling unit 1402, an inputting unit 1403, a displaying unit 1404, and a transmitting and receiving unit 1405 (not shown in the drawing).

More specifically, like the content server apparatus 500 in the first embodiment, the distributing station apparatus 1400 is a computer system that comprises a microprocessor, a ROM, a RAM, a hard disk unit, a communication unit, a display unit, a keyboard, a mouse, and the like. The RAM and the hard disk unit each store therein a computer program. The constituents of the distributing station apparatus 1400 achieve their functions when the microprocessor operates according to the computer programs.

The transmitting and receiving unit 1405 is connected to the recording apparatus 1100 via the Internet 40 and performs transmission and reception of information between the recording apparatus 1100 and the controlling unit 1402.

The information storing unit 1401 prestores therein key revocation data RDATA and a version number VR in such a manner that they are in correspondence with each other.

The key revocation data RDATA is the same as the media key data MDATA in the first embodiment. Detailed explanation will be therefore omitted.

The version number VR is information indicating a generation of the key revocation data RDATA that corresponds to the version number VR.

The controlling unit 1402 receives, from the recording apparatus 1100 via the Internet 40 and the transmitting and receiving unit 1405, a request that the controlling unit 1402 should obtain the key revocation data RDATA. Having received the request, the controlling unit 1402 reads the key revocation data RDATA and the version number VR from the information storing unit 1401 and transmits the read key revocation data RDATA and the version number VR to the recording apparatus 1100 via the transmitting and receiving unit 1405 and the Internet 40.

The inputting unit 1403 receives an instruction from an operator of the distributing station apparatus 1400 and outputs the received instruction to the controlling unit 1402.

The displaying unit 1404 displays various information under the control of the controlling unit 1402.

2.3 The Content Server Apparatus 1500

The content server apparatus 1500 has a structure that is the same as the structure of the content server apparatus 500 of the first embodiment. Explanation is therefore omitted.

2.4 The Recording Apparatus 1100

Figure 11:
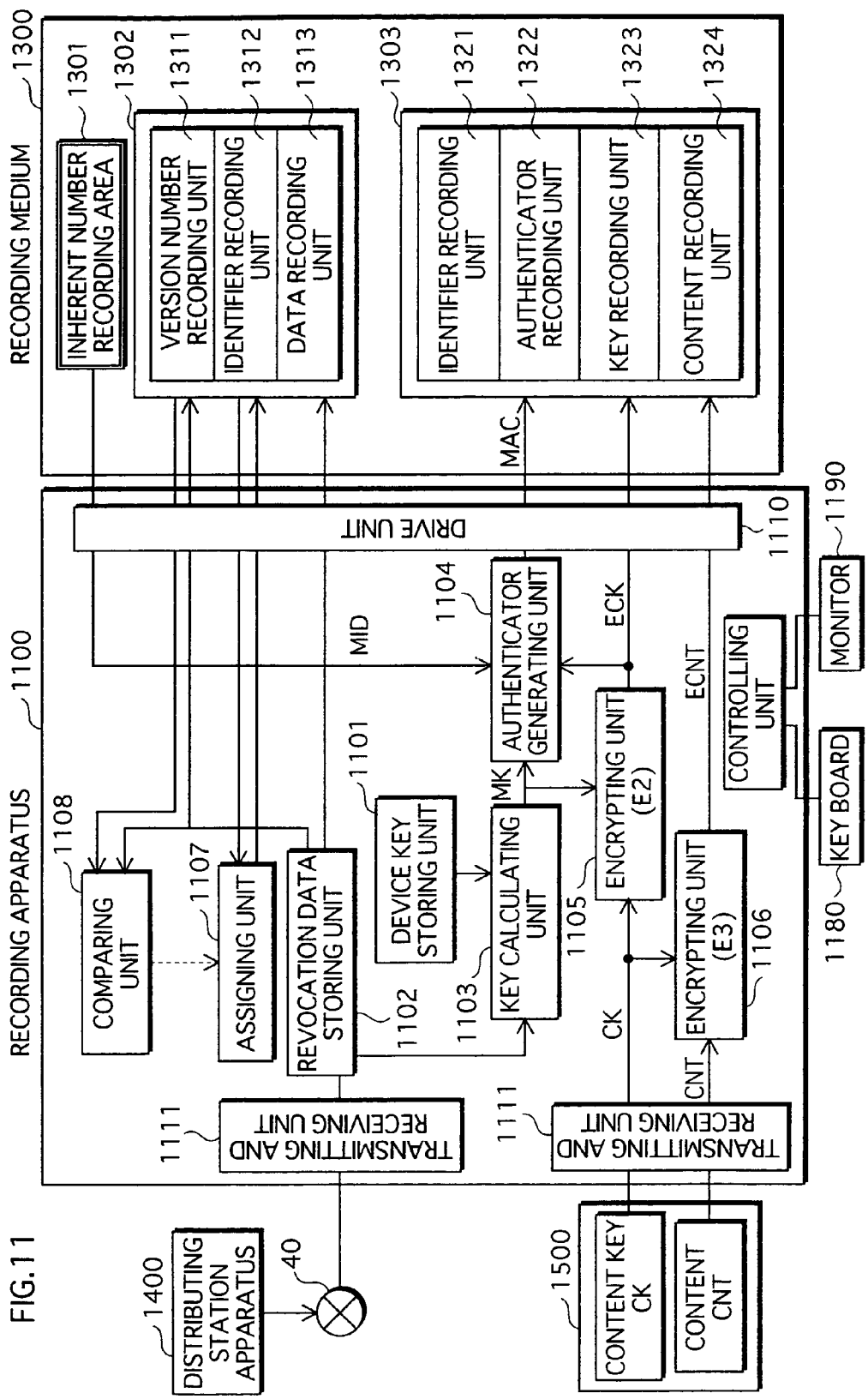
FIG. 11 is a block diagram that shows the structure of the recording apparatus 1100.

As shown in FIG. 11, the recording apparatus 1100 comprises a device key storing unit 1101, a revocation data storing unit 1102, a key calculating unit 1103, an encrypting unit 1105, an encrypting unit 1106, an authenticator generating unit 1104, an assigning unit 1107, a comparing unit 1108, a controlling unit 1109, a drive unit 1110 and a transmitting and receiving unit 1111.

More specifically, like the recording apparatus 100, the recording apparatus 1100 is computer system that comprises a microprocessor, a ROM, a RAM, a hard disk unit, and the like. The RAM and the hard disk unit each store therein a computer program. The recording apparatus 1100 achieves its functions when the microprocessor operates according to the computer programs.

(1) The Device Key Storing Unit 1101

The device key storing unit 1101 secretly stores therein the device key DK_1 in such a manner that the device key DK_1 is not accessible from an external apparatus. The device key DK_1 is a key unique to the recording apparatus 1100.

(2) The Revocation Data Storing Unit 1102

The revocation data storing unit 1102 has an area in which the key revocation data RDATA and the version number that have been obtained from the distributing station apparatus 1400 are to be stored.

(3) The Key Calculating Unit 1103

The key calculating unit 1103 has a structure that is the same as the structure of the key calculating unit 103 of the first embodiment.

The key calculating unit 1103 reads the key revocation data RDATA from the revocation data storing unit 1102 and reads the device key DK_1 from the device key storing unit 1101. Then, like the key calculating unit 103, the key calculating unit 1103 implements a decryption algorithm D1 on the read key revocation data RDATA using the read device key DK_1 so as to generate a media key MK, and outputs the generated media key MK to the authenticator generating unit 1104 and the encrypting unit 1105.

(4) The Encrypting Unit 1105

The encrypting unit 1105 receives a content key CK from the content server apparatus 1500 via the transmitting and receiving unit 1111 and receives the media key MK from the key calculating unit 1103.

Next, the encrypting unit 1105 implements an encryption algorithm E2 on the received content key CK using the received media key MK, so as to generate an encrypted content key ECK.

The encrypted content key ECK=E2 (MK, CK)

The encrypting unit 1105 then reserves a key recording unit 1323 within the encrypted content file 1320 on the recording medium 1300 via the drive unit 1110 and further writes the generated encrypted content key ECK into the key recording unit 1323 via the drive unit 1110.

The encrypting unit 1105 also outputs the generated encrypted content key ECK to the authenticator generating unit 1104.

(5) The Encrypting Unit 1106

The encrypting unit 1106 receives the content key CK and a content CNT from the content server apparatus 1500 via the transmitting and receiving unit 1111 and implements an encryption algorithm E3 on the received content CNT using the received content key CK, so as to generate an encrypted content ECNT.

The encrypted content ECNT=E3(CK, CNT).

The encrypting unit 1106 then reserves a content recording unit 1324 within the encrypted content file 1320 on the recording medium 1300 via the drive unit 1110 and further writes the generated encrypted content ECNT into the content recording unit 1324 via the driving unit 1110.

(6) The Authenticator Generating Unit 1104

The authenticator generating unit 1104 receives the media key MK from the key calculating unit 1103, receives the encrypted content key ECK from the encrypting unit 1105, and reads a medium inherent number MID from the medium inherent number recording area 1301 on the recording medium 1300.

Next, the authenticator generating unit 1104 combines the received media key MK, the read medium inherent number MID, the received encrypted content key ECK in the stated order so as to generate a piece of combined data, and generates an authenticator MAC (Message Authentication Code) by implementing a one-way function F on the generated piece of combined data.

MAC=F (MK| |ECK| |MID)

Here, F(A) denotes a value obtained by implementing the one-way function F on the data A. An example of the one-way function F is a hash function SHA-1.

Next, the authenticator generating unit 1104 reserves an authenticator recording unit 1322 within the encrypted content file 1320 on the recording medium 1300 via the drive unit 1110 and writes the generated authenticator MAC into the authenticator recording unit 1322 via the drive unit 1110.

The authenticator MAC that has been generated as above is used when the reproduction apparatus 1200 judges authenticity of a content.

(7) The Assigning Unit 1107

For the key revocation data RDATA recorded on the recording medium 1300, the assigning unit 1107 generates a key revocation data identifier RID that uniquely identifies the key revocation data RDATA on the recording medium 1300. The assigning unit 1107 reserves an identifier recording unit 1321 within the encrypted content file 1320 on the recording medium via the drive unit 1110 and writes the generated key revocation data identifier RID into the identifier recording unit 1321 via the driving unit 1110.

It should be noted that the specific method that is used by the assigning unit 1107 for assigning the key revocation data identifier RID will be described later.

(8) The Comparing Unit 1108

The comparing unit 1108 checks if a key revocation data file exists on the recording medium 1300 via the drive unit 1110 according to the instruction of the controlling unit 1109. The comparing unit 1108 further receives existence information indicating whether key revocation data file exists or not, from the drive unit 1110.

When the existence information indicates that no key revocation file exists on the recording medium 1300, the comparing unit 1108 instructs the assigning unit 1107 to generate a key revocation data identifier RID and instructs the drive unit 1110 to write a key revocation data file onto the recording medium 1300, the key revocation data file being structured so as to include the key revocation data RDATA recorded in the revocation data storing unit 1102, its version number VR, and the key revocation data identifier RID generated by the assigning unit 1107.

When the existence information indicates that one or more key revocation files exist on the recording medium 1300, the comparing unit 1108 reads, via the drive unit 1110, version numbers VF included in the key revocation data RDATA from each of the key revocation data files on the recording medium. At this time one or more version numbers VF are read. The comparing unit 1108 also reads the version number VR that corresponds to the key revocation data RDATA from the revocation data storing unit 1102.

Next, the comparing unit 1108 judges whether a version number that is identical to the read version number VR exists among the read one ore more version numbers VF. When the judgment result is in the negative, in the same manner as above, the comparing unit 1108 instructs the assigning unit 1107 to generate a key revocation data identifier RID and also instructs the drive unit 1110 to write a key revocation data file onto the recording medium 1300, the key revocation data file being structured so as to include the key revocation data RDATA recorded in the revocation data storing unit 1102, its version number VR, and the key revocation data identifier RID generated by the assigning unit 1107.

When the judgment result is in the affirmative, the comparing unit 1108 outputs, to the controlling unit 1109, information indicating that a version number that is identical to the read version number VR exists.

(9) The Controlling Unit 109

The controlling unit 1109 transmits, via the transmitting and receiving unit 1111 and the Internet 40, a request to the distributing station apparatus 1400 that the distributing station apparatus 1400 should obtain the key revocation data RDATA. The controlling unit 1109 also transmits, via the transmitting and receiving unit 1111, a request to the content server apparatus 1500 that the content server apparatus 1500 should obtain a content.

The controlling unit 1109 instructs the comparing unit 1108 to check if one or more key revocation files exist on the recording medium 1300 or not.

When having received the information indicating that a version number that is identical to the version number VR exists from the comparing unit 1108, the controlling unit 1109 instructs the drive unit 1110 to read a key revocation data identifier RID from a key revocation data file that includes the version number identical to the version number VR on the recording medium 1300, and further receives the key revocation data identifier RID from the drive unit 1110.

Next, the controlling unit 1109 (i) instructs the key calculating unit 1103 to read the device key DK_1 and the key revocation data RDATA so as to generate a media key MK, (ii) instructs the encrypting unit 1105 to encrypt the content key CK, (iii) instructs the identifier generating unit 1104 to read the medium inherent number MID and generate an authenticator MAC, (iv) instructs the encrypting unit 1106 to encrypt the content CNT, (v) instructs the drive unit 1110 to reserve an encrypted content file on the recoding medium 1300, (vi) instructs the authenticator generating unit 1104, the encrypting unit 1105, and the encrypting unit 1106 to write, into the encrypted content file on the recording medium 1300, the generated authenticator MAC, the generated encrypted content key ECK, and the generated encrypted content ECNT, respectively. Also, the controlling unit 1109 instructs the drive unit 1110 to (i) reserve an identifier recording unit 1303 within the encrypted content file on the recording medium 1300 and (i) write the key revocation data identifier RID that is either generated by the assigning unit 1107 or received from the derive unit 1110 onto the identifier recording unit 1303.

(10) The Transmitting and Receiving Unit 1111

The transmitting and receiving unit 1111 is connected to the distributing station apparatus 1400 via the Internet 40 and is connected to the content server apparatus 1500 via the dedicated line 30.

The transmitting and receiving unit 1111 receives the key revocation data RDATA and the version number VR from the distributing station apparatus 1400 via the Internet 40. Having received the key revocation data RDATA and the version number VR, the transmitting and receiving unit 1111 writes them onto the revocation data storing unit 1102 in such a manner that they are in correspondence with each other.

The transmitting and receiving unit 1111 receives the content key CK and the content CNT from the content server apparatus 1500 via the dedicated line 30, outputs the received content key CK and the content CNT to the encrypting unit 1106, outputs the received content key CK to the encrypting unit 1105.

(11) The Drive Unit 1110

The drive unit 1110 reads information from the recording medium 1300 according to the instructions of the constituents of the recording apparatus 1100 and outputs the read information to the constituent being the source of the instruction.

The drive unit 1110 reserves areas on the recording medium 1300 according to the instructions of the constituents of the recording apparatus 1100, receives pieces of information from the constituents, and writes the received pieces of information into the reserved areas.

(12) The Keyboard 1180 and the Monitor 1190

The keyboard 1180 receives an operation instruction from the operator of the recording apparatus 1100 and outputs instruction information that corresponds to the received operation instruction to the controlling unit 1109.

The monitor 1190 displays various information under the control of the controlling unit 1109.

2.5 The Recording Medium 1300

Figure 12:
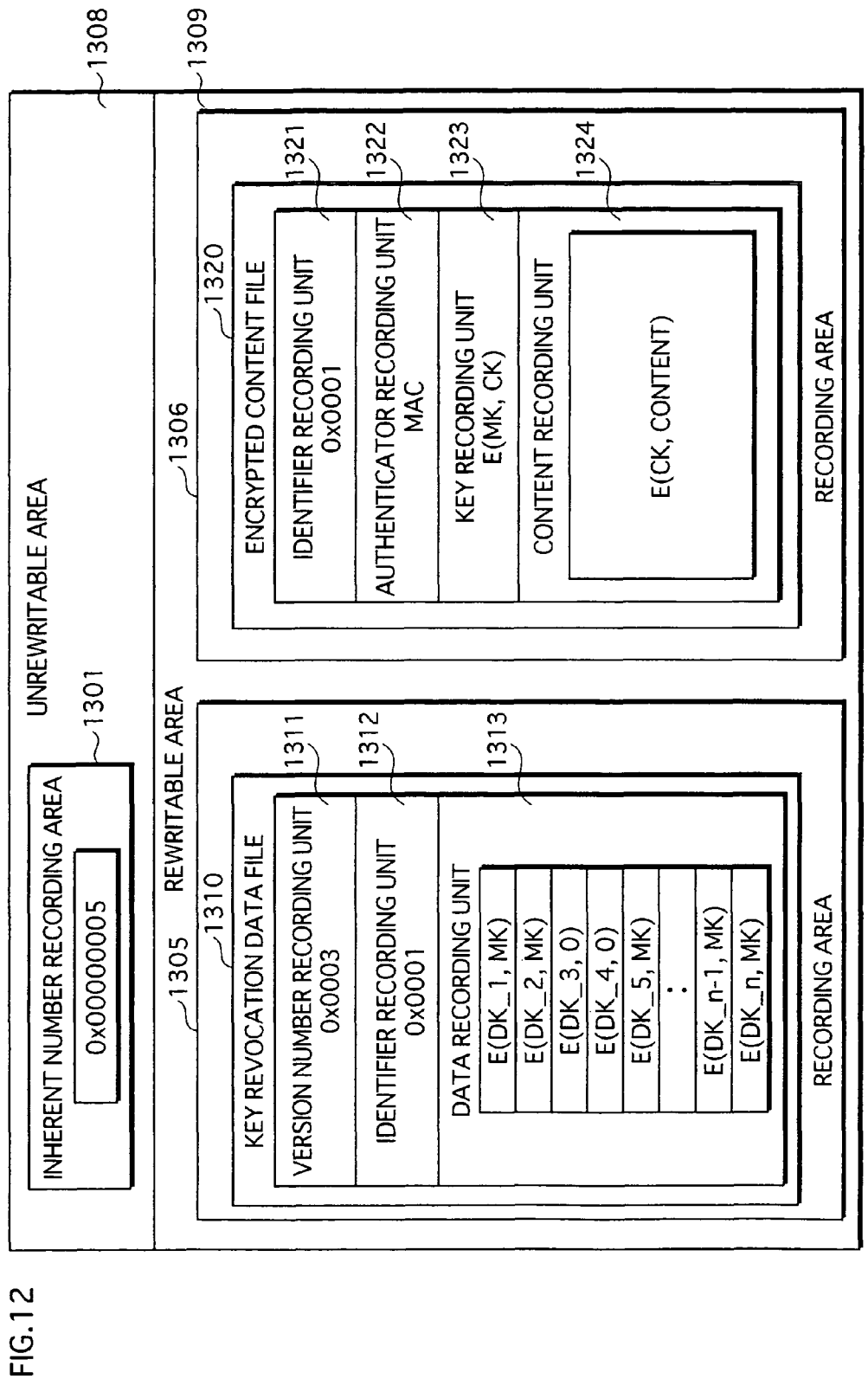
FIG. 12 is a data structure diagram that shows the structure of the data recorded on the recording medium 1300.

Like the recording medium 120, the recording medium 1300 is an optical disc medium, and has an unrewritable area 1308 and a rewritable area 1309, as shown in FIG. 12.

The unrewritable area 1308 includes an inherent number recording area 1301, as shown in FIG. 12. During the manufacturing process of the recording medium 1300, the medium inherent number MID that is inherent to the recording medium 1300 is recorded in the inherent number recording area 1301. At this time, nothing is recorded in the rewritable area 1309. In the example in the drawing, the medium inherent number MID is expressed as an eight character hexadecimal number and is actually "5".

Later, after the recording apparatus 1100 has written the information onto the recording medium 1300 as described above, the recording apparatus 1100 reserves the recording area 1305 and the recording area 1306 in the rewritable area 1309 so that one or more key revocation data files are recorded into the recording area 1305, and one or more encrypted content files are recorded into the recording area 1306.

For example, as shown in FIG. 12, a key revocation data file 1310 is recorded into the recording area 1305, and an encrypted content file 1320 is recorded into the recording area 1306. It should be noted that only one key revocation data file and one encrypted content file are recorded on the recording medium 1300 shown in FIG. 12, as a mere example; however, there is a possibility that more than one key revocation data file and more than one encrypted content file are recorded on the recording medium.

As shown in FIG. 12, the key revocation data file 1310 includes a version number recording unit 1311, an identifier recording unit 1312, and a data recording unit 1313.

A version number indicating a generation of the key revocation data RDATA is recorded in the version number recording unit 1311; a key revocation data identifier RID assigned by the assigning unit 1107 of the recording apparatus 1100 is recorded in the identifier recording unit 1312; and the key revocation data RDATA is recorded in the data recording unit 1313.

Here, the version number, the key revocation data identifier RID, and the key revocation data RDATA are as described above.

In FIG. 12, the version number is expressed as a four character hexadecimal number and is actually "3". In the second embodiment, version numbers of pieces of key revocation data are assigned by the distributing station apparatus 1400.

In FIG. 12, the key revocation data identifier is expressed as a four character hexadecimal number, and is actually "1".

As shown in FIG. 12, the encrypted content file 1320 includes an identifier recording unit 1321, an authenticator recording unit 1322, a key recording unit 1323, and a content recording unit 1324. Also, a content number that identifies the encrypted content included in the encrypted content file 1320 is attached to the encrypted content file 1320 (not shown in the drawing).

The key revocation data identifier RID is recorded in the identifier recording unit 1321. The key revocation data identifier RID has been assigned to the piece of key revocation data used in the encryption of the content by the assigning unit 1107 of the recording unit 1100.

The authenticator MAC is recorded in the authenticator recording unit 1322. The authenticator MAC is generated by the authenticator generating unit 1104 of the recording apparatus 1100.

The generated encrypted content key ECK is recorded in the key recording unit 1323 by the encrypting unit 1105 of the recording apparatus 1100.

The generated encrypted content ECNT is recorded in the content recording unit 1324 by the encrypting unit 1106 of the recording apparatus 1100.

2.6 The Reproduction Apparatus 1200

Since the reproduction apparatuses 1200a, 1200b, 1200c, . . . have the same structure, explanation is provided here as to the reproduction apparatus 1200.

Figure 13:
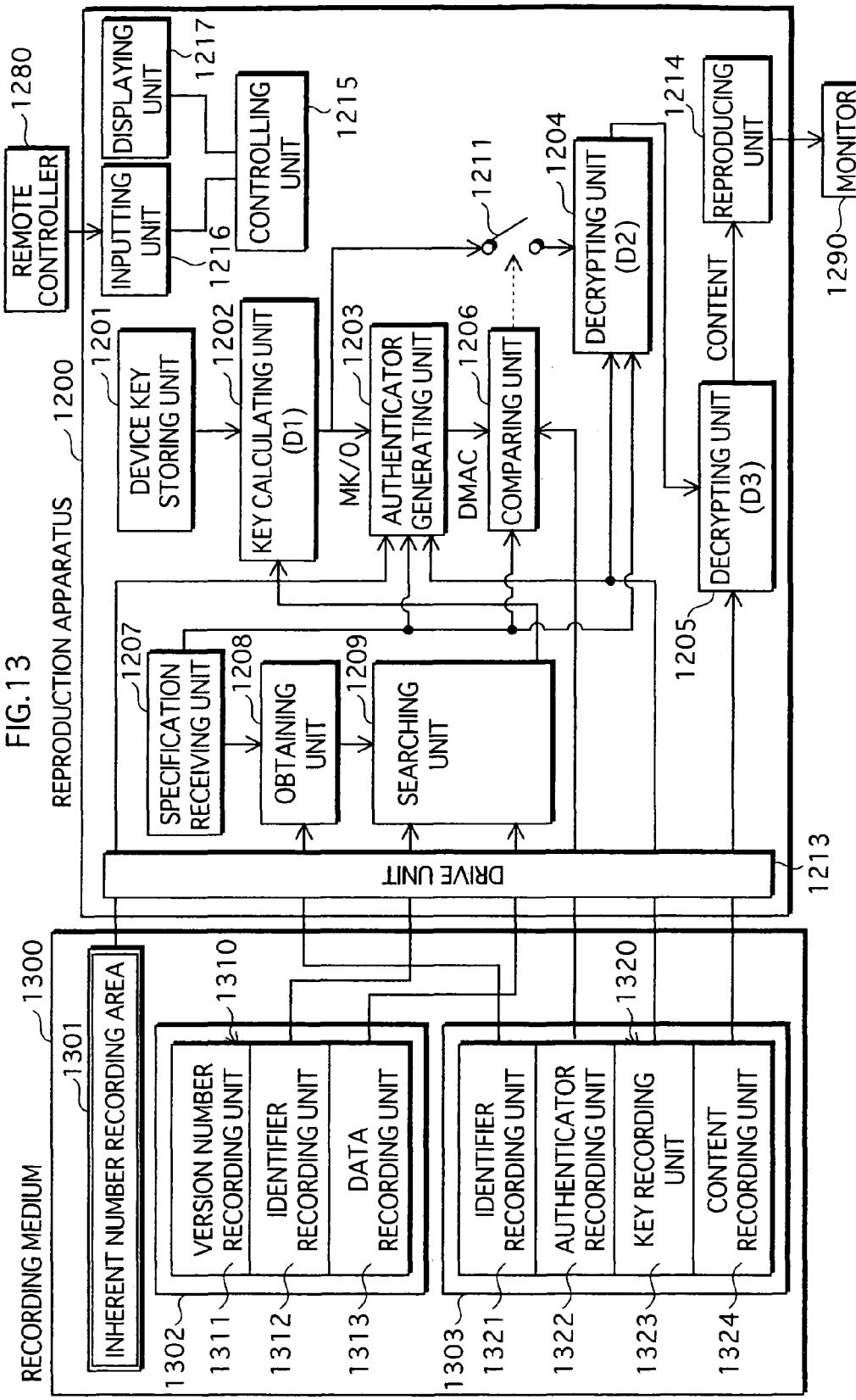
FIG. 13 is a block diagram that shows the structure of the reproduction apparatus 1200.

As shown in FIG. 13, the reproduction apparatus 1200 comprises a device key storing unit 1201, a key calculating unit 1202, an authenticator generating unit 1203, a decrypting unit 1204, a decrypting unit 1205, a comparing unit 1206, a specification receiving unit 1207, an obtaining unit 1208, a searching unit 1209, a switch 1211, a drive unit 1213, a reproducing unit 1214, a controlling unit 1215, an inputting unit 1216, and a displaying unit 1217.

More specifically, like the reproduction apparatus 200, the reproduction apparatus 1200 is a computer system that comprises a microprocessor, a ROM, a RAM, a hard disk unit, and the like. The RAM and the hard disk unit each store therein a computer program. The reproduction apparatus 1200 achieves its functions when the microprocessor operates according to the computer programs.

(1) The Specification Receiving Unit 1207

The specification receiving unit 1207 receives a specification of a content to be reproduced from the user via the remote controller 1280 and the inputting unit 1216 and outputs a content number that identifies the content in the received specification to the obtaining unit 1208 and the authenticator generating unit 1203.

(2) The Obtaining Unit 1208

The obtaining unit 1208 receives the content number from the specification receiving unit 1207 and finds the encrypted content file 1320 to which the received content number is attached from the recording area 1305 of the recording medium 1300, via the drive unit 1213. The obtaining unit 1208 then reads the key revocation data identifier RID from the identifier recording unit 1321 of the encrypted content file 1320 that has been found, and outputs the read key revocation data identifier RID to the searching unit 1209.

(3) The Searching Unit 1209

The searching unit 1209 receives the key revocation data identifier RID from the obtaining unit 1208. Having received the key revocation data identifier RID, the searching unit 1209 searches for, via the drive unit 1213, such a key revocation data file whose identifier recording unit includes a key revocation data identifier identical to the received key revocation data identifier RID from among the one or more key revocation data files recorded on the recording area 1305 of the recording medium 1300, and reads the key revocation data RDATA from the data recording unit of the key revocation data file that has been searched out.

Then, the searching unit 1209 outputs the read key revocation data RDATA to the key calculating unit 1202.

(4) The Device Key Storing Unit 1201

Like the device key storing unit 201, the device key storing unit 1201 secretly stores therein a device key DK_x in such a manner that the device key DK_x is not accessible from an external apparatus. The device key DK_x is a key unique to the reproduction apparatus 1200.

(5) The Key Calculating Unit 1202

The key calculating unit 1202 receives the key revocation data RDATA from the searching unit 1209 and reads the device key DK_x from the device key storing unit 1201.

Next, like the key calculating unit 202, the key calculating unit 1202 implements a decryption algorithm D1 on the received key revocation data RDATA using the read device key DK_x so as to generate a decryption media key y.

Here the decryption media key y is either the media key MK or the value "0".

Next, the key calculating unit 1202 outputs the generated decryption media key y to the authenticator generating unit 1203 and the switch 1211.

(6). The Authenticator Generating Unit 1203

The authenticator generating unit 1203 receives the decryption media key y from the key calculating unit 1202 and reads the medium inherent number MID from the inherent number recording area 1301 of the recording medium 1300, via the drive unit 1213. The authenticator generating unit 1203 also receives a content number from the specification receiving unit 1207 and specifies on the recording medium 1300, via the drive unit 1213, the encrypted content file 1320 to which the received content number is attached, and reads the encrypted content key ECK from the key recording unit 1323 of the specified encrypted content file 1320.

Next, the authenticator generating unit 1203 combines the received decryption media key y, the read encrypted content key ECK, the read medium inherent number MID in the stated order so as to generate a piece of combined data, and implements a one-way function F on the generated piece of combined data so as to generate a decrypted authenticator DMAC.

DMAC=F (y| |ECK| |MID)

Next, the authenticator generating unit 1203 outputs the generated decrypted authenticator DMAC to the comparing unit 1206.

(7) The Comparing Unit 1206

The comparing unit 1206 receives the decrypted authenticator DMAC from the authenticator generating unit 1203. The comparing unit 1206 also receives a content number from the specification receiving unit 1207 and specifies on the recording medium 1300, via the drive unit 1213, the encrypted content file 1320 to which the received content number is attached, and reads the authenticator MAC recorded in the authenticator recording unit 1322 of the specified encrypted content file 1320.

Next, the comparing unit 1206 judges whether the received decrypted authenticator DMAC matches the read authenticator MAC or not. When the judgment result is in the affirmative, the comparing unit 1206 outputs an instruction to the switch 1211 that the switch 1211 should be closed. When the judgment result is in the negative, the comparing unit 1206 outputs an instruction to the switch 1211 that the switch 1211 should be open.

(8) The Switch 1211

Opening and closing of the switch 1211 is controlled according to the instruction from the comparing unit 1206. The switch 1211 closes when having received an instruction from the comparing unit 1206 that the switch should be closed, and opens when having received an instruction from the comparing unit 1206 that the switch should be open.

The switch 1211 receives the decryption media key y from the key calculating unit 1202. When the switch 1211 has received an instruction that the switch should be closed, the switch 1211 outputs the received decryption media key y to the decrypting unit 1204. When the switch 1211 has received an instruction that the switch should be open, the decryption media key y does not get outputted to the outside.

(9) The Decrypting Unit 1204

The decrypting unit 1204 receives the decryption media key y from the switch 1211. The decrypting unit 1204 also receives a content number from the specification receiving unit 1207 and specifies on the recording medium 1300, via the drive unit 1213, the encrypted content file 1320 to which the received content number is attached. The decrypting unit 1204 then reads the encrypted content key ECK recorded in the key recording unit 1323 of the specified encrypted content file 1320, and implements the decryption algorithm D2 on the read encrypted content key ECK using the received decryption media key y, so as to generate a decrypted content key DCK. The decrypting unit 1204 further outputs the generated decrypted content key DCK to the decrypting unit 1205.

(10) The Decrypting Unit 1205

The decrypting unit 1205 receives the decrypted content key DCK from the decrypting unit 1204. The decrypting unit 1205 also receives a content number from the specification receiving unit 1207 and specifies on the recording medium 1300, via the drive unit 1213, the encrypted content file 1320 to which the received content number is attached. The decrypting unit 1205 further reads the encrypted content ECNT recorded in the content recording unit 1324 of the specified encrypted content file 1320 and implements the decryption algorithm D3 on the read encrypted content ECNT using the received decrypted content key DCK so as to generate a decrypted content DCNT. The decrypting unit 1205 further outputs the generated decrypted content DCNT to the reproducing unit 1214.

(11) The Reproducing Unit 1214

The reproducing unit 1214 receives the decrypted content DCNT from the decrypting unit 1205, generates video information and audio information from the received decrypted content DCNT, and converts the generated video and audio information to analog video signals and analog audio signals, so as to output the analog video and audio signals to the monitor 1290.

(12) The Controlling Unit 1215, The Inputting Unit 1216, the Displaying Unit 1217, The Drive Unit 1213, The Monitor 1290, The Remote Controller 1280

The controlling unit 1215 controls the operations of the constituents of the reproduction apparatus 1200.

The remote controller 1280 includes various buttons and generates operation instruction information according to the operator's operations on the buttons, so as to output the generated operation instruction information on an infrared ray. The inputting unit 1216 receives the infrared ray that includes the operation instruction information from the remote controller 1280, extracts the operation instruction information from the received infrared ray, and outputs the extracted operation instruction information to either the controlling unit 1215 or the specification receiving unit 1217.

The displaying unit 1217 displays various information under the control of the controlling unit 1215.

The drive unit 1213 reads information from the recording medium 1300.

The monitor 1290 includes a CRT and a speaker and receives analog video signals and analog audio signals from the reproducing unit 1214, so as to display video based on the video signals and outputs audio based on the audio signals.

2.7 Structure and Relevant Processing of the Date Recorded on The Recoding Medium (1) The Version Numbers In FIG. 12, the version number is expressed as a four character hexadecimal number and is actually "3". In the second embodiment, the version numbers of pieces of key revocation data are assigned from the distributing station apparatus 1400.

More specifically, the version number "1" is assigned to the piece of key revocation data issued first, and thereafter, the version numbers "2", "3", . . . are assigned to the pieces of key revocation data that are issued.

When a key is revoked, a new piece of key vocation data is issued and a new version number will be attached thereto at that time. It should be noted that the time at which a new piece of key revocation data is issued is not limited to when a key is revoked. For example, it is acceptable to have an arrangement wherein a new piece of key revocation data is issued once in every predetermined period of time, in view of security.

(2) The Key Revocation Data Identifier

In FIG. 12, the key revocation data identifier recorded in the identifier recording unit 1312 is expressed as a four character hexadecimal number, the key revocation data identifier RID is "1".

Here, the key revocation identifier RID is information that uniquely identifies the piece of key revocation data recorded on each recording medium. Consequently, it is possible to assign a key revocation data identifier according to a system that is independently arranged for each recording medium.

As for a specific method of assigning key revocation data identifiers RID by the assigning unit 1107 of the recording apparatus 1100, the assigning unit 1107 assigns a value that is different from the key revocation data identifier assigned to the piece of key revocation data having already been recorded on the recording medium.

Figure 14:
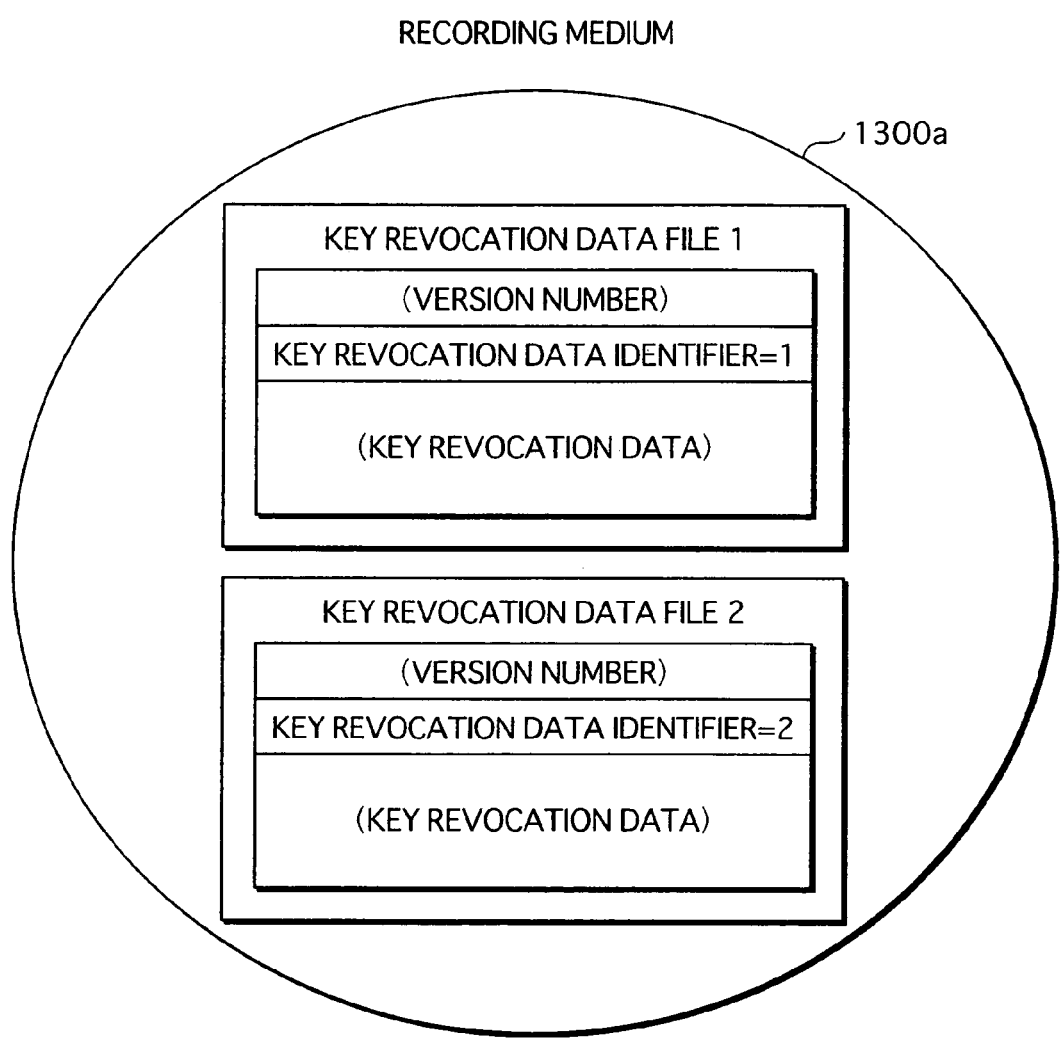

In the example shown in FIG. 14, the key revocation data file 1 and the key revocation data file 2 have already been recorded on the recording medium 1300a, and the key revocation data identifiers thereof are "1" and "2", respectively.

In such a case, when the key revocation data file 3 is to be additionally recorded onto the recording medium 1300a, the assigning unit assigns "3", which is a value besides "1" and "2", as the key revocation data identifier RID.

(3) The Device Keys and the Media Keys

In FIG. 12, encrypted media keys E(DK_i, MK) are recorded on the data recording unit 1313, the encrypted media keys E being respectively obtained by encrypting the media key using each of the n pieces of device keys DK_i (where i=1, 2, . . . n).

In FIG. 12, the device key stored in the apparatus n is expressed as a device key_n. In the example shown in FIG. 12, since the apparatus 3 and the apparatus 4 have been revoked, the device keys DK_3 and DK_4 stored therein respectively are each used to encrypt a piece of data "0", which is completely irrelevant to the media key MK.

By generating those pieces of key revocation data this way, for example, the apparatus 1 which stores therein the device key DK_1 is able to obtain the media key MK by decrypting the key revocation data E(DK_1, MK) with the device key DK_1; however, the apparatus 3 which stores therein the device key DK_3 is not able to obtain the media key MK even if the key revocation data E(DK_3, 0) is decrypted with the device key DK_3.

Thus, in the example shown in FIG. 12, only the apparatuses besides the apparatuses 3 and 4 are all able to have, in common, the correct media key MK. The apparatuses 3 and 4 are not able to obtain the correct media key MK. Accordingly, it is possible to eliminate the revoked apparatuses 3 and 4 from the system.

It should be noted that it is possible to use other methods of revocation in order to revoke the apparatuses. For example, Patent Documentation 1 discloses a revocation method in which a tree structure is used.

(4) The Encrypted Content File

As shown in FIG. 12, the encrypted content file 1320 includes the identifier recording unit 1321, the authenticator recording unit 1322, the key recording unit 1323, and the content recording unit 1324.

In FIG. 12, the key revocation data identifier recorded in the identifier recording unit 1321 is expressed as a four character hexadecimal number, and the key revocation data identifier RID is actually "1".

The key revocation data identifier RID is used in order to obtain, from the recording medium 1300, the key revocation data file 1310 used in decryption of the encrypted content that is to be reproduced on the reproduction apparatus 1200.

More specifically, when the encrypted content recorded on the recording medium 1300 is decrypted and reproduced on the reproduction apparatus 1200, the reproduction apparatus 1200 obtains, from the recording medium 1300, the key revocation data file 1310 whose identifier recording unit 1312 includes a key revocation data identifier identical to the key revocation data identifier RID recorded in the identifier recording unit 1321 of the encrypted content file 1320 to be reproduced.

Figure 15:
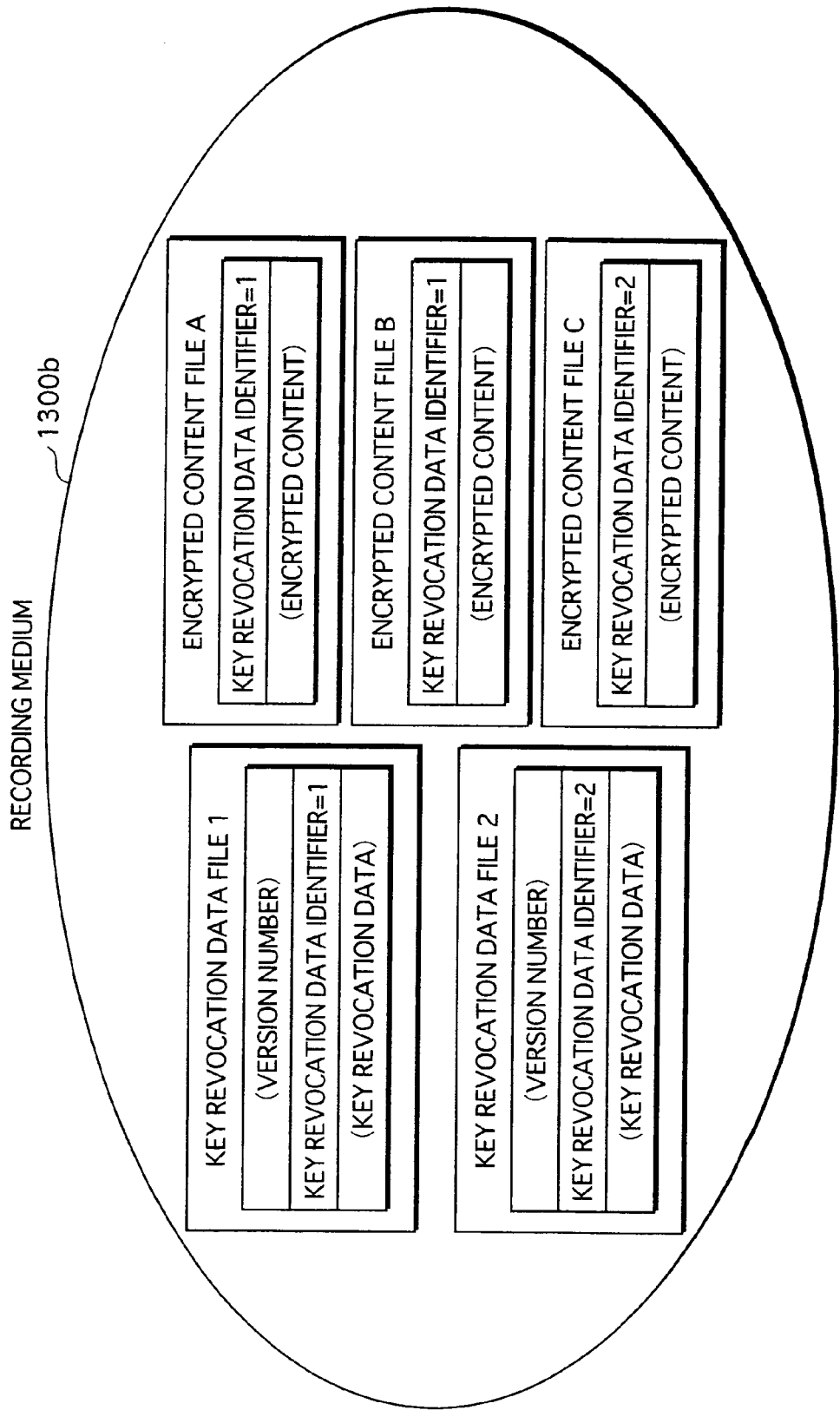
FIG. 15 is a data structure diagram that shows the structure of the data recorded on the recording medium 1300b.

Here, detailed explanation is provided with reference to FIG. 15. As shown in FIG. 15, the key revocation data file 1, the key revocation data file 2, the encrypted content file A, the encrypted content file B, and the encrypted content file C are recorded on the recording medium 1300b.

As shown in FIG. 15, the key revocation data identifiers of the key revocation data file 1 and the key revocation data file 2 are "1" and "2", respectively. The key revocation data identifiers of the encrypted content file A, the encrypted content file B, and the encrypted content file C are "1", "1", and "2", respectively.

It means that, on the recording apparatus 1100, when the encrypted content file A is generated and recorded, the piece of key revocation data in the key revocation data file 1 has been used. When the encrypted content file B is generated and recorded, the piece of key revocation data in the key revocation data file 1 has been used. When the encrypted content file C is generated and recorded, the piece of key revocation data in the key revocation data file 2 has been used.

In such a case, when the reproduction apparatus 1200 is to decrypt and reproduce the encrypted content file B on the recording medium 1300b shown in FIG. 15, for example, since the key revocation data identifier of the encrypted content file B is "1", the reproduction apparatus 1200 obtains the key revocation data file 1 whose key revocation data identifier is "1" and decrypts the encrypted content stored in the encrypted content file B, using the piece of key revocation data included in the obtained key revocation data file 1.

2.8 Operations of the Content Supply System 20

The following describes the operations of the content supply system 20, particularly the operation of writing data onto the recording medium 1300 performed by the recording apparatus 1100 and the operation of reproducing the data recorded on the recording medium 1300 performed by the reproduction apparatus 1200.

(1) The Operation of Writing Data Performed by the Recording Apparatus 1100

Figure 16:
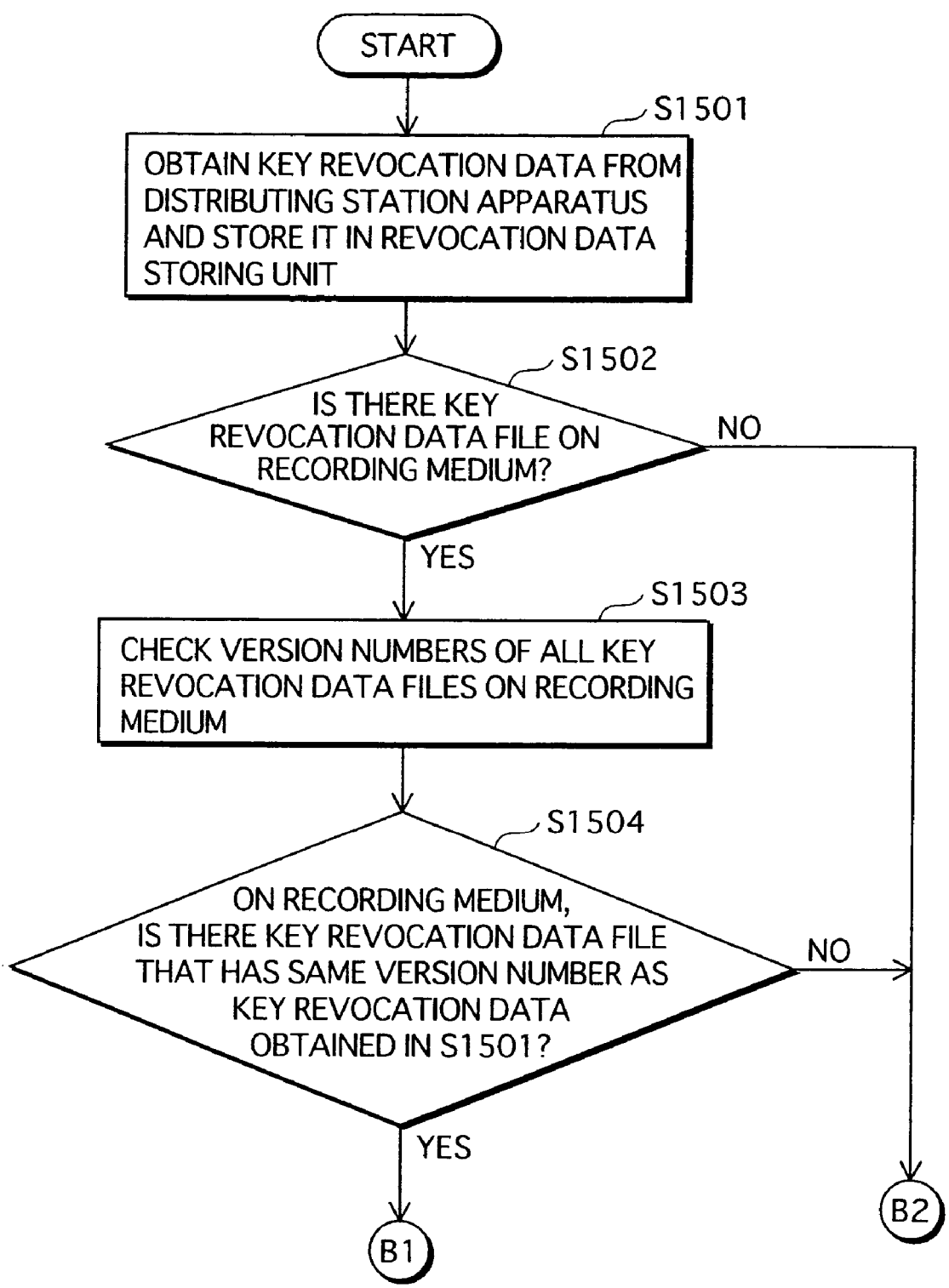
FIG. 16 is a flow chart that shows the operation of writing data onto the recording medium 1300 performed by the recording apparatus 1100, to be continued in FIG. 17.
Figure 17:
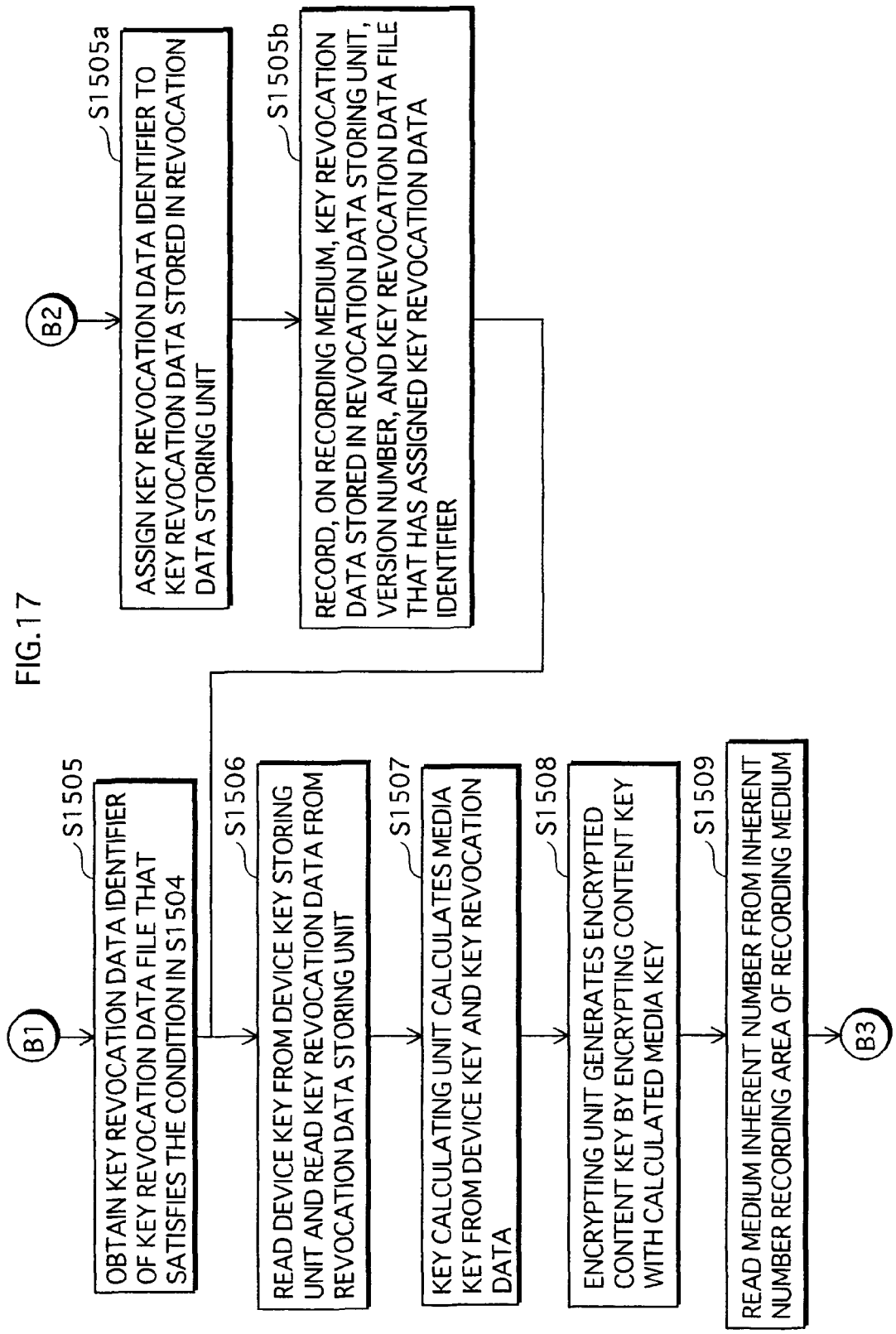
FIG. 17 is a flowchart that shows the operation of writing data onto the recording medium 1300 performed by the recording apparatus 1100, to be continued in FIG. 18.
Figure 18:
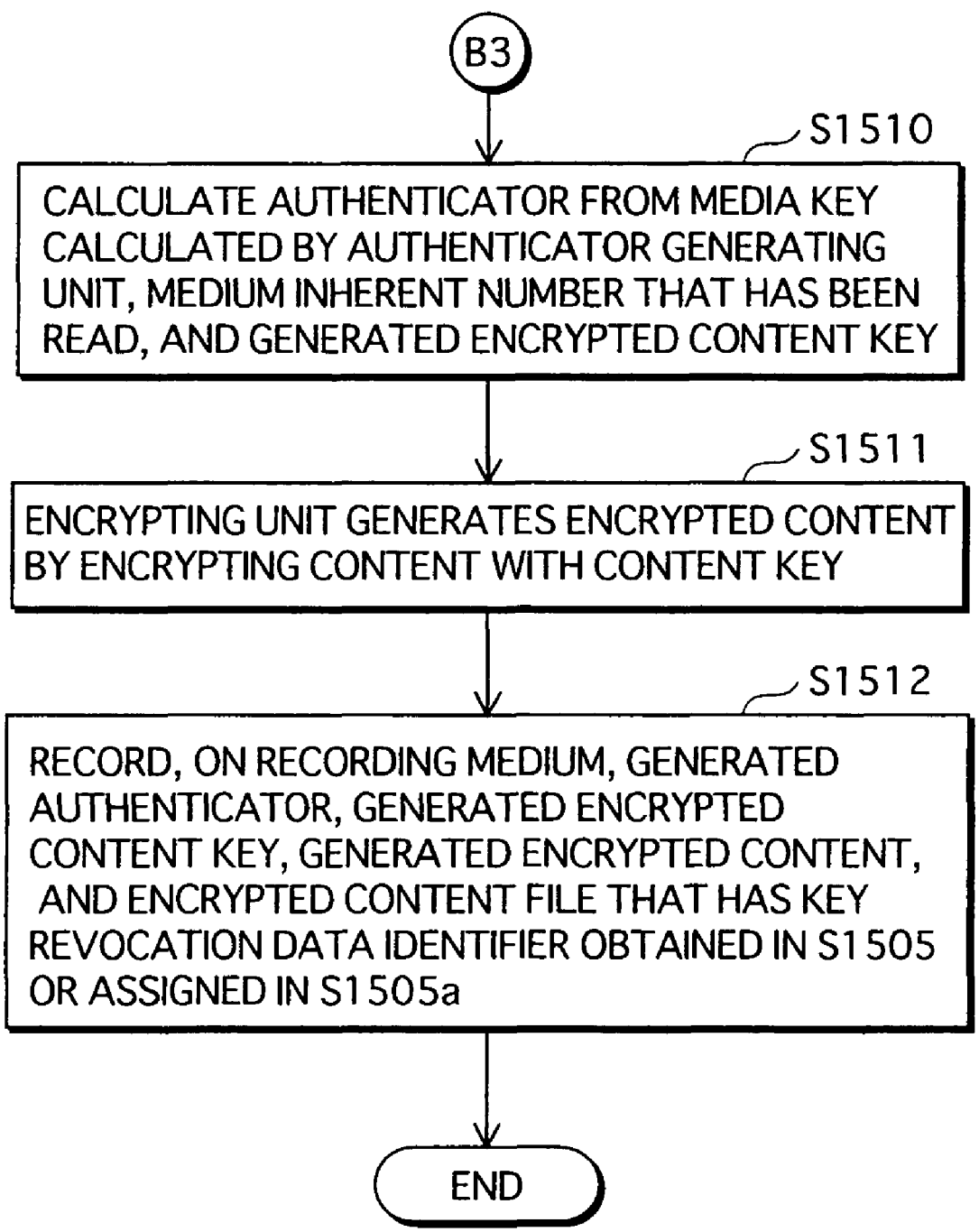
FIG. 18 is a flowchart that shows the operation of writing data onto the recording medium 1300 performed by the recording apparatus 1100, continued from FIG. 17.

The following describes the operation of writing data onto the recording medium 1300 performed by the recording apparatus 1100, with reference to the flow chart in FIGS. 16, 17, and 18.

The transmitting and receiving unit 1111 of the recording apparatus 1100 receives the key revocation data RDATA and the version number VR from the distributing station apparatus 1400 via the Internet 40, and stores the received key revocation data RDATA and version number VR into the revocation data storing unit 1102 in such a manner that they are in correspondence with each other (Step S1501).

The time at which the key revocation data RDATA and the version number VR are received in Step S1501 is when the distributing station apparatus 1400 has issued a new piece of key revocation data RDATA. As explained earlier, version numbers VR that indicate the order in which they are issued are attached to pieces of key revocation data RDATA. The recording apparatus 1100 checks if the received piece of key revocation data RDATA is new or not based on the version number VR.

For example, in a case where the revocation data storing unit 1102 of the recording apparatus 1100 stores therein a piece of key revocation data to which the version number "1" is attached, on an assumption that a piece of key revocation data to which the version number "2" is attached is received from the distributing station apparatus 1400, the controlling unit 1109 of the recording apparatus 1100 compares the version number "2" attached to the received piece of key revocation data with the version number "1" attached to the piece of key revocation data stored in the revocation data storing unit 1102. Since the version number "2" attached to the received piece of key revocation data is newer, the controlling unit 1109 takes the received piece of key revocation data as a newer one and instructs the transmitting and receiving unit 1111 to store the received piece of key revocation data and the version number "2" into the revocation data storing unit 1102. Here, the larger a version number is, the newer the data to which the version number is attached is.

Here the explanation has been provided for a case in which the version numbers are used to compare the pieces of key revocation data to determine which one is newer; however, the present invention in not limited to this method. It is acceptable to have an arrangement wherein, for example, to each piece of key revocation data, a date and time of issuing the piece of key revocation data is attached, instead of the version number, so that pieces of key revocation data are compared, in order to judge which one is newer from the date and time of issue.

Additionally, here, the piece of key revocation data is obtained from the distributing station apparatus 1400; however, the method of obtaining a piece of key revocation data is not limited to this. It is acceptable to have an arrangement wherein, for example, a recording medium on which a piece of key revocation data and a version number are recorded is distributed so that the recording apparatus 1100 reads the piece of key vocation data and the version number from the recording medium.

Next, the comparing unit 1108 of the recording apparatus 1100 checks if a key revocation data file exists in the recording area 1305 of the recording medium 1300 via the drive unit 1110. When it has been confirmed that no key revocation data file exists (Step S1502), the procedure advances to Step S1505a, which is explained later.

When it has been confirmed that the key revocation data file 1310 exists (Step S1502), the comparing unit 108 unit checks if there is a version number that is identical to the version number attached to the piece of key revocation data obtained in Step S1501 among the version numbers that are recorded in the version number recording unit of all the existing key revocation data files.

When there is no version number that satisfies the aforementioned condition in Step S1503 (Step S1504), the procedure advances to Step S1505a, which is explained later.

In Step S1504, when there is a version number that satisfies the aforementioned condition (Step S1504), the controlling unit 1109 reads, via the drive unit 1110, the key revocation data identifier RID from the identifier recording unit 1312 of the key revocation data file 1310 that includes the version number that satisfies the condition (Step S1505).

The key calculating unit 1103 reads a device key from the device key storing unit 1101, and reads a piece of key revocation data from the revocation data storing unit 1102 (Step S1506), and then calculates a media key MK by decrypting the read piece of key revocation data with the read device key (Step S1507).

The encrypting unit 1105 then encrypts the content key CK received from the content server apparatus 500 using the calculated media key, so as to generate the encrypted content key ECK (Step S1508).

The authenticator generating unit 1104 reads the medium inherent number MID from the inherent number recording area 1301 of the recording medium 1300 (Step S1509), and generates an authenticator MAC as an output value by taking a combined value of (i) the media key Mk calculated by the key calculating unit 1103, (ii) the encrypted content key ECK generated by the encrypting unit 1105, and (iii) the read medium inherent number MID, as an input value for a hash function (Step S1510). It should be noted that the hash function used here is achievable with a technique publicly known. For example, it is possible to use SHA-1 as the hash function; however, the present invention is not limited to SHA-1.

Next, the encrypting unit 1106 encrypts the received content CNT in a similar manner using the content key CK received from the content server apparatus 1500 (Step S1511).

The recording apparatus 1100 records an encrypted content file into the recording area 1305 of the recording medium 1300 (Step S1512), so as to complete the procedure, the encrypted content file including: the key revocation data identifier RID that is either obtained in Step S1505 or assigned in Step S1505a; the authenticator MAC generated in Step S1510; the encrypted content key generated in Step S1508; and the encrypted content generated in Step S1511.

When it is confirmed that the key revocation data file 1310 does not exist on the recording medium 1300 (Step S1502), and when no version number that satisfies the condition exists in Step S1503 (Step S1504), the assigning unit 1107 assigns a value as a key revocation data identifier to the piece of key revocation data obtained in Step 1501, the value being different from any of the key revocation data identifiers RID assigned to all the key revocation data files recorded in the recording area 1305 of the recording medium 1300 (Step S1505a).

For example, when no key revocation data file exists on the recording medium 1300, the assigning unit 1107 assigns an arbitrary value e.g. "1". As the example shown in FIG. 14, when key revocation data files 1 and 2 whose key revocation data identifiers are respectively "1" and "2" exist on the recording medium 1300a, the assigning unit 1107 assigns a value (for example "3") that is different from "1" and "2".

Next, the drive unit 1110 of the recording apparatus 1100 records the piece of key revocation data obtained in Step S1501, the version number of the piece of key revocation data, the key revocation data file that has the key revocation data identifier assigned in Step S1505a into the key revocation data file 1302 on the recording medium 1300 (Step S1505b). At this time, the drive unit 1110 records the piece of key revocation data, the version number, and the key revocation data identifier RID into the data recording unit 1313, the version number recording unit 1311, and the identifier recording unit 1312 of the key revocation data file 1310, respectively. The procedure is then controlled to advance to Step S1506, so that the aforementioned procedure from Step 1506 to Step 1512 is performed thereafter.

(2) The Operation of Reproduction Performed by the Reproduction Apparatus 1200

Figure 19:
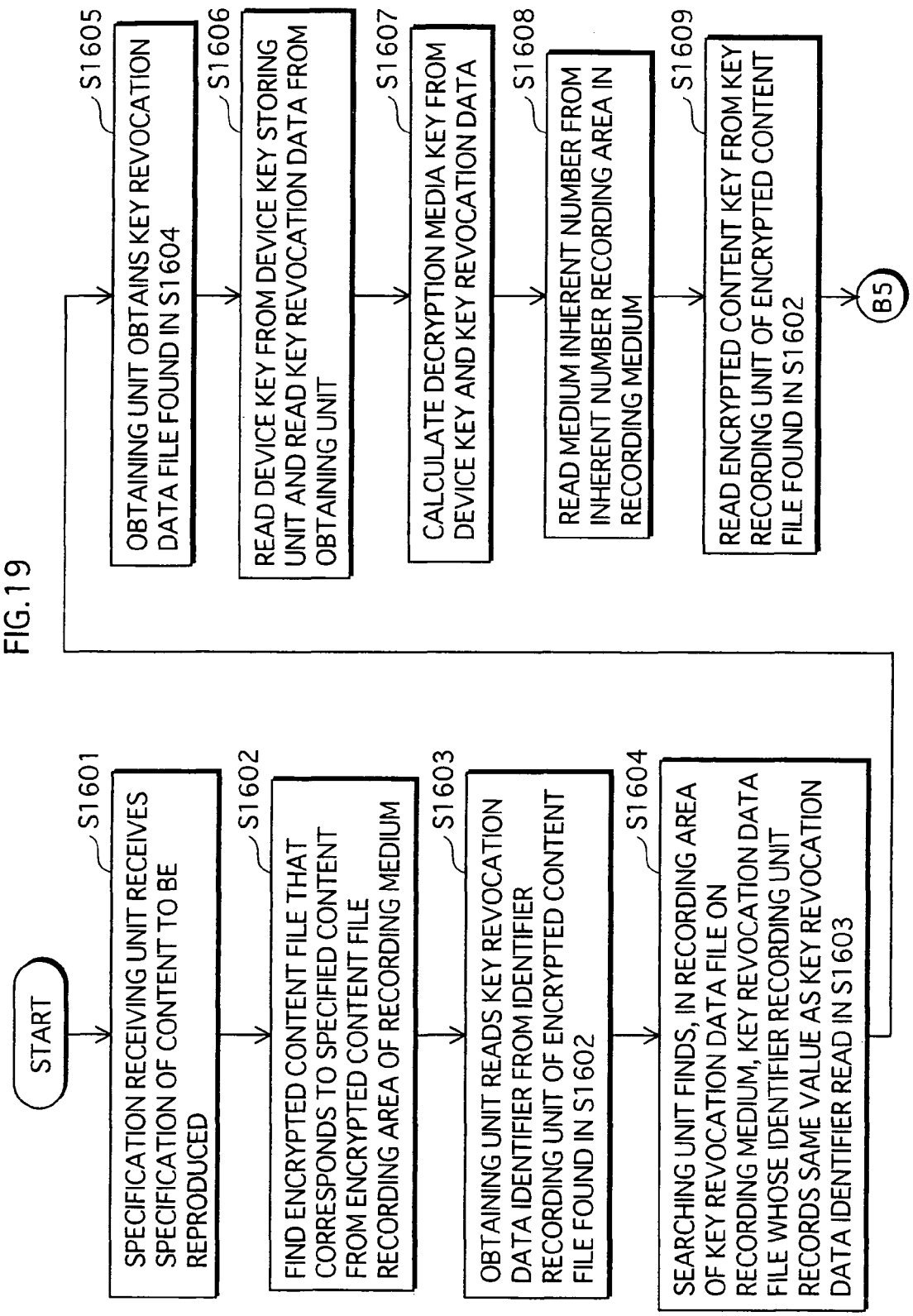
FIG. 19 is a flow chart that shows the operation of reproducing the data recorded on the recording medium 1300 performed by the reproduction apparatus 1200, to be continued in FIG. 20.
Figure 20:
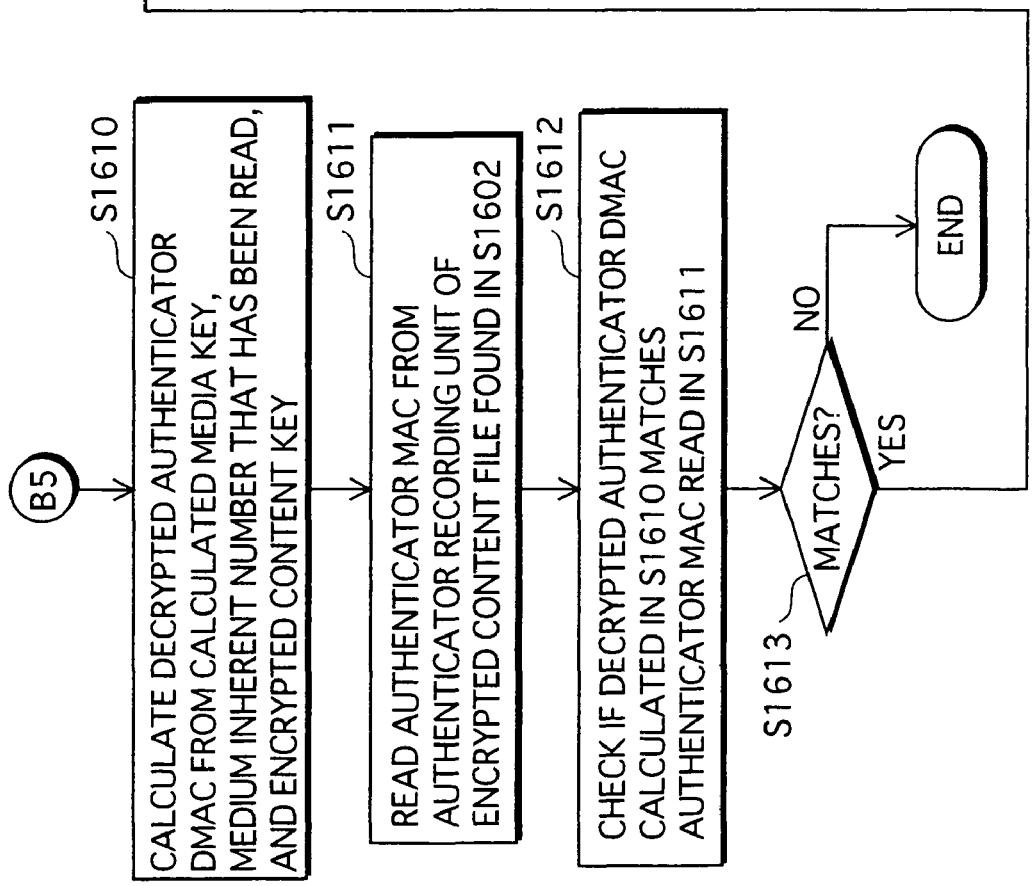
FIG. 20 is a flow chart that shows the operation of reproducing the data recorded on the recording medium 1300 performed by the reproduction apparatus 1200, continued from FIG. 19.

The following describes the operation of reproducing the data recorded on the recording medium 1300 performed by the reproduction apparatus 1200, with reference to the flow chart in FIGS. 19 and 20.

The specification receiving unit 1207 of the reproduction apparatus 1200 receives a specification of a content to be reproduced (Step S1601).

The obtaining unit 1208 finds an encrypted content file that corresponds to the content specified in Step S1601 from the recording area 1305 of the recording medium 1300 (Step S1602). As for a method used by the specification receiving unit 1207 in order to specify the content to be reproduced and a method for finding the encrypted content file that corresponds to the specified content, the reproduction apparatus 1200 for example displays, on the display unit 1217 of the reproduction apparatus 1200, a list of information that indicates attributes (e.g. a file name of the encrypted content, a title of the content, a date and time of recording of the content, summary information of the content, a thumbnail image of the content, an icon indicating the content etc.) of all the encrypted content files recorded in the recording area 1305 of the recording medium 1300 and has the user select a content that he/she wishes to reproduce from the list so that a specification of the content to be reproduced can be received. The reproduction apparatus 1200 finds out the file name of the encrypted content file in which the specified content is stored from the attribute information of the specified content, and finds the encrypted content file having the particular file name from the recording area 1305 of the recording medium 1300.

As for the method for finding the encrypted content file, the present invention is not limited to the method mentioned above; it is possible to use other methods.

The obtaining unit 1208 reads the key revocation data identifier from the identifier recording unit 1321 of the encrypted content file 1320 found in Step S1602 (Step S1603).

The searching unit 1209 finds, from the recording area 1305 of the recording medium 1300, the key revocation data file 1310 whose identifier recording unit 1312 stores therein a value identical to the key revocation data identifier RID read in Step S1603 (Step S1604) The searching unit 1209 then obtains the key revocation data file 1310 found in Step S1604 (Step S1605).

The key calculating unit 1202 reads a device key from the device key storing unit 1201 and receives the piece of key revocation data from the searching unit 1209 (Step S1606).

The key calculating unit 1202 calculates a decryption media key y by decrypting the piece of key revocation data received in Step S1606 using the device key (Step S1607).

The authenticator generating unit 1203 reads the medium inherent number MID from the inherent number recording area 1301 of the recording medium 1300 (Step S1608), reads the encrypted content key ECK from the key recording unit 1323 of the encrypted content file 1320 found in Step S1602, and generates a decrypted authenticator DMAC as an output value by taking a combined value of (i) the decryption media key y obtained in Step S1607, (ii) the encrypted content key ECK read in Step S1609, and (iii) the medium inherent number MID obtained in Step S1608, as an input value for a hash function (Step S1610). The hash function used here is the hash function SHA-1 that is the same as the one used by the recording apparatus 1100.

The comparing unit 1206 reads the authenticator MAC from the authenticator recording unit 1322 of the encrypted content file 1320 found in Step S1602 (Step S1611), and checks if the decrypted authenticator DMAC calculated in Step S1610 matches the authenticator MAC read in Step S1611 (Step S1612).

When the decrypted authenticator DMAC does not match the authenticator MAC (Step S1613), the operation of reproduction is finished.

When the decrypted authenticator DMAC matches the authenticator MAC (Step S1613), the decrypting unit 1204 decrypts the encrypted content key with the decryption media key Y calculated in Step S1607 so as to obtain a decrypted content key DCK (Step S1614).

The decrypting unit 1205 reads the encrypted content from the content recording unit 1324 of the encrypted content file 1320 found in Step S1602 (Step S1615), and decrypts the encrypted content read in Step S1615 using the decrypted content key DCK decrypted in Step S1614 so as to obtain a decrypted content. The reproducing unit 1214 reproduces the decrypted content (Step S1616).

2.9 Other Modification Examples

It is also acceptable to have the following arrangements:

(1) In the second embodiment, the version number indicating the generation of a piece of key revocation data and the key revocation data identifier identifying the piece of key revocation data are recorded into the version number recording unit and the identifier recording unit of the key revocation data file, respectively; however, the present invention is not limited to this method.

For example, it is acceptable that the file name that identifies the key revocation data file includes one or both of the version number and the key revocation data identifier of the piece of key revocation data. More specifically, it is acceptable to make the file name of the key revocation data file "KRD_n_m". Here, "n" is a version number, and "m" is a key revocation data identifier. In such a case, for example, when a key revocation data file is identified with a file name "KRD_0001_0002", the version number is "1", and the key revocation data identifier RID is "2".

With this arrangement wherein the file name includes one or both of the version number and the key revocation data identifier, the reproduction apparatus is able to find out the version number and the key revocation data identifier RID of the key revocation data file, by referring to the file name. Thus, there is an advantageous effect that it is possible to reduce the processing required for the search for a file performed by the reproduction apparatus.

(2) In the second embodiment, the key revocation data identifier is recorded into the identifier recording unit of the encrypted content file; however, the present invention is not limited to this method.

For example, it is possible to have an arrangement wherein the file name identifying the encrypted content file includes the key revocation data identifier. More specifically, it is possible to make the file name identifying the encrypted content file "ECNT_m". Here, "m" is a key revocation data identifier. For example, when the file name of an encrypted content file is "ECNT_0002", the key revocation data identifier RID is "2".

With this arrangement wherein the file name includes the key revocation data identifier, the reproduction apparatus is able to find out the key revocation data identifier by referring to the file name. Thus, there is an advantageous effect that it is possible to reduce the processing required for obtaining the key revocation data identifier performed by the reproduction apparatus.

(3) In the second embodiment, in order to relate the piece of key revocation data with the key revocation data identifier, as well as in order to relate the encrypted content with the key revocation data identifier RID, it is arranged so that the key revocation data file 1310 includes the version number recording unit 1311 and the identifier recording unit 1312 for having the version number and the key revocation data identifier recorded therein, respectively. Also, the encrypted content file 1320 includes the identifier recording unit 1321 for having the key revocation data identifier recorded therein. The present invention is, however, not limited to these arrangements.

For example, it is acceptable to have an arrangement wherein the recording apparatus records, onto the recording medium 1300, one or more key revocation data files, one or more encrypted content files, and one key revocation data management file. The key revocation data management file includes, for each of the key revocation data files, the version number of the piece of key revocation data, the key revocation data identifier, a piece of information for uniquely identifying the key revocation data file on the recording medium (e.g. a directory name or a file name that shows where the key revocation data file is recorded), a piece of information for uniquely identifying, on the recording medium, the encrypted content file encrypted with the key revocation data file (e.g. a directory name or a file name that shows where the encrypted content file is recorded), and the like. The reproduction apparatus obtains a key revocation data file that is related to the encrypted content specified to be reproduced, based on those piece of information recorded on the key revocation data management file.

In addition, it is also acceptable to combine the arrangement of the embodiments with the arrangement in which the key revocation data management file is provided.

(4) In the second embodiment, the version number of the piece of key revocation data and the key revocation data identifier are both used; however, the present invention is not limited to this arrangement. It is acceptable if only the key revocation data identifier is used.

(5) In the second embodiment, explanation is provided on an arrangement with a key revocation technique wherein the piece of key revocation data recorded in the rewritable area of the recording medium includes (i) a media key encrypted using a device key stored in an unrevoked apparatus and (ii) a value being irrelevant to a media key (e.g. "0") encrypted using a device key stored in a revoked apparatus, and the encrypted content to be recorded in the rewritable area of the recording medium is a content encrypted based on such a media key; however, the present invention is not limited to this arrangement.

For example, it is acceptable to have any arrangement as long as the following condition is satisfied: as for the piece of key revocation data and the encrypted content that are recorded in the rewritable area of the recording medium, an unrevoked apparatus is able to decrypt and reproduce the encrypted content based on the piece of key revocation data, whereas a revoked apparatus is not able to decrypt and reproduce the encrypted content based on the piece of key revocation data.

(6) In the second embodiment, as a media bind technique, an arrangement is provided wherein, at the recording apparatus 1100, the authenticator MAC is generated using the medium inherent number MID; and at the reproduction apparatus 1200, the authenticator MAC is compared; however, the present invention is not limited to this arrangement.

For example, it is acceptable to have an arrangement wherein, at the recording apparatus 1100 a content is encrypted using the medium inherent number MID and recorded onto the recording medium; and at the reproduction apparatus 1200, the encrypted content is decrypted using the medium inherent number MID.

(7) In the second embodiment, when the key revocation data identifier is assigned, the value assigned as the key revocation identifier is one that is not assigned to the piece of key revocation data being already recorded on the recording apparatus 1100; however, the present invention is not limited to this arrangement.

For example, it is acceptable that the recording apparatus 1100 stores therein the key revocation data identifier that has already been assigned, along with the medium inherent number MID so that the recording apparatus 1100 assigns other key revocation data identifiers based on this information stored therein.

2.10 Summary

As apparent from the description above, the present invention provides a recording apparatus comprising: a key revocation data storing unit that stores therein a piece of key revocation data for revoking a key stored in a specific apparatus; a content encrypting unit operable to encrypt the content based on the piece of key revocation data; an assigning unit operable to assign key revocation data identifying information that uniquely identifies the piece of key revocation data on the recording medium to the piece of key revocation data; a key revocation data recording unit operable to record, onto the recording medium, the piece of key revocation data in such a manner that it is in correspondence with the key revocation data identifying information; and a content recording unit operable to record the encrypted content in such a manner that it is in correspondence with the key revocation data identifying information.

Further, the assigning unit assigns, as key revocation data identifying information, a value that is different from the key revocation data identifying information that is already assigned to the piece of key revocation data recorded on the recording medium.

Further, the assigning unit compares the piece of key revocation data recorded on the recording medium with the piece of key revocation data stored in the key revocation data storing unit and assigns the key revocation data identifying information only when the piece of key revocation data stored in the key revocation data storing unit has been judged newer.

In addition, the assigning unit judges which one of the piece of key revocation data recorded on the recording medium and the piece of key revocation data stored in the key revocation data storing unit is newer, based on either information related to a date and time at which the piece of key revocation data has been generated or information related to the order in which pieces of key revocation data have been generated.

The present invention also provides a reproduction apparatus comprising: a content reading unit operable to read the encrypted content and the key revocation data identifying information being recorded in correspondence with the encrypted content, from the recording medium; a key revocation data reading unit operable to read, from the recording medium, a piece of key revocation data with which such a piece of key revocation data identifying information is in correspondence that is identical to the piece of key revocation data identifying information read by the content reading unit; and a content decrypting unit operable to decrypt the encrypted content read by the content reading unit based on the piece of key revocation data read by the key revocation data reading unit.

The present invention provides a recording medium comprising: a key revocation data storing unit that records a piece of key revocation data in such a manner that it is in correspondence with a piece of key revocation data identifying information that uniquely identifies the piece of key revocation data on the recording medium; and a content storing unit operable to record an encrypted content encrypted based on the piece of key revocation data in such a manner that it is in correspondence with the piece of revocation data identifying information.

The present invention also provides the recording medium that further records information indicating which one of pieces of key revocation data is newer, in correspondence with each piece of key revocation data.

The present invention further provides a digital work protection system made up of at least a recording apparatus, a recording medium, and a reproduction apparatus, wherein the recording apparatus comprises: a key revocation data storing unit that stores therein a piece of key revocation data for revoking a key stored in a specific apparatus; a content encrypting unit operable to encrypt the content based on the piece of key revocation data; an assigning unit operable to assign key revocation data identifying information that uniquely identifies the piece of key revocation data on the recording medium, to the piece of key revocation data; a key revocation data recording unit operable to record, onto the recording medium, the piece of key revocation data in such a manner that it is in correspondence with the key revocation data identifying information; and a content recording unit operable to record the encrypted content in such a manner that it is in correspondence with the key revocation data identifying information, and the recording medium comprises: a key revocation data storing unit that records a piece of key revocation data in such a manner that it is in correspondence with a piece of key revocation data identifying information; and a content storing unit operable to record the encrypted content in such a manner that it is in correspondence with the piece of revocation data identifying information, and the reproduction apparatus comprises: a content reading unit operable to read the encrypted content and the key revocation data identifying information being recorded in correspondence with the encrypted content, from the recording medium; a key revocation data reading unit operable to read, from the recording medium, a piece of key revocation data with which such a piece of key revocation data identifying information is in correspondence that is identical to the piece of key revocation data identifying information read by the content reading unit; and a content decrypting unit operable to decrypt the encrypted content read by the content reading unit based on the piece of key revocation data read by the key revocation data reading unit.

With the recording apparatus, the recording medium, the reproduction apparatus, and the digital work protection system according to the second embodiment as explained above, (i) a key revocation data identifier is assigned to a piece of key revocation data to be recorded on the recording medium so that the key revocation data identifier uniquely identifies the piece of key revocation data on the recording medium, (ii) the key revocation data identifier is recorded in correspondence with the piece of key revocation data to be recorded on the recording medium, as a key revocation data file, and also (iii) the key revocation data identifier is recorded in correspondence with a content encrypted using the piece of key revocation data, as an encrypted content file. Thus, when the reproduction apparatus decrypts and reproduces the encrypted content, even if a plurality of encrypted content files and a plurality of key revocation data files are recorded on the recording medium, it is possible to search for and obtain a key revocation data file that includes a key revocation data identifier identical to the key revocation data identifier included in the particular encrypted content file, and it is therefore possible to decrypt and reproduce the encrypted content file using the obtained key revocation data file.

3. Other Modification Examples

The present invention has been explained so far according to the embodiments; however, the present invention is not limited to these embodiments, needless to say. The following examples are also included in the present invention:

(1) In the embodiments, the content is data in which video data and audio data are efficiently compression-coded; however, the present invention is not limited to this. For example, it is acceptable if a content is computer data in which a novel, a still image, audio, or the like is digitalized.

Further, it is also acceptable if, for example, a content is a computer program that is made up of instructions for controlling the operation of a microprocessor included in a computer. Alternatively, it is acceptable if a content is table data generated with a piece of spreadsheet software. It is also acceptable if a content is a database generated with a piece of database software.

(2) Each of the aforementioned apparatuses is specifically a computer system that comprises a microprocessor, a ROM, a RAM, a hard disk unit, a display unit, a keyboard, a mouse, and the like. The RAM and the hard disk unit each store therein a computer program. Each of the apparatuses achieves its functions when the microprocessor operates according to the computer programs.

(3) It is acceptable to take the present invention as methods described above. It is further acceptable to take the present invention as a computer program for realizing such methods with the use of a computer, or as digital signals converted from a computer program.

Additionally, it is acceptable to consider that the present invention provides a computer-readable recoding medium e.g. a flexible disk, a hard disk, a CD-ROM, an MO, a DVD, a DVD-ROM, a DVD-RAM, a BD (Blu-ray Disc), and a semiconductor memory, that records such a computer program or such digital signals thereon; or to consider that the present invention provides such a computer program or such digital signals recorded on such a recording medium.

Further, it is possible to consider that the present invention makes it possible to transmit such a computer program or such digital signals via a telecommunication line, a wireless or cable communication network, a network represented by the Internet, digital broadcast, or the like.

Moreover, it is possible to consider that the present invention provides a computer system comprising a microprocessor and a memory, wherein the memory stores the computer program, and the microprocessor operates according to the computer program.

Furthermore, it is possible that another independent computer system executes the program or the digital signals that are transmitted on the recording media, or via the network mentioned above.

(4) It is also acceptable to combine any of the embodiments and the modification examples.

It is possible to utilize the apparatuses and the recording medium of the present invention, operationally, continually, and repeatedly in the content supply industry that produces contents and supply them. It is further possible to manufacture and sell the apparatuses and the recording medium of the present invention, operationally, continually, and repeatedly in the electronics manufacturing industry.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording apparatus for recording an encrypted content onto a recording medium storing first media key data and a first encrypted content, the first media key data including a plurality of first encrypted media keys each generated by encrypting one first media key using a corresponding device key of a plurality of first device keys, the first encrypted content being generated by encrypting a content using a first media key, the recording apparatus comprising:
   a device key storing unit storing a device key assigned to the recording apparatus;

a storing unit storing second media key data including a plurality of second encrypted media keys each generated by encrypting one second media key using a corresponding device key of a plurality of second device keys;

a comparing unit operable to compare the first media key data stored in the recording medium with the second media key data stored in the storing unit, so as to judge which of the first media key data and the second media key data is newer;

a content decrypting unit operable to, when the comparing unit judges that the second media key data is newer than the first media key data and when the first encrypted content has been stored in the recording medium, obtain the one first media key from the first media key data using a corresponding device key of the plurality of first device keys, and decrypt the first encrypted content stored in the recording medium using the obtained one first media key, so as to generate a content;

a content encrypting unit operable to, when the comparing unit judges that the second media key data is newer than the first media key data, and continuously after the content decrypting unit generates the content, obtain the one second media key from the second media key data using a corresponding device key of the plurality of second device keys, and encrypt the content generated by the content decrypting unit using the obtained one second media key, so as to generate a second encrypted content; and a deleting and writing unit operable to delete the first media key data and the first encrypted content from the recording medium, and write the second media key data and the second encrypted content generated by the content encrypting unit to the recording medium, wherein one media key data is stored in the recording medium and two or more pieces of media key data are not stored in the recording medium.

2. The recording apparatus of claim 1, wherein
the first encrypted content includes a first encrypted content key and encrypted content data, the first encrypted content key being generated by encrypting a content key using the one first media key, and the encrypted content data being generated by encrypting content data using the content key, and
the second encrypted content includes a second encrypted content key and the encrypted content data, and the second encrypted content key being generated by encrypting the content key using the one second media key.

3. The recording apparatus of claim 1, wherein
the content decrypting unit obtains one encrypted media key corresponding to the recording apparatus from the plurality of first encrypted media keys included in the first media key data, and decrypts the one encrypted media key obtained by the content decrypting unit using the corresponding device key to generate the one first media key, and
the content encrypting unit obtains one encrypted media key corresponding to the recording apparatus from the plurality of second encrypted media keys included in the second media key data, and decrypts the one encrypted media key obtained by the content encrypting unit using the corresponding device key to generate the one second media key.

4. The recording apparatus of claim 1, wherein
the first media key data includes first version information indicating a generation of the first media key data, and the second media key data includes second version information indicating a generation of the second media key data, and
the comparing unit judges which of the first media key data and the second media key data is newer by comparing the first version information with the second version information.

5. The recording apparatus of claim 1, wherein
the first media key data includes first time information indicating a time at which the first media key data is generated, and the second media key data includes second time information indicating a time at which the second media key data is generated, and
the comparing unit judges which of the first media key data and the second media key data is newer by comparing the first time information with the second time information.

6. A recording method used by a recording apparatus for recording an encrypted content onto a recording medium storing first media key data and a first encrypted content, the first media key data including a plurality of first encrypted media keys each generated by encrypting one first media key using a corresponding device key of a plurality of first device keys, the first encrypted content being generated by encrypting a content using a first media key, the recording apparatus including a device key storing unit storing a device key assigned to the recording apparatus and a storing unit storing second media key data including a plurality of second encrypted media keys each generated by encrypting one second media key using a corresponding device key of a plurality of second device keys, the recording method comprising:

a comparing step of comparing the first media key data stored in the recording medium with the second media key data stored in the storing unit, so as to judge which of the first media key data and the second media key data is newer;

a content decrypting step of, when the comparing step judges that the second media key data is newer than the first media key data and when the first encrypted content has been stored in the recording medium, obtaining the one first media key from the first media key data using a corresponding device key of the plurality of first device keys, and decrypting the first encrypted content stored in the recording medium using the obtained one first media key, so as to generate a content;

a content encrypting step of, when the comparing step judges that the second media key data is newer than the first media key data, and continuously after the content decrypting step generates the content, obtaining the one second media key from the second media key data using a corresponding device key of the plurality of second device keys, and encrypting the content generated by the content decrypting step using the obtained one second media key, so as to generate a second encrypted content; and a deleting and writing step of deleting the first media key data and the first encrypted content from the recording medium, and writing the second media key data and the second encrypted content generated by the content encrypting step to the recording medium, wherein one media key data is stored in the recording medium and two or more pieces of media key data are not stored in the recording medium.

7. A non-transitory computer-readable recording medium having recorded thereon a computer program used by a recording apparatus, the recording medium storing first media key data and a first encrypted content, the first media key data including a plurality of first encrypted media keys each generated by encrypting one first media key using a corresponding device key of a plurality of first device keys, the first encrypted content being generated by encrypting a content using a first media key, the recording apparatus including a device key storing unit storing a device key assigned to the recording apparatus and a storing unit storing second media key data including a plurality of second encrypted media keys each generated by encrypting one second media key using a corresponding device key of a plurality of second device keys, and the computer program causing the recording apparatus, as a computer, to execute a method comprising:

- a comparing step of comparing the first media key data stored in the recording medium with the second media key data stored in the storing unit, so as to judge which of the first media key data and the second media key data is newer;
- a content decrypting step of, when the comparing step judges that the second media key data is newer than the first media key data and when the first encrypted content has been stored in the recording medium, obtaining the one first media key from the first media key data using a corresponding device key of the plurality of first device keys, and decrypting the first encrypted content stored in the recording medium using the obtained one first media key, so as to generate a content;
- a content encrypting step of, when the comparing step judges that the second media key data is newer than the first media key data, and continuously after the content decrypting step generates the content, obtaining the one second media key from the second media key data using a corresponding device key of the plurality of second device keys, and encrypting the content generated by the content decrypting step using the obtained one second media key, so as to generate a second encrypted content; and
- a deleting and writing step of deleting the first media key data and the first encrypted content from the recording medium, and writing the second media key data and the second encrypted content generated by the content encrypting step to the recording medium,
- wherein one media key data is stored in the recording medium and two or more pieces of media key data are not stored in the recording medium.

* * * * *